US011720863B2

(12) United States Patent
Lewis et al.

(10) Patent No.: US 11,720,863 B2
(45) Date of Patent: Aug. 8, 2023

(54) METHOD AND SYSTEM FOR GENERATING VEHICLE SERVICE CONTENT

(71) Applicant: Snap-on Incorporated, Kenosha, WI (US)

(72) Inventors: Bradley R. Lewis, Gilroy, CA (US);
Patrick S. Merg, Hollister, CA (US);
Brett A. Kelley, San Jose, CA (US);
Jacob G. Foreman, Hollister, CA (US)

(73) Assignee: Snap-on Incorporated, Kenosha, WI (US)

(*) Notice: Subject to any disclaimer, the term of this patent is extended or adjusted under 35 U.S.C. 154(b) by 346 days.

(21) Appl. No.: 17/143,954

(22) Filed: Jan. 7, 2021

(65) Prior Publication Data
US 2021/0125154 A1 Apr. 29, 2021

Related U.S. Application Data

(63) Continuation of application No. 16/571,889, filed on Sep. 16, 2019, now Pat. No. 10,891,597, which is a
(Continued)

(51) Int. Cl.
*G06F 17/00* (2019.01)
*G06Q 10/20* (2023.01)
(Continued)

(52) U.S. Cl.
CPC .......... *G06Q 10/20* (2013.01); *G06F 40/284* (2020.01); *G06F 40/40* (2020.01)

(58) Field of Classification Search
None
See application file for complete search history.

(56) References Cited

U.S. PATENT DOCUMENTS 6,301,531 B1 10/2001 Pierro et al.
6,493,723 B1 12/2002 Busche
(Continued)

FOREIGN PATENT DOCUMENTS

WO 2004/092918 A2 10/2004
WO 2005/039927 A2 5/2005
(Continued)

OTHER PUBLICATIONS

Grau, Bernardo Cuenca; Horrocks, Ian; Kazakov, Yevgeny; Sattler, Ulrike; ACM Digital Library Just the right amount: extracting modules from ontologies; University of Manchester WWW '07 Proceedings of the 16th International conference on World Wide Web; pp. 717-726; May 8-12, 2007.
(Continued)

*Primary Examiner* — Satwant K Singh
(74) *Attorney, Agent, or Firm* — McDonnell Boehnen Hulbert & Berghoff LLP

(57) ABSTRACT

Methods and systems for using natural language processing and machine-learning algorithms to process vehicle-service data to generate metadata regarding the vehicle-service data are described herein. A processor can discover vehicle-service data that can be clustered together based on the vehicle-service data having common characteristics. The clustered vehicle-service data can be classified (e.g., categorized) into any one of a plurality of categories. One of the categories can be for clustered vehicle-service data that is tip-worthy (e.g., determined to include data worthy of generating vehicle-service content (e.g., a repair hint). Another category can track instances of vehicle-service data that are considered to be common to an instance of vehicle-service data classified into the tip-worthy category. The vehicle-service data can be collected from repair orders from a plurality of repair shops. The vehicle-service content gen-
(Continued)

erated by the systems can be provided to those or other repair shops.

21 Claims, 25 Drawing Sheets

Related U.S. Application Data continuation of application No. 15/609,868, filed on May 31, 2017, now Pat. No. 10,453,036, which is a continuation of application No. 14/532,983, filed on Nov. 4, 2014, now Pat. No. 9,672,497.

(60) Provisional application No. 61/899,833, filed on Nov. 4, 2013.

(51) Int. Cl.
*G06F 40/40* (2020.01)
*G06F 40/284* (2020.01)

(56) References Cited

U.S. PATENT DOCUMENTS

| | | | |
|---|---|---|---|
| 6,768,935 | B1 | 7/2004 | Morgan et al. |
| 6,845,307 | B2 | 1/2005 | Rother |
| 6,907,416 | B2 | 6/2005 | Tasooji et al. |
| 7,373,225 | B1 | 5/2008 | Grier et al. |
| 7,373,226 | B1 | 5/2008 | Cancilla et al. |
| 7,551,993 | B1 | 6/2009 | Cancilla et al. |
| 7,765,040 | B2 | 7/2010 | Underdal et al. |
| 7,945,438 | B2 | 5/2011 | Balmelli et al. |
| 7,957,860 | B2 | 6/2011 | Grier et al. |
| 8,145,377 | B2 | 3/2012 | Gilbert |
| 8,296,007 | B2 | 10/2012 | Swaminathan et al. |
| 8,977,423 | B2 | 3/2015 | Merg et al. |
| 9,201,930 | B1 | 12/2015 | Merg |
| 9,477,950 | B2 | 10/2016 | Johnson et al. |
| 9,542,412 | B2 | 1/2017 | Bates-Haus et al. |
| 9,582,944 | B2 | 2/2017 | Merg et al. |
| 9,633,340 | B2 | 4/2017 | Merg |
| 9,672,497 | B1* | 6/2017 | Lewis ............... G06F 40/284 |
| 9,675,497 | B1 | 6/2017 | Levin |
| 9,846,860 | B2 | 12/2017 | Merg et al. |
| 10,013,679 | B1 | 7/2018 | Lewis et al. |
| 10,134,013 | B2 | 11/2018 | Merg et al. |
| 10,157,347 | B1 | 12/2018 | Kasturi et al. |
| 10,453,036 | B1 | 10/2019 | Lewis et al. |
| 11,543,250 | B2* | 1/2023 | Gardiner ............ G06Q 10/0631 |
| 2002/0007237 | A1 | 1/2002 | Phung et al. |
| 2002/0007289 | A1 | 1/2002 | Malin et al. |
| 2002/0138185 | A1 | 9/2002 | Trsar et al. |
| 2003/0004624 | A1 | 1/2003 | Wilson et al. |
| 2003/0195681 | A1 | 10/2003 | Rother |
| 2004/0176885 | A1 | 9/2004 | Quinn |
| 2005/0080606 | A1 | 4/2005 | Ampunan et al. |
| 2005/0085964 | A1 | 4/2005 | Knapp et al. |
| 2006/0106595 | A1 | 5/2006 | Brockett et al. |
| 2006/0106797 | A1 | 5/2006 | Srinivasa et al. |
| 2007/0043487 | A1 | 2/2007 | Krzystofczyk et al. |
| 2008/0004764 | A1 | 1/2008 | Chinnadurai et al. |
| 2008/0243488 | A1 | 10/2008 | Balmelli et al. |
| 2008/0270120 | A1 | 10/2008 | Pestian et al. |
| 2009/0062977 | A1 | 3/2009 | Brighenti |
| 2009/0204237 | A1 | 8/2009 | Sustaeta et al. |
| 2009/0295559 | A1 | 12/2009 | Howell et al. |
| 2010/0063668 | A1 | 3/2010 | Zhang et al. |
| 2010/0293451 | A1 | 11/2010 | Carus |
| 2011/0035094 | A1 | 2/2011 | Van Den Berg et al. |
| 2011/0106562 | A1 | 5/2011 | Gogineni et al. |
| 2011/0106563 | A1 | 5/2011 | Kresl et al. |
| 2011/0112863 | A1 | 5/2011 | Gogineni et al. |
| 2011/0118905 | A1 | 5/2011 | Mylaraswamy et al. |
| 2011/0172874 | A1 | 7/2011 | Patnaik et al. |
| 2011/0238258 | A1 | 9/2011 | Singh et al. |
| 2012/0245791 | A1 | 9/2012 | Yun et al. |
| 2012/0303205 | A1 | 11/2012 | Subramania et al. |
| 2012/0303356 | A1* | 11/2012 | Boyle ................. G06F 16/3338 707/765 |
| 2012/0330869 | A1 | 12/2012 | Durham |
| 2013/0124582 | A1 | 5/2013 | Yamamoto |
| 2013/0290366 | A1* | 10/2013 | Boyle ................. G06F 16/3344 707/767 |
| 2013/0304306 | A1 | 11/2013 | Selkirk et al. |
| 2015/0103170 | A1 | 4/2015 | Nelson et al. |
| 2015/0278241 | A1 | 10/2015 | Bates-Haus et al. |
| 2016/0034857 | A1 | 2/2016 | Merg |
| 2016/0328385 | A1 | 11/2016 | Reiter |
| 2017/0032333 | A1 | 2/2017 | Merg et al. |
| 2017/0075918 | A1 | 3/2017 | Bates-Haus et al. |
| 2018/0068279 | A1 | 3/2018 | Merg et al. |
| 2019/0050825 | A1 | 2/2019 | Merg et al. |
| 2019/0050826 | A1 | 2/2019 | Merg et al. |
| 2020/0013022 | A1 | 1/2020 | Lewis et al. |
| 2021/0042708 | A1* | 2/2021 | Gardiner ............ G06Q 30/0284 |
| 2022/0165104 | A1* | 5/2022 | Gardiner ........ G06Q 10/063112 |

FOREIGN PATENT DOCUMENTS

| | | |
|---|---|---|
| WO | 2013/063232 A2 | 5/2013 |
| WO | 2014/001799 A2 | 1/2014 |

OTHER PUBLICATIONS

U.S. Appl. No. 16/172,759, filed Oct. 27, 2018, inventors: Tilak B. Kasturi, Hieu Ho, and Aniket Dalal.

Consortium on Cognitive Science Instruction, Introduction to Natural Language Processing, downloaded from the World Wide Web at http://www.mind.ilstu.edu/curriculum/protothinker/natural_language_processing.php on Oct. 21, 2013 (32 pages).

Dickinson, Markus, Linguistics 362: Introduction to Natural Language Processing, PowerPoint slides, Jul. 1, 2012 48 pages).

Jain, Anil K., et al., Artificial Neural Networks: A Tutorial, Mar. 1996, IEEE, pp. 31-44 (14 pages).

Jain, Anil K., et al., Data Clustering: A Review, Sep. 1999, ACM Computing Surveys, vol. 31, No. 3, pp. 264-323 (60 pages).

Müller, Tobias Carsten, et al., A Heuristic Approach for Offboard-Diagnostics in Advanced Automotive Systems, SAE World Congress 2009, Apr. 20, 2009, Detroit, MI, SAE Doc. No. 2009-01-1027 (9 pages).

Snap-On Incorporated, ShopKey Pro, Now Even Smarter, to Make Your Shop Look Even Smarter, Apr. 13, 2012 (4 pages).

The Stanford NLP Group, The Stanford Natural Language Processing Group, downloaded from the World Wide Web at http://nlp.stanford.edu/software/index.shtml on Oct. 17, 2014 (3 pages).

The Stanford NLP Group, The Stanford Natural Language Processing Group, Stanford CoreNLP, downloaded from the World Wide Web at http://nlp.stanford.edu/software/corenlp.shtml on Oct. 17, 2014 (8 pages).

* cited by examiner

| Cluster ID | Count | Information |
|---|---|---|
| 1 | 3581 | Complaint: Customer says engine stalls intermittently.<br>Code: P0406<br>Test verb: Unplug EGR valve. Drove car. Engine did not stall.<br>Symptom: SES light on. Engine stalls.<br>Component: EGR Valve<br>Fix Verb: Replaced |
| 2 | 3290 | Complaint: Customer says Service engine soon light on.<br>Code: P0117<br>Test verb: Inspect ECT sensor harness and ECT sensor.<br>Symptom: SES light on. Engine does not idle.<br>Component: ECT Sensor<br>Fix Verb: Replaced |
| 3 | 3467 | Complaint: Customer says Service engine soon light on.<br>Code: P0111, P2183<br>Test verb (1): Inspect IAT sensor.<br>Test verb (2): Inspect ECT sensor.<br>Symptom: SES light on.<br>Component: ECT Sensor<br>Fix Verb: Replaced |

RTR Car Repair, Tuscaloosa, Alabama    February 18, 2013
Customer: C. N. Saban
Vehicle: 2012 Cadillac Escalade, 6.2 L, Automatic Trans.    VIN: 1GYS3BEFXCRXXXXXX
Complaint: Car won't start.  Check engine light on.

| Service/Correction | Time | Rate | Cost | Part Description | Part # | Price |
|---|---|---|---|---|---|---|
| Change oil and filter. | | | | Starter switch | 6012980 | $89.99 |
| | | | | Oil Filter | 6043011 | $19.99 |
| | | | | ECT sensor | 6563772 | $73.99 |
| Check battery condition. (C45) | 0.3 | $100 | $30 | | | |
| Check starter/ignition system. (C117) | 0.5 | $100 | $50 | | | |
| Switch hard to turn.  Replace starter switch. (R458) | 1.0 | $100 | $100 | | | |
| Verify repair.  (V18) | 0.2 | $100 | $20 | | | |
| Change engine oil and filter.  (C085) | 0.5 | $50 | $25 | | | |
| Lubricate chassis.  (C086) | 0.2 | $50 | $10 | | | |
| Check DTC.  Diagnose DTC 117. (C100) | 0.4 | $100 | $40 | | | |
| Coolant sensor short. R/R coolant sensor. (R199) | 0.4 | $100 | $40 | | | |
| Verify repair.  (V18) | 0.2 | $100 | $20 | | | |

Sub-total $183.97
Labor $335.00
Tax $51.90
Total $570.87

FIG. 4

Core: AdaptableModule
Class Diagram

METHOD AND SYSTEM FOR GENERATING VEHICLE SERVICE CONTENT

RELATED APPLICATION

This application is a continuation application of U.S. patent application Ser. No. 16/571,889, which was filed on Sep. 16, 2019 and published on Jan. 9, 2020 as United States Patent Application Publication No. US 2020/0013022 A1. U.S. patent application Ser. No. 16/571,889 is a continuation application of U.S. patent application Ser. No. 15/609,868, which was filed May 31, 2017 and issued on Oct. 22, 2019 as U.S. Pat. 10,453,036 B1. U.S. patent application Ser. No. 15/609,868 is a continuation application of U.S. patent application Ser. No. 14/532,983, which was filed on Nov. 4, 2014 and issued on Jun. 6, 2017 as U.S. Pat. No. 9,672,497 B1. U.S. patent application Ser. No. 14/532,983 claims the benefit of U.S. Provisional Application No. 61/899,833, filed Nov. 4, 2013.

This application incorporates by reference U.S. Provisional Application No. 61/899,833, U.S. patent application Ser. No. 14/532,983, U.S. patent application Ser. No. 15/609,868, U.S. patent application Ser. No. 16/571,889, U.S. Pat. Nos. 9,672,497 B1, 10,453,036 B1, and United States Patent Application Publication No. US 2020/0013022 A1 in their entirety.

U.S. Provisional Application No. 61/899,833 includes aspects recited in U.S. Provisional Application No. 61/899,868, filed Nov. 4, 2013 and entitled "Adaptable systems and methods for processing enterprise data."

U.S. patent application Ser. No. 14/533,085 claims the benefit of U.S. Provisional Application No. 61/899,868. This application incorporates by reference U.S. patent application Ser. No. 14/533,085, which was filed Nov. 4, 2014, entitled "Adaptable Systems and Methods for Processing Enterprise Data," and issued on Dec. 18, 2018 as U.S. Pat. 10,157,347 B1.

BACKGROUND

Unless otherwise indicated herein, the elements described in this section are not prior art to the claims and are not admitted to be prior art by inclusion in this section.

Many products (e.g., televisions, refrigerators and vehicles) have to be repaired from time to time. In many cases, a repair shop prepares a repair order (RO) regarding a product to be repaired. Preferably, the information entered onto an RO is written clearly and is complete. An RO prepared in that manner can be useful for informing a repair technician why repair of the product has been requested, for tracking labor and parts costs associated with repairing the product, and for informing the product owner about the repairs carried out and the various costs associated with those repairs.

Quite often however, the information on an RO is entered using a free-form text field of a service tool or by hand. The information entered using a free-form text field or by hand can include one or more unstructured or non-standard terms, which can be incomplete, unclear, or incomplete and unclear. The reasons for recording an unstructured or non-standard term onto an RO could include but are not limited to poor penmanship, use of improper jargon, incorrect or incomplete understanding of the product and repairs, or rushing to complete the RO.

In some situations, a repair technician can operate more efficiently if he or she is aware of repair information regarding a product the repair technician is repairing. Repair orders (ROs) can be useful for generating repair information. An author of repair information has to put forth more effort and spend more time trying to gain an understanding of an RO with unstructured or non-standard terms as compared to an RO that is written clearly and completely. It is desirable to lessen the burden of authors generating repair tips and other content based on ROs, especially ROs comprising one or more unstructured or non-standard terms.

OVERVIEW

Example embodiments are described herein. In one respect, an example embodiment can take the form of a method comprising: (i) identifying, by a natural language processor, that a computer-readable vehicle RO represents terms of a natural human language that match one or more taxonomy terms within a defined taxonomy searchable by the natural language processor, (ii) associating, by the natural language processor, a meaning with the RO based on the terms of the natural human language represented by the RO that match the one or more taxonomy terms, (iii) generating, by the natural language processor, metadata that represents the meaning associated with the RO, and (iv) providing the metadata to a data processing machine for generating content based at least in part on the metadata.

In another respect, an example embodiment can take the form of a computing device comprising a processor and a computer-readable medium storing program instructions, that when executed by the processor, cause the computing device to perform a set of functions comprising: (i) identifying that a computer-readable vehicle RO represents terms of a natural human language that match one or more taxonomy terms within a defined taxonomy searchable by the processor, (ii) associating, by the processor, a meaning with the RO based on the terms of the natural human language represented by the RO that match the one or more taxonomy terms, (iii) generating, by the processor, metadata that represents the meaning associated with the RO, and (iv) providing the metadata to a data processing machine for generating content based at least in part on the metadata.

In yet another respect, an example embodiment can take the form of a method comprising: (i) storing, by a computer-readable medium, a multi-diagnostic-trouble-code (multi-DTC) rule, (ii) detecting, by a processor, an RO cluster based on an RO that lists two or more diagnostic trouble codes, wherein the multi-DTC rule pertains to the two or more diagnostic trouble codes listed on the RO, (iii) generating, by the processor, a computer-readable vehicle repair tip based on the multi-DTC rule, (iv) storing, by the computer-readable medium, the vehicle repair tip based on the multi-DTC rule, and an indicator that indicates the RO cluster is associated with the vehicle repair tip based on the multi-DTC rule, and (v) providing, from the computer-readable medium, the vehicle repair tip based on the multi-DTC rule to a communication network for transmission to a vehicle service tool.

In yet another respect, an example embodiment can take the form of a computing device comprising a processor and a computer-readable medium storing program instructions, that when executed by the processor, cause a set of functions to be performed, the set of functions comprising: (i) storing, by the computer-readable medium, a multi-DTC rule, (ii) detecting, by the processor, an RO cluster based on an RO that lists two or more diagnostic trouble codes, wherein the multi-DTC rule pertains to the two or more diagnostic trouble codes listed on the RO, (iii) generating, by the processor, a computer-readable vehicle repair tip based on the multi-DTC rule, (iv) storing, by the computer-readable medium, the vehicle repair tip based on the multi-DTC rule, and an indicator that indicates the RO cluster is associated with the vehicle repair tip based on the multi-DTC rule, and (v) providing, from the computer-readable medium, the vehicle repair tip based on the multi-DTC rule to a communication network for transmission to a vehicle service tool.

In yet another respect, an example embodiment can take the form of a method comprising: (i) storing, by a computer-readable medium, a multi-symptom rule, (ii) detecting, by the processor, an RO cluster based on an RO that lists two or more symptoms, wherein the multi-symptom rule pertains to the two or more symptoms listed on the RO, (iii) generating, by the processor, a computer-readable vehicle repair tip based on the multi-symptom rule, (iv) storing, by the computer-readable medium, the vehicle repair tip based on the multi-symptom rule, and an indicator that indicates the RO cluster is associated with the vehicle repair tip based on the multi-symptom rule, and (v) providing, from the computer-readable medium, the vehicle repair tip based on the multi-symptom rule to a communication network for transmission to a vehicle service tool.

In yet another respect, an example embodiment can take the form of a computing device comprising a processor and a computer-readable medium storing program instructions, that when executed by the processor, cause a set of functions to be performed, the set of functions comprising: (i) storing, by the computer-readable medium, a multi-symptom rule, (ii) detecting, by the processor, an RO cluster based on an RO that lists two or more symptoms, wherein the multi-symptom rule pertains to the two or more symptoms listed on the RO, (iii) generating, by the processor, a computer-readable vehicle repair tip based on the multi-symptom rule, (iv) storing, by the computer-readable medium, the vehicle repair tip based on the multi-symptom rule, and an indicator that indicates the RO cluster is associated with the vehicle repair tip based on the multi-symptom rule, and (v) providing, from the computer-readable medium, the vehicle repair tip based on the multi-symptom rule to a communication network for transmission to a vehicle service tool.

In yet another respect, an example embodiment can take the form of a method comprising: (i) identifying, by a processor, that a computer-readable vehicle repair order (RO) includes terms of a natural human language that match one or more taxonomy terms within a defined taxonomy searchable by the processor, (ii) associating, by the processor, a meaning with the RO based on the terms of the RO that match the one or more taxonomy terms, (iii) generating, by the processor, metadata that represents the meaning associated with the RO, and (iv) providing the metadata to a data processing machine for generating content based at least in part on the metadata.

In yet another respect, an example embodiment can take the form of a computing device comprising a processor and a computer-readable medium storing program instructions, that when executed by the processor, cause a set of functions to be performed, the set of functions comprising: (i) identifying, by the processor, that a computer-readable vehicle repair order (RO) includes terms of a natural human language that match one or more taxonomy terms within a defined taxonomy searchable by the processor, (ii) associating, by the processor, a meaning with the RO based on the terms of the RO that match the one or more taxonomy terms, (iii) generating, by the processor, metadata that represents the meaning associated with the RO, and (iv) providing the metadata to a data processing machine for generating content based at least in part on the metadata.

In yet another respect, an example embodiment can take the form of a system comprising: (i) a communications interface configured for communicating over a network with a content distributor data processing machine (DPM), wherein the communications interface is configured to transmit, to the network, a request for vehicle-service content from the content distributor DPM; and wherein the communications interface is configured to receive, from the network, vehicle-service content from the content distributor DPM, and wherein the received vehicle-service content from the content distributor DPM is based on metadata generated by a processor executing a natural language processing module and a machine-learning module, (ii) a display device, (iii) a processor, and (iv) a computer-readable medium including program instructions executable by the processor to cause the display device to display the received vehicle-service content from the content distributor DPM.

In yet another respect, an example embodiment can take the form of a method comprising: (i) processing first vehicle-service data by a processor executing a natural-language processing module, (ii) generating, by the processor, first metadata regarding the first vehicle-service data, (iii) classifying, by the processor, the first metadata as a first cluster within a first category of vehicle-service data clusters, and (iv) generating vehicle-service content based on the first metadata.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the drawings.

FIG. 3 shows a display device displaying metadata in accordance with one or more example embodiments.

FIG. 4 shows an example RO in accordance with one or more example embodiments.

DETAILED DESCRIPTION

I. Introduction

Figure 1:
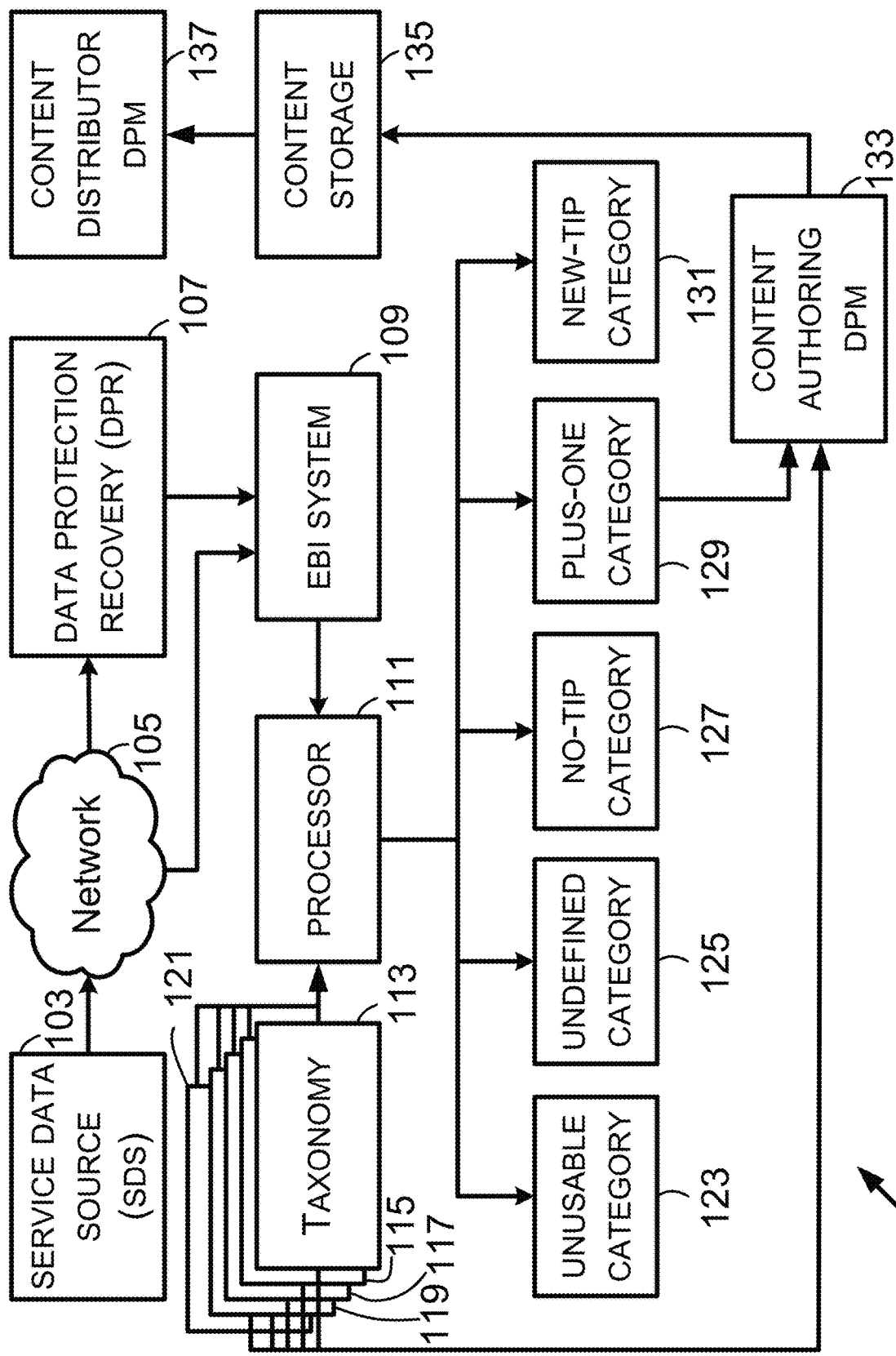
FIG. 1 is a block diagram of an example system in accordance with one or more example embodiments.

This description describes several example embodiments including example embodiments regarding using a processor to process vehicle-service data such as repair orders pertaining to vehicles repaired at a repair shop. In accordance with the example embodiments, processing the vehicle-service data can include, but is not limited to, determining a meaning of the vehicle-service data, generating metadata regarding the vehicle-service data or regarding the meaning of the vehicle-service data, and generating vehicle-service content (e.g., repair information) based, at least in part, on the metadata and a taxonomy defined for use by a system including the processor.

The vehicle-service data can include, for example, data from a repair shop, data from a vehicle manufacturer, data from a vehicle repair technician, or publically-available data, such as non-copyrighted data available on the World Wide Web on the internet or otherwise available. The vehicle-service data can include, for example, data from vehicle repair orders including financial data, parts data, or repair procedures. In alternative embodiments, the vehicle-service data referenced in the described embodiments can be replaced with service data for products other than a vehicle. The vehicle-service data can include vehicle-data captured from a vehicle.

Processing the vehicle-service data can include, but is not limited to, processing any type or types of vehicle-service data described herein. Any of the vehicle-service data processed by the processor can include one or more unstructured or non-standard terms. Processing vehicle-service data including an unstructured or non-standard term can result in determining a meaning of that vehicle-service data. Vehicle-service data can include vehicle-repair data regarding a repair made to fix a vehicle malfunction. Vehicle-service data can include data regarding an occurrence of servicing a vehicle. An unstructured or non-standard term can include a term that is not included within a standard core library associated with a natural language processor.

In this description, the articles "a," "an," or the are used to introduce elements of the example embodiments. The intent of using those articles is that there is one or more of the elements. The intent of using the conjunction "or" within a described list of at least two terms is to indicate any of the listed terms or any combination of the listed terms. The use of ordinal numbers such as "first," "second," "third" and so on is to distinguish respective elements rather than to denote a particular order of those elements. The use of ordinal numbers written with a number, such as $1^{st}$ and $2^{nd}$, are used to denote a particular order. A list of abbreviations and acronyms used in this description is located in section XI of this description.

For purposes of this description, a vehicle can include, but is not limited to, an automobile, a motorcycle, a semi-tractor, a light-duty truck, a medium-duty truck, a heavy-duty truck, a farm machine, a boat, a ship, a generator, or an airplane. A vehicle can include or use any appropriate voltage or current source, such as a battery, an alternator, a fuel cell, and the like, providing any appropriate current or voltage, such as about 12 volts, about 42 volts, and the like. A vehicle can include or use any desired system or engine. Those systems or engines can comprise items that use fossil fuels, such as gasoline, natural gas, propane, and the like, electricity, such as that generated by a battery, magneto, fuel cell, solar cell and the like, wind and hybrids or combinations thereof. The example embodiments can carry out a variety of functions, including functions for generating vehicle-service content useful when repairing a vehicle. The example embodiments refer to vehicle-service data. The example embodiments are applicable to service data for products other than vehicles as well. In other words, for example, the phrases vehicle-service data, vehicle RO, vehicle repair content, and vehicle-service content discussed with respect to the example embodiments could be written as service data, RO, repair content, and service content, respectively, with respect to other embodiments.

For purposes of this description, a "term" can include, but is not limited to, one or more words, one or more numbers, or one or more symbols. A taxonomy can include one or more terms.

The block diagrams, GUI, and flow charts shown in the figures are provided merely as examples and are not intended to be limiting. Many of the elements illustrated in the figures or described herein are structural elements that can be implemented as discrete or distributed components or in conjunction with other components, and in any suitable combination, system, or location. Those skilled in the art will appreciate that other arrangements and elements (e.g., machines, interfaces, functions, orders, or groupings of functions) can be used instead. Furthermore, various functions described as being performed by one or more elements can be carried out by a processor executing computer-readable program instructions or by any combination of hardware, firmware, or software.

II. Example Systems, Machines, and Modules

A. Example System

FIG. 1 illustrates an example system 101 for producing content based, at least in part, on vehicle-service data provided by a service data source (SDS) 103. System 101 can include multiple service data sources arranged like SDS 103 or otherwise, but FIG. 1 only shows one SDS for simplicity of the figure. The content produced by system 101 can include computer-readable content. The computer-readable content can be stored in a computer-readable medium, transmitted across a communications network, or displayed by a display device, but the computer-readable content is not so limited.

SDS 103 can include a data processing machine (DPM) that connects to a network 105 for transmitting service data over network 105. A DPM can include, for example, a desktop computer, such as an HP Pro 3550 from Hewlett-Packard® Company, Palo Alto, Calif., a server device, such as an HP ProLiant DL900 server from the Hewlett-Packard® Company, or server program logic executable by a processor. The DPM of SDS 103 can be configured like DPM 201 shown in FIG. 2.

SDS 103 can be located at any of a variety of locations. For example, SDS 103 can be located at a vehicle repair shop, such as an independent repair shop or a franchisee repair shop of a national chain of repair shops that repair vehicle brakes, vehicle transmission, or any other vehicle part or system. As another example, SDS 103 can be located at a vehicle manufacturer location of any North American vehicle manufacturer.

SDS 103 can provide various types of service data, such as, vehicle-service data or, more generally, service data regarding a product other than a vehicle, such as a television or a refrigerator. Many of the example embodiments are discussed with respect to vehicle-service data, but are equally applicable to other types of service data or to a combination of two more types of service data. The service data provided by SDS 103 can include textual and numeric data. The service data provided by SDS 103 can include computer-readable data, such as computer-readable data representing textual and numeric data. Vehicle-service data can comprise vehicle-data from a vehicle. Vehicle-data can be arranged according to any of a variety of protocols, such as the Society of Automotive Engineers (SAE) J1708, J1850 or J1939 protocol, the International Organization for Standardization (ISO) 14230 protocol (also known as the Keyword Protocol 2000 protocol), the Controller Area Network (CAN) protocol, or some other protocol by which electronic control units (ECU) in any vehicle system (e.g., an engine system, a brakes system, an infotainment system, an entertainment system, a body system, a heating, ventilation and air conditioning system, or a powertrain system) in a vehicle to communicate with each other or with a vehicle service tool. The vehicle-service data can include computer-readable data that the vehicle service tool generated from an electronic representation of the vehicle-service data that the vehicle service tool received from a vehicle.

Additionally or alternatively, vehicle-service data can comprise data, other than vehicle-data, regarding the vehicle. This data regarding the vehicle can include data from an RO generated by a repair shop, a technical service bulletin, a vehicle campaign bulletin, cost information, a social media website, other websites, or some other source of data regarding a vehicle.

The vehicle-service data from a social media website could include vehicle-service data from an electronic technician notebook stored in the cloud (e.g., stored on a server or computer-readable medium that is connected to or part of network 105). Vehicle-service data from the electronic technician notebook can include vehicle-data a repair technician collected while working on vehicles, notes, tips, photographs, images, audio recording, or video recordings the technician recorded to the notebook while or after working on vehicles. At least some of those items recorded within the notebook may not have been recorded on an RO. Some or all of the vehicle-service data not recorded on an RO can be associated with an RO for subsequent review or processing with respect to the associated RO. Other types of vehicle-service data could be stored by the electronic technician notebook.

Network 105 can include at least a portion one or more interconnected computer networks. As an example, one of the interconnected computer networks can include a network that uses the Transmission Control Protocol/Internet Protocol (TCP/IP) (e.g., the Internet). As another example, one of the interconnected computer networks can include a wide area network (WAN), a local area network (LAN), a personal area network (PAN), a wireless network, a non-wireless network or some other type of network. System 101 can include other elements, such as a modem, a router, a firewall, a gateway, or a switch, for carrying out communications between the various elements of system 101. Those other elements are not shown to keep FIG. 1 simple.

Figure 2:
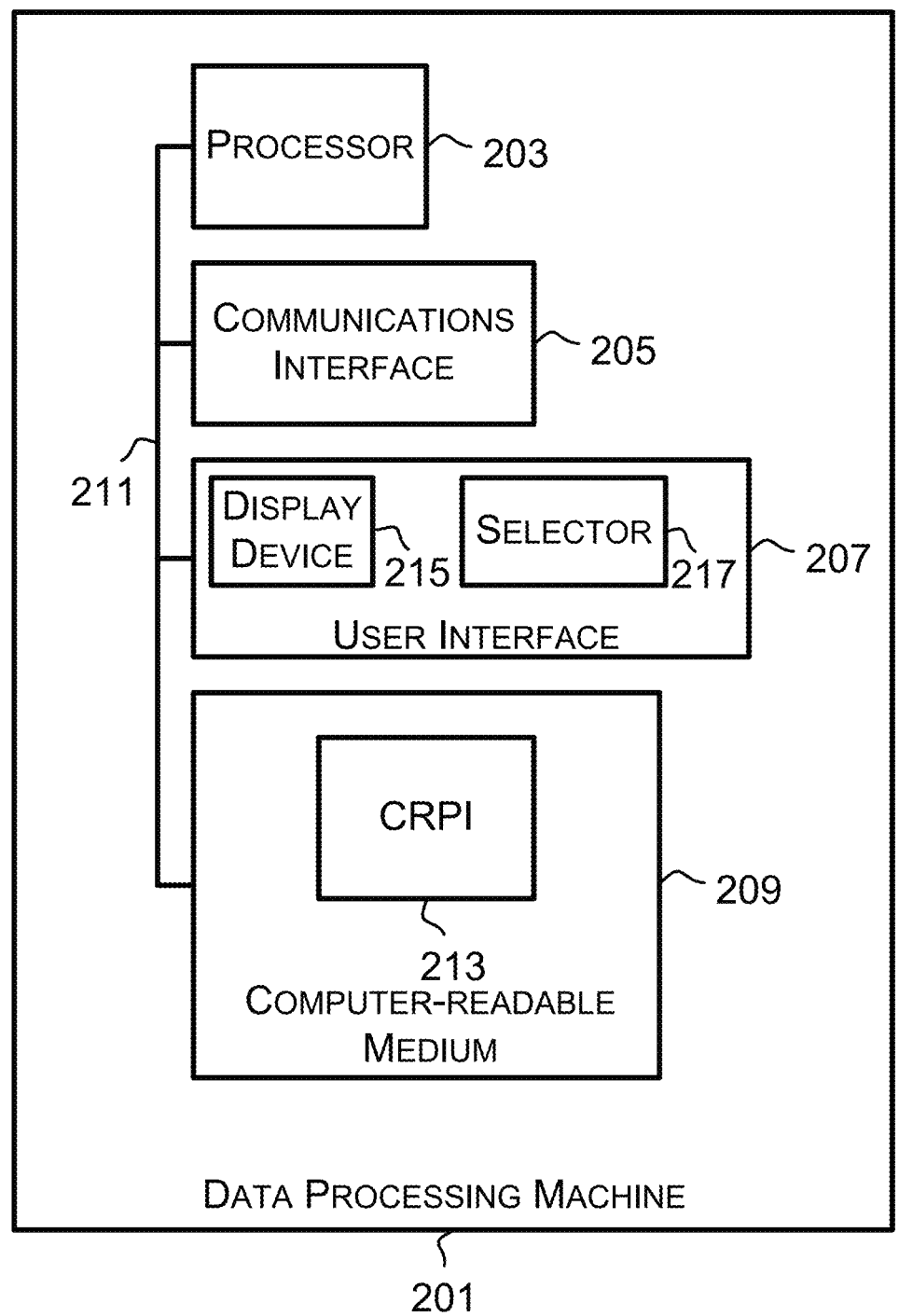
FIG. 2 is a block diagram of a data processing machine in accordance with one or more example embodiments.

Data protection recovery (DPR) 107 is a device or system that can perform various operations. For example, a communications interface of the DPR 107 can receive or retrieve service data from SDS 103 or from one or more other service data sources. A computer-readable medium of the DPR 107 can store service data received from one or more service data sources. In that way, DPR 107 can back up an SDS and provide stored data back to that SDS in case that the SDS needs its service data restored locally (e.g., due to damage, loss or theft of the service data). DPR 107 can comprise one or more computer-readable mediums and one or more processors to carry out the operations of DPR 107. DPR 107 can be configured like DPM 201, as shown in FIG. 2, or include one or more devices configured like DPM 201.

Experienced-based information (EBI) system 109 can comprise a communications interface to interface to DPR 107 to receive or retrieve service data from DPR 107. EBI system 109 can include one or more computer-readable mediums for storing service data to be processed by a processor 111. In accordance with an example in which service data received by DPR 107 includes repair orders, EBI system 109 may receive or retrieve a large quantity (e.g., 500,000 or more) of repair orders from DPR 107 during a single month. EBI system 109 can be configured to store service data at least until the service data is provided to processor 111.

A communications interface of the EBI system 109 can interface to DPR 107 by way of network 105. EBI system 109 can interface to other devices that are connected to or are part of network 105. As an example, those other devices can include SDS 103, a service tool (see, FIG. 5), or a server or computer-readable medium that stores an electronic technician's notebook.

EBI system 109 or another element of system 100 can receive a recording (e.g., an audio recording or a video recording) from an electronic technician notebook, a service tool, or another device. EBI system 109 can be configured to convert a recording into textual content (e.g., text, numbers, or text and numbers) that can be processed by a processor using a natural language module or a machine-learning module. As an example, EBI system 109 can be configured to convert an audio recording or a video recording into textual content. Additionally or alternatively, EBI system 109 can be configured to perform an optical character recognition (OCR) process on a photograph or image to recognize textual content that can be processed by a processor using a natural language module or a machine-learning module.

Processor 111 can include one or more general purpose processors (e.g., INTEL single core microprocessors or INTEL multicore microprocessors) or one or more special purpose processors (e.g., digital signal processors or a natural language processor (NLP)). Details regarding an NLP are located in section II, part C, of this description and in other portions of this description. Processor 111 can be located within in an enclosure alone or along with other components. As an example, the other components can include a power supply, a network interface card, a cooling fan, a computer-readable medium, or some other component. As another example, the other component can include one or more of the other elements shown in FIG. 1. The enclosure including the processor and other component(s) can be configured as a desktop computer, a server device, a DPM or some other computing device.

Processor 111 can include a natural language processing stack to process service data that EBI system 109 receives from DPR 107. A natural language processing stack can include one or more of the following stages: sentence segmentation, word tokenization, part of speech (POS) tagging, grammar parsing, and understanding. The understanding can include a relation understanding or fact extraction. Understanding vehicle-service data, such as an RO, can result in processor 111 determining a meaning of the vehicle-service data. Processor 111 or the natural language processing stack thereof can categorize vehicle-service data provided to processor 111 from EBI system 109 and can generate metadata based on or to represent the meaning of the vehicle-service data.

Processor 111 can search or refer to a taxonomy of terms to identify a taxonomy term that matches a term within the vehicle-service data, such as an RO. A term in a taxonomy of terms or a term within the vehicle-service data can include one or more words, abbreviations, acronyms, or numbers, or some other portion of a natural language that can be classified as a term. A term in a taxonomy can be designated as a standard term. One or more non-standard terms can be associated with a standard term. A non-standard term can be a synonym, an abbreviation, or alternative spelling of its associated standard term. Alternative spellings can include misspelled terms.

Processor 111, or another processor described herein, can execute the Stanford Core natural language processing program instructions, which are written in Java, and which have been translated into other programming languages including, but not limited to Python, Ruby, Perl, and Javascript. Execution of the Stanford Core program instructions can include referring to a standard dictionary such as, but not limited to, a standard corpus dictionary or a Stanford noun dictionary. Processor 111 can include a 32-bit processor or a 64-bit processor. Processor 111 can execute CRPI to function as an engine such as, but not limited to, a core engine or any other engine described herein.

FIG. 1 shows taxonomies 113, 115, 117, 119, and 121 (hereinafter, "taxonomies 113-121"). Taxonomy 113 can be a taxonomy for labor terms, such as but not limited to remove, replace, adjust, lubricate, clean, refinish, repair, splice, solder, connect, reconnect, fill, drain, balance, and inspect. Other examples of labor terms included within taxonomy 113 are also possible. One or more terms in at least one of the taxonomies 113-121 can be a term that is not included in one of the standard dictionaries used by processor 111. The taxonomy including that one or more terms, or that one or more terms, can augment a standard dictionary used by processor 111.

Taxonomy 115 can be a taxonomy for vehicle part names, such as but not limited to alternator, oxygen sensor, engine, mass air flow sensor, or any other vehicle part name. Other examples of parts names that can be included within taxonomy 115 are also possible. Taxonomy 115 can be referred to as a "parts taxonomy." For other types of enterprise data, a parts taxonomy can pertain to parts of a product associated with the other type of enterprise data, such as refrigerator parts for enterprise data pertaining to refrigerators.

Taxonomy 117 can be a taxonomy for symptom terms such as, but not limited to, hesitates, dies, cold, hot, won't start, or some other term that describes a symptom that can be exhibited by a vehicle or perceived by a person in, at, or proximate to a vehicle (i.e., a vehicle symptom). A symptom term can include or be based on a complaint by a person (e.g., a customer complaint). Other examples of symptom terms that pertain to servicing a vehicle and included within taxonomy 117 are also possible.

Taxonomy 119 can be a taxonomy for test terms, such as but not limited to test, try, manipulate, check, inspect, test-drive, measure, scan, connect a test tool, inspect waveform, pressure test, circuit test, listen, visually inspect, smell, and feel. The taxonomy for test terms can also include terms in regard to verifying success in making a repair or performing some other labor operation, such as, but not limited to, verify, repair successful, and fault did not occur again. The taxonomy for test terms can pertain to servicing a vehicle. Other examples of test terms that can be included within taxonomy 119 are also possible.

Taxonomy 121 can be a taxonomy for part failure mode terms. A part failure mode term can indicate a reason why the part failed and had to be replaced. As an example, taxonomy 121 can include terms such as but not limited to leaky, broken, missing, bent, damaged, cut, burned, out-of-specification, worn, unsafe, and stuck. The taxonomy for part failure mode terms can pertain to the failure mode of vehicle parts. Other examples of part failure mode terms that can be included within taxonomy 121 are also possible.

A taxonomy can include multiple standard terms and one or more non-standard terms associated with one of the standard terms of that taxonomy. As an example, taxonomy 117 can include 'ECT Sensor' as a standard term and the following non-standard terms associated with that standard terms: (i) engine coolant temperature sensor, (ii) coolant temp. sensor, and (iii) coolant temperature sensor. Upon or in response to detecting the vehicle-service data states or includes that standard term or one of those non-standard terms, processor 111 can select the standard term (i.e., ECT sensor) for defining a meaning of the vehicle-service data. Processor 111 can select standard terms from other taxonomies for further defining the meaning of the vehicle-service data. One or more other taxonomies can be defined for system 101 and the other systems described herein.

A term within a taxonomy can be added by a human being or by a processor. As an example, processor 111 can add a non-standard term to a taxonomy. For instance, an RO can include a term listed as 'eng. coolant temp. sensor' and processor 111 can execute machine-learning computer-readable program instructions (CRPI) to determine that eng. coolant temp. sensor refers to an ECT sensor and then add 'eng. coolant temp. sensor' as a non-standard term associated with the standard term 'ECT sensor.' Processor 111 can refer to other data on the RO, such as a labor operation code or a part number, to determine that a non-standard term refers to a standard term within a taxonomy. Processor 111 can provide an alert that indicates a new term has been added to a taxonomy so that a human can confirm adding the new term to the taxonomy is appropriate.

Processor 111 can analyze the content of vehicle-service data (e.g., an RO) to extract various facts from the vehicle-service data. As an example, for an RO pertaining to a vehicle, processor 111 can extract from the RO facts regarding a Year/Make/Model (YMM), a Year/Make/Model/Engine (YMME), a Year/Make/Model/Engine/System that define the vehicle, or a vehicle identification number (VIN) particular to the vehicle. Other examples of facts processor 111 can extract from the RO include a geographic location of a vehicle repair shop, a labor operation code (LOC), a diagnostic trouble code (DTC) set by an ECU in the vehicle, and a part name of a part replaced or repaired on the vehicle.

Processor 111 can associate a meaning of vehicle-service data (e.g., an RO) based on terms of the vehicle-service data that match terms in the taxonomies, 113, 115, 117, 119, and 121. Processor 111 can generate metadata that represents the meaning of the vehicle-service data and then cluster the metadata into a category based on the meaning of the vehicle-service data. The vehicle-service data can include a non-standard term in a taxonomy and the metadata that represents the meaning of the vehicle-service data can include a standard taxonomy term defined for the non-standard term.

FIG. 1 shows five categories for categorizing the metadata (e.g., a cluster of metadata) associated with the vehicle-service data (e.g., an RO). Those categories include an unusable category 123, an undefined category 125, a no-tip category 127, a plus-one category 129, and a new-tip category 131. Those five categories can be used for categorizing the metadata regarding the vehicle-service data or ROs. System 101 can include one or more other categories for categorizing the metadata regarding vehicle-service data in the form of an RO or for other types of service data.

In accordance with the example embodiments, the original repairs order or other original vehicle-service data retrieved from DPR 107 or otherwise obtained over network 105 can be stored (e.g., returned for storage) by EBI system 109. Each repair order stored in EBI system 109 can be associated with a unique repair order identifier (e.g., an RO number). As an example, the RO identifier can be established by an enterprise that maintains, operates, owns, or houses DPR 107. As another example, the RO identifier can be established by an enterprise that that maintains, operates, owns, or houses EBI system 109. The metadata associated with an RO or an RO cluster based on that RO can be associated with the RO identifier associated with that same RO. Similarly other types of vehicle-service data can be associated with a unique identifier of the vehicle-service data.

Repair orders or other vehicle-service data that are unreadable by processor 111 can be categorized into unusable category 123. Repair orders or other vehicle-service data that are readable by processor 111, but are not categorized into another defined category can be categorized into undefined category 125. Repair orders or other vehicle-service data that are readable by processor 111, but that do not contain service data deemed to be tip-worthy can be categorized into no-tip category 127. Repair orders or other vehicle-service data that are readable by processor 111 and that contain service data deemed to be tip-worthy, but for which a repair content regarding the subject matter of the service data has already been written, can be categorized into plus-one category 129. Repair orders or other vehicle-service data that are readable by processor 111 and that contain service data deemed to be tip-worthy, but for which a repair content regarding the subject matter of the service has not yet been written, can be categorized into new-tip category 131.

Program instructions, when executed by processor 111, can cause processor 111 to determine whether or not service data is deemed to be tip-worthy. Those program instructions can be written based on data indicating what types of tips have been requested or looked at in the past or based on a level of experience, skill, or knowledge typically required to carry out various service procedures. Service data pertaining to service procedures requiring relatively low level of experience, skill or knowledge can be considered to not be tip-worthy (in other words, the service data is non-tip-worthy data). On the other hand, service data pertaining to tasks requiring relatively high level of experience, skill or knowledge or for service data pertaining to unusual circumstances can be considered to be tip-worthy data.

As an example, if an RO pertains to replacement of a vehicle air filter (a relatively simple repair service) occurring at a manufacturer-specified replacement interval, the RO can be deemed to include non-tip-worthy data. On the other hand, if the RO pertains to replacement of a vehicle air filter because of an unusual defect in a batch of air filters by a particular manufacturer, the RO can be deemed to include tip-worthy data due to the unusual defect.

In the event a given repair order or vehicle-service data is categorized into new-tip category 131 and processor 111 subsequently identifies one or more other repair orders or instances of vehicle-service data that contain service data for a subject matter similar to the given repair order or vehicle-service data prior to plus-one category 129 having a cluster for the one or more other repair orders or instances of vehicle-service data, the one or more other repair orders or vehicle-service data can be categorized into new-tip category 131. Alternatively, a new cluster regarding the subject matter of the given repair order or vehicle-service data can be generated within plus-one category 129 and those one or more other repair orders and instances of vehicle-service data can be categorized into plus-one category 129. The metadata for an RO or vehicle-service data can define a new cluster of RO or can match the metadata that was used to generate an existing cluster of RO.

Figure 5:
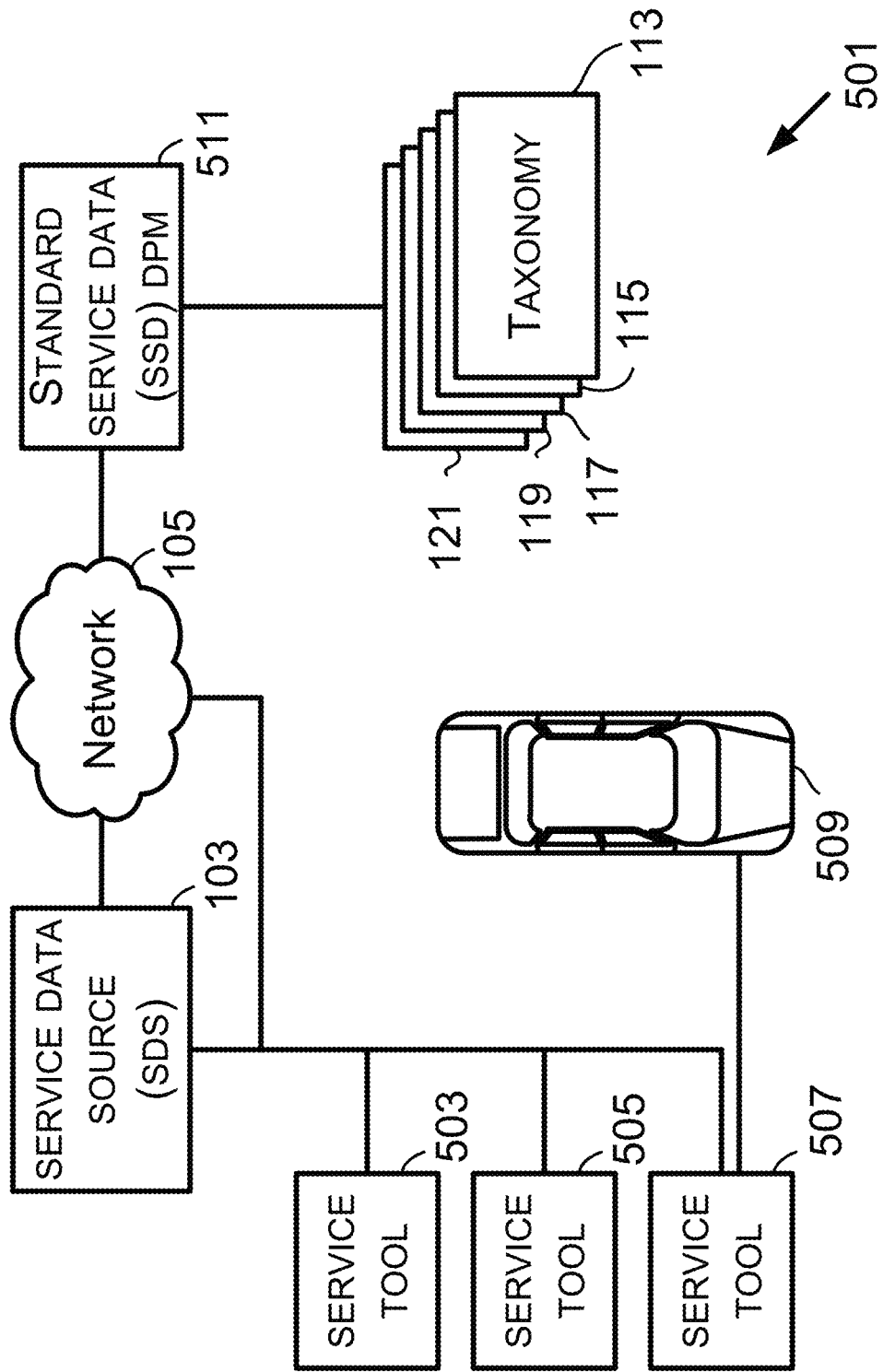
FIG. 5 is a block diagram of an example system in accordance with one or more example embodiments.

System 101 includes a content authoring DPM 133, a content storage 135 to store content authored using content authoring DPM 133, and a content distributor DPM 137 to distribute content from content storage 135 to a content request device (e.g., service tool 503, 505, or 507 shown in FIG. 5). The content request device can be a repair tool being used at a repair shop. As an example, the repair tool can comprise a data processing machine (DPM) executing the PRODEMAND™ product from Mitchell Repair Information Company, LLC, Poway, Calif.

The lines between the various elements in FIG. 1 have a single arrow head to show an example process flow for generating content from or based on the service data provided by SDS 103. One or more of the elements in FIG. 1 can communicate with another element shown in FIG. 1 even though FIG. 1 does not show a line between those elements. Moreover, bidirectional communications may occur between two or more of the elements shown in FIG. 1.

In accordance with the example embodiments, a first enterprise can maintain, operate, own, or house DPR 107, and a second enterprise can maintain, operate, own, or house EBI system 109, processor 111, taxonomies 113, 115, 117, 119, and 121, categories 123, 127, 129, and 131, content authoring DPM 133, content storage 135, and content distributor DPM 137. EBI system 109 and content storage 135 can be configured as an integrated computer-readable medium or two or more distributed computer-readable medium. One or both of EBI system 109 and content storage 135 can comprise and be referred to as a computer-readable medium. The taxonomies 113-121 and the categories 123, 127, 129, and 131 can be stored on a computer-readable medium, such as the content storage 135 or another computer-readable medium.

B. Example Data Processing Machine

Next, FIG. 2 is a block diagram of an example data processing machine (DPM) 201 in accordance with one or more of the example embodiments described herein. As shown in FIG. 2, DPM 201 includes a processor 203, a communications interface 205, a user interface 207, and a computer readable medium 209, two or more of which can be linked together via a system bus, network, or other connection mechanism 211. One or more of SDS 103, DPR 107, EBI system 109, content authoring DPM 133, and content distributor DPM 137 can be configured like DPM 201.

A processor, such as processor 203, can comprise one or more general purpose processors (e.g., INTEL single core microprocessors or INTEL multicore microprocessors) or one or more special purpose processors (e.g., digital signal processors). Processor 203 is operable to execute computer-readable program instructions, such as computer-readable program instructions (CRPI) 213.

Communications interface 205 can comprise one or more interfaces (e.g., an interface to the Internet, an interface to a LAN, or an interface to a system bus within a personal computer). Communications interface 205 can comprise a wireless network interface or a wired network interface. Communications interface 205 can comprise a network interface card, such an Ethernet interface card, or a wireless network card, such as a WiFi network card.

Communications interface 205 can be configured to transmit data across connection mechanism 211, receive data transmitted across connection mechanism 211, transmit data across a network link, and receive data transmitted across a network link. Communications interface 205 of one DPM can interface to the communications interface of another DPM. Interfacing to any of other DPM can include transmitting data to the other DPM and receiving data transmitted from the other DPM.

User interface 207 can comprise one or more user interface elements by which a user can input data or cause data to be input into DPM 201. Those elements for inputting data can include, e.g., a selector 217, such as a QWERTY keyboard, a computer mouse, or a touch screen. Additionally or alternatively, the user interface elements for inputting data can include speech recognition circuitry and a microphone.

User interface 207 can also comprise one or more user interface elements by which data can be presented to one or more users. Those elements for presenting data to a user can include, e.g., a display device 215, a GUI, or an audible speaker.

A computer-readable medium, such as computer readable medium 209 or any other computer-readable medium discussed herein, can include a non-transitory computer-readable medium readable by a processor, such as processor 203. A computer-readable medium can include volatile or non-volatile storage components such as, but not limited to, optical, magnetic, organic or other memory or disc storage, which can be integrated in whole or in part with a processor, or which can be separate from a processor. A computer-readable medium can include, but is not limited to, a random-access memory (RAM), a read-only memory (ROM), a programmable read-only memory (PROM), an erasable programmable read-only memory (EPROM), an electrically erasable programmable read-only memory (EEPROM), a compact disk read-only memory (CD-ROM), or any other device that is capable of providing data or executable instructions that may be accessed by a processor, such as the processor 203. A computer-readable medium can be referred to by other terms such as, but not limited to, a "computer-readable storage medium," a "data storage device," a "memory device," a "memory," or a "content storage." FIG. 2 illustrates that computer readable medium 209 comprises CRPI 213.

Additionally or alternatively, a computer-readable medium, such as computer-readable medium 209 or any other computer-readable medium disclosed herein, can include a transitory computer-readable medium. The transitory computer-readable medium can include, but is not limited to, a communications medium such as a digital or analog communications medium (e.g., a fiber optic cable, a waveguide, a wired communication link, or a wireless communication link).

Next, FIG. 3 shows an example of metadata 301 for three RO clusters. The metadata for each RO cluster includes a cluster identifier (ID), a count for each RO cluster, and information for each RO cluster. The count for each cluster can be based, at least in part, on data within the plus-one category 129. For example, the count for an RO cluster can equal the quantity of RO counted for the RO cluster, by the plus-one category 129, plus-one for the initial RO of the cluster classified into new-tip category 131. The information for each RO cluster can be used to author a repair hint using, at least in part, one or more standard terms from the taxonomies 113, 115, 117, 119, and 121.

The metadata (e.g., the information in or associated with an RO cluster) can include multiple items for each type of information. For instance, RO cluster number 3 includes two diagnostic trouble codes, namely P0111 (e.g., Intake Air Temperature (IAT) circuit range/performance problem) and P2183 (e.g., ECT sensor 2 circuit range/performance problem), and two test verbs or test terms, namely inspect IAT sensor and inspect ECT sensor. FIG. 3 shows that the metadata can be configured in multiple ways to show multiple items for each type of information (e.g., a list, as in the case of P-codes, and separate line items, as in the case of test verbs).

An RO cluster and the count of RO for that RO cluster can pertain to various types of vehicles. In some cases, each type of vehicle can be defined by a Year/Make/Model (YMM), a Year/Make/Model/Engine (YMME), or a Year/Make/Model/Engine/System. Each type of vehicle could be identified in some other manner as well. As an example, an RO cluster can pertain to 17 different vehicle types base on ROs processed for the 17 different vehicle types. Vehicle-service content (e.g., a repair hint) generated using the metadata for the RO cluster can be associated with each of the 17 different vehicle types. Moreover, some vehicle types are substantially similar to one another such that, using vehicle leveraging, the vehicle-service content associated with each of the 17 different vehicle types can be associated with other vehicle types that are substantially similar to any of the 17 different vehicle types. For example, a vehicle make and model called the Chevrolet Tahoe is substantially similar to a vehicle make and model called the General Motors Corporation (GMC) Yukon. A repair tip written for a given model year Chevrolet Tahoe can be associated with the given model year of GMC Yukons even though the system has not processed any repair orders for a GMC Yukon.

A display device, such as a display device 215 of a DPM (such as content authoring DPM 133), can display the metadata 301 or some portion thereof. The RO clusters identified by metadata 301 can include an RO cluster identifier by processor 111.

C. Natural Language Processing and Machine-Learning Modules

1. Introduction

This section describes, among other things, adaptable systems and methods for processing enterprise data, and adaptable machine learning systems and methods for processing and utilizing enterprise data. One or more example embodiments described herein can improve utility of enterprise data by modeling data into features applicable to enterprise context and using the model to drive classification and clustering of data. Enterprise context can be, for example, service repair data, customer transactional data, server performance data, or various other types of data applicable to an enterprise or an industry, or a particular service or application within an enterprise or industry. In one or more example embodiments, knowledge of a domain expert may be applied and incorporated into applications and methods for building enterprise context for data.

In some embodiments, a system for processing enterprise data is configured to receive and analyze data from various data sources to create a domain-specific model and provide enriched results. The system may include a data extraction and consumption (DEC) module to translate domain specific data into defined abstractions, breaking it down for consumption by a feature extraction engine. A core engine, which may include a number of machine learning modules, such as a feature extraction engine, a classifier and a clusterer, analyzes the data stream and stores metadata that may be used to produce and provide real-time query results to client systems via various interfaces. A learning engine incrementally and dynamically updates the training data for the machine learning by consuming and processing validation or feedback data. The system includes a data viewer and a services layer that exposes the enriched data results. The system is scalable to support a wide range of enterprise domain.

Diagnostic data can be generated continuously over various periods of time for small to large devices and machines to enable troubleshooting and repair. As an implication, the service industry is heavily impacted by this turnaround time. The diagnostic tools used for troubleshooting generate large volume of information that can be analyzed using systems and methods described herein to assist in more effective troubleshooting. Some system tools may be accessed by a customer (e.g., as in case of computers or information technology) or a non-domain expert engineer. This diagnostic information may come to the data center with human observations/analysis and so with human errors.

Historical analysis of data obtained from diagnostic tools or connected devices, e.g., using an instance clustering strategy, may facilitate identification of the most prominent data features and a set of clusters. Each cluster may represent a defect, its cause and symptoms. This may further extended to recommend corrective action to be taken based on historical observations. Such a clustering strategy may use domain-specific feature extraction, which may include:

Regular Expression Extraction: Defining regular expression for identification of diagnostic codes which are generated by diagnostic devices (e.g., an ECU);

Custom taxonomy feature extraction: Extracting the most common set of parts associated with a vehicle or machine under consideration, and also the list of symptoms. Since the same vehicle part may be referenced using different terms, synonym lists are provided against these taxonomies; or Natural language process feature extraction: In case diagnostic data is edited by humans then often it would have further pointers towards cause and correction discussed using natural language. This may include extracting prominent verbs, nouns phrases and using them as a feature.

2. Example System to Process and Use Enterprise Data

FIG. 11 to FIG. 25 of this application in sequence correspond and are substantially similar, but not identical, to FIG. 1 to FIG. 15 in sequence of U.S. Provisional Application No. 61/899,833 which is entitled "Adaptable systems and methods for processing enterprise data" and was filed on Nov. 4, 2013.

Figure 11:
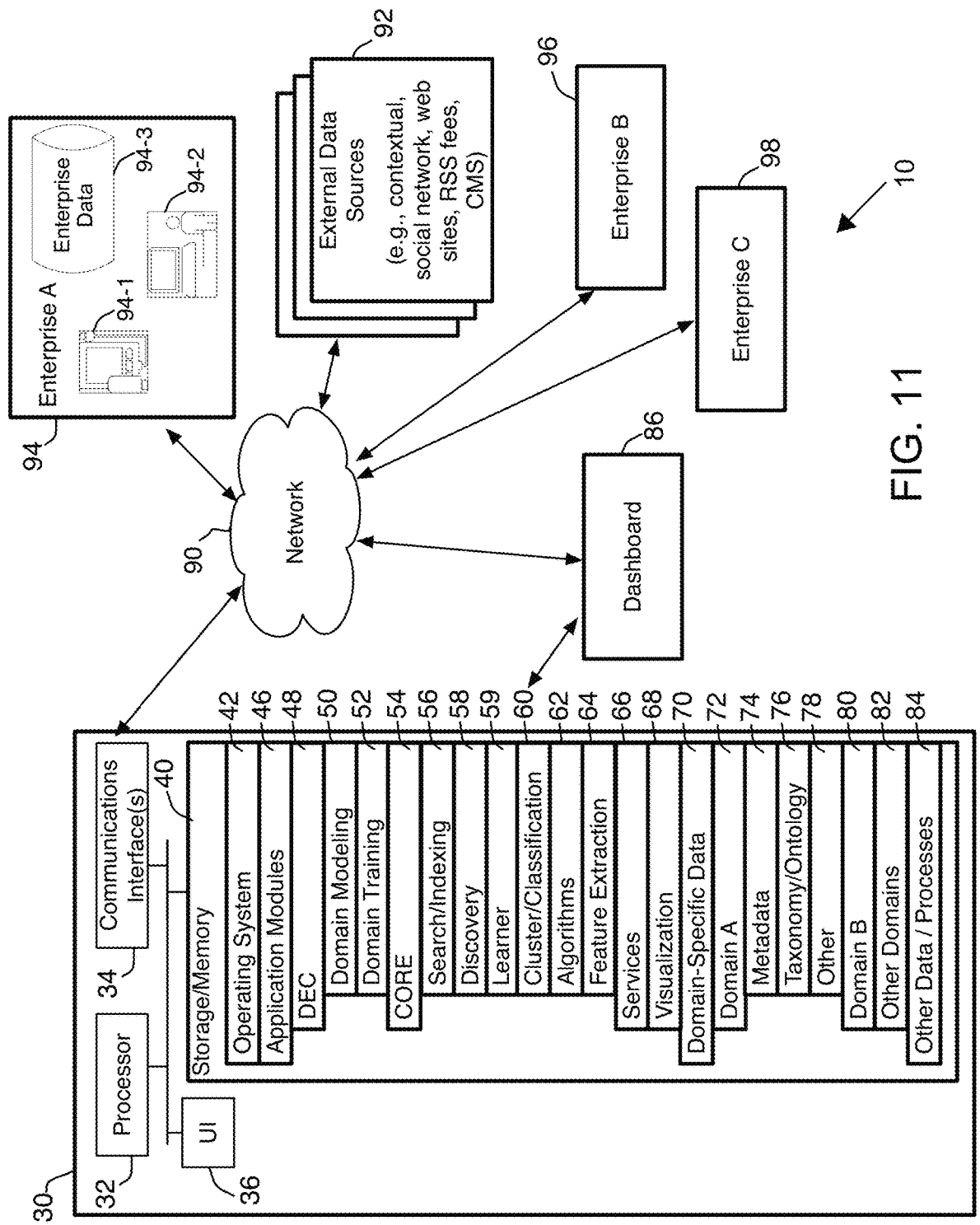
FIG. 11 is a schematic illustration of the architecture of a system for processing enterprise data in accordance with an example embodiment.

Referring to FIG. 11, in some embodiments, a system 10 for processing and utilizing enterprise data may include a system 30, which may communicate over a network 90 with one or more enterprise systems 94, 96, 98 and external data sources 92 (including web sites, social networking sites, and contextual databases). System 30 may be used to model data from an enterprise (e.g., enterprise data 94-3) into features applicable to enterprise context and uses the model to drive classification and clustering of data. Enterprise context can be a service repair data, customer transactional data, server performance data. Networks 90 and 105 described herein can be the same or different networks.

System 30 may be server-based as shown in FIG. 11, or may comprise multiple distributed servers or cloud-based servers or services. In an example embodiment, system 30 includes at least one processor or central processing unit (CPU) 32, a user interface module 36, and a communication or network interface 34 for communicating with other computers or systems over a network 90, and data storage 40, two or more of which may be physically or communicatively linked together via a system bus, network, or other connection mechanism.

Generally, user interface module 36 is configured to send data to and/or receive data from external user input/output devices. For example, user interface module 36 can be configured to send data to and receive data from user input devices such as a keyboard, a keypad, a touch screen, a computer mouse, a track ball, a joystick, a camera, a voice recognition module, or other similar devices. User interface module 36 can also be configured to provide output to user display devices, such as one or more cathode ray tubes (CRT), liquid crystal displays (LCD), light emitting diodes (LEDs), displays using digital light processing (DLP) technology, printers, light bulbs, or other similar devices, either now known or later developed. User interface module 36 can also be configured to generate audible output(s) through device(s) such as a speaker, speaker jack, audio output port, audio output device, earphones, telephone ringers, or other similar devices. In some embodiments, user interface module 36 can be configured to provide haptic or tactile feedback using one or more vibration devices, tactile sensors, actuators including haptic actuators, tactile touchpads, piezo-haptic devices, piezo-haptic drivers, or other similar devices.

Communications interface 34 can include one or more wired or wireless interfaces that are configurable to communicate via a network, such as network 90. Wireless interfaces can include one or more wireless transmitters, receivers, or transceivers, such as a Bluetooth transceiver, a Zigbee transceiver, a Wi-Fi transceiver, a WiMAX transceiver, or another type of wireless transceiver configurable to communicate via a wireless network. Wired interfaces can include one or more wireline transmitters, receivers, or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wired network Processor 32 can include one or more general purpose processors or one or more special purpose processors (e.g., digital signal processors, application specific integrated circuits, etc.). Processors 32 can be configured to execute computer-readable program instructions (e.g., instructions within application modules 46) that are stored in memory 40 or other program instructions as described herein.

Memory 40 can include one or more computer-readable mediums that can be read or accessed by at least processor 32. The one or more computer-readable mediums storage media can include volatile and/or non-volatile storage components, such as optical, magnetic, organic or other memory or disc storage, which can be integrated in whole or in part with at least one of processors 32. In some embodiments, memory 40 can be implemented using a single physical device (e.g., one optical, magnetic, organic or other memory or disc storage unit), while in other embodiments, memory 40 can be implemented using two or more physical devices.

Memory 40 can include computer-readable program instructions, e.g., an operating system 42, administration tools 44, application modules 46, and databases 70, 84. In some embodiments, memory 40 can additionally include storage required to perform at least part of the herein-described methods and techniques or at least part of the functionality of the herein-described devices and networks.

Memory 40 may include high-speed random access memory (RAM) and/or non-volatile memory, such as one or more magnetic disc storage devices. Memory 40 may store an operating system (or set of instructions) 42, such as LINUX, UNIX, MAC OS, or WINDOWS, that includes procedures for handling basic system services and for performing hardware independent tasks. Memory 40 may also store information, application modules 46, domain-specific data 70 and other data, databases and/or process instructions 84.

The domain-specific data can include data for one or more domains such as, but not limited to, "Domain A" 72, "Domain B" 80, and other domains 82. Each domain can include various results. For instance, Domain A 72 includes metadata 74, taxonomy/ontology data 76, and other data 78.

Application modules 46 may include a data extraction and consumption (DEC) module 48, core engine (or more simply, "core" or "core module") 54, services 66, and a visualization module 68. DEC module 48 may include software routines and other instructions for domain modeling 50 and domain training 52, e.g., for creating a domain model for analyzing, processing and presenting enterprise data as described in more detail below. Core engine 54 include instructions for searching and indexing 56, a discovery module 58, a learner module 59, a cluster/classification module 60, machine learning algorithms 62, and feature extraction 64. Services 66 may include web services or application program interfaces (API) for sending information to and receiving information from external systems such as enterprises 94, 96 and 98. Visualization module 68 may be used to format and package data and other information for display to end users. As used herein, a module refers to a routine, a subsystem, set of instructions, or other actual or conceptual functional unit, whether implemented in hardware, software, firmware or some combination thereof.

Enterprises 94, 96, 98 may be any business or other enterprise utilizing the system 30 to analyze and process domain data relevant to the enterprise. In embodiments described herein, system 30 may be used for a variety of different service repair enterprises having information concerning problem reporting, diagnoses, repair and service recommendations, including, for example, in vehicle repair, automotive, healthcare, home appliances, electronics, information technology and aeronautics. Each enterprise, e.g., enterprise 94, may use a number of different connected devices to communicate with system 30, including connected mobile devices 94-1 (e.g., hand-held diagnostic equipment, smart phones, tablet computers, or other portable communication devices), computer systems 94-2 (e.g., customer/business laptop or desktop systems, POS systems, service desk systems, etc.), and enterprise data stores 94-3, e.g. for storing or managing enterprise data.

A dashboard 86 or other administration system may provide a user interface and administration tools for configuring system 30, modeling a domain, presenting visualization data, collecting and/or applying feedback from domain experts, configuring and/or monitoring classification and clustering processes, configuring other processes, and setting desired parameters and monitoring system function.

Figure 12:
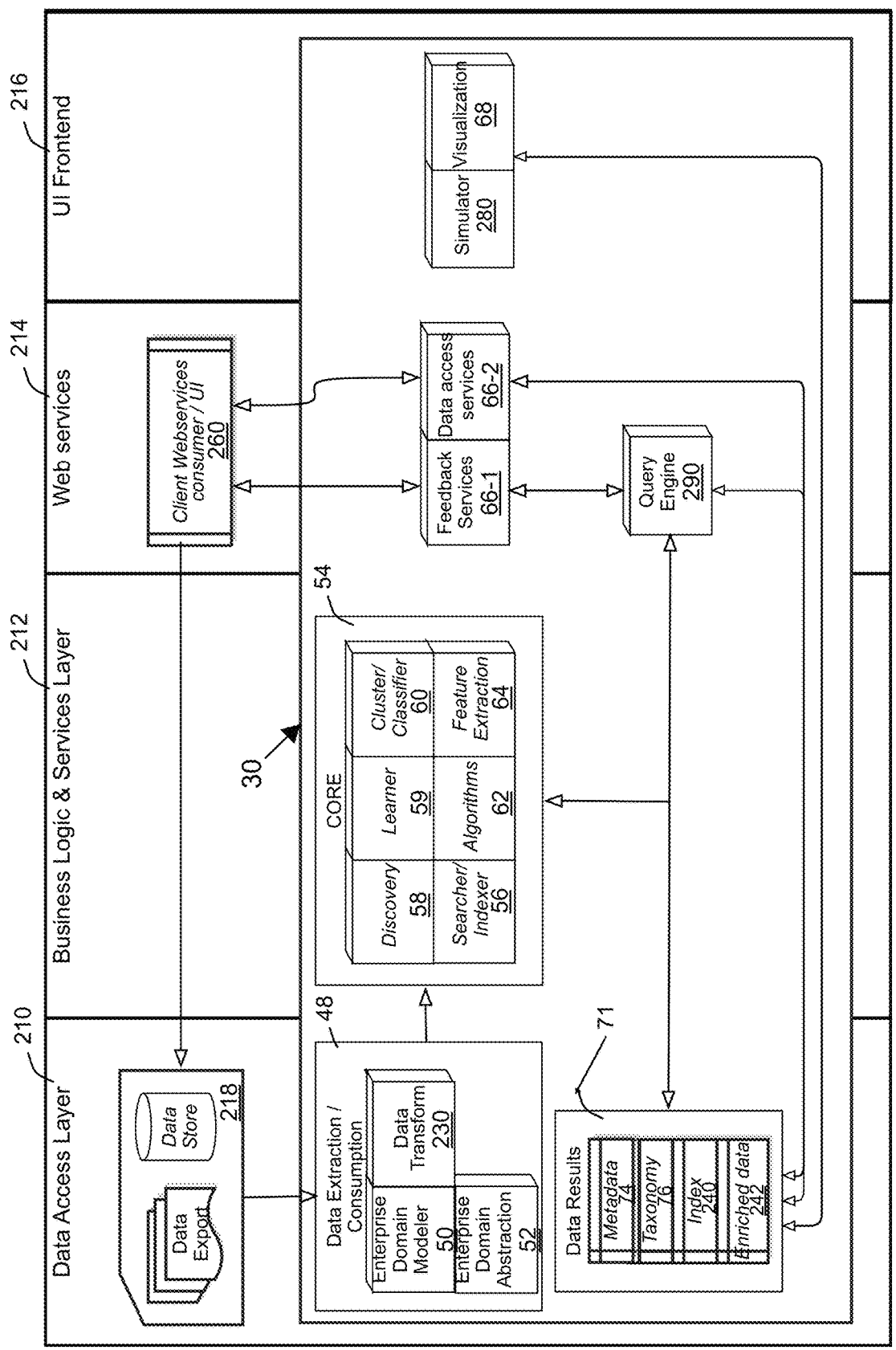
FIG. 12 is a schematic illustration showing aspects of the system of FIG. 11 in accordance with an example embodiment.

Next, FIG. 12 is a schematic illustration of an example architecture of a system 200 comprising a system 30 a data access layer 210, a business logic and services layer 212, web services 214 and a user interface front end 216. Data extraction and consumption (DEC) module 48 of system 30 may be part of the data access layer 210.

Enterprise-specific data from enterprise data sources 94-3 and related contextual information from various other data sources 92, collectively referred to as enterprise data 218, may feed into DEC module 48 of system 30, as described in more detail below with respect to FIG. 13. Imported data may include, for example domain model training data and test data for creating a domain model for processing enterprise-specific data. DEC module 48 may serve to map domain-specific data into abstract data models, and may include modules (each including instructions for performing steps of a process or method) for domain modeling 50, domain training 52 and a transforming data 230. Such instructions may be used to determine the model training parameters and data, the data to be tested, and the taxonomy from the domain data in order to feed data into the feature extraction capabilities 64 of core engine 54. DEC 48 may map data of interest (e.g., columns of interest from a database, properties of interest from a data model, etc.) into training and/or testing data sets. In some embodiments, data may be broken down into ENTITY and ATTRIBUTES, based on the specific domain data, as described in more detail below with reference to FIG. 16. In some embodiments, this model may then be pushed into a shared queue (e.g., DATA_QUEUE) for further processing.

Based on the type of data stream, system 30 will scale accordingly to produce messages for DATA_QUEUE. Data access services 66-2 provides an API or gateway to a from the system 30 to client web services 260, e.g., for transmitting queries from an enterprise connected device (e.g., 94-1, 94-2) and returning metadata or visualization data to the connected device(s). Support may include:

Text file such as csv exports;
Databases (MySQL, Microsoft Sql Server, Mongo, etc.); or
HTTP based services.

Core engine 54 may be both a consumer of domain data and a producer of enriched results and metadata. Modules within core 54 may include searcher/indexer 56, discovery 58, cluster/classifier 60, algorithms 62, and feature extraction 64.

Feature extraction module 64 may be closely associated with a domain, and may include domain-specific feature extraction parameters, e.g., provided or configured by a domain expert. Certain feature extractor processes that may be implemented by Feature Extractor may include, for example, extraction of regular expression (RE) terms, taxonomy features, and natural language processor (NLP) features. These and other aspects of feature extraction module 64 are described in more detail below with respect to FIG. 13.

Searcher/indexer 56 indexes data, including identifying key words grouping data for quick access by other processes of the system.

Discovery 58 seeks and identifies patterns in data. Such patterns may not be otherwise easy to detect as they may be obscured within large volumes of data or by the unstructured nature of enterprise data and/or spread across a number of variables.

Learner 59 may use the existing categorized data points from the enterprise to build a supervised learning model using the features extracted. This strategy may use a weighted classifier, such as a k-nearest neighbor (KNN) classifier. In the learning process inverted term index is built with weights incorporated per feature of the entity.

Cluster/Classifier 60 may provide instructions for implementing a number of data classification and clustering strategies for processing enterprise data. Classification Module 60: The unclassified stream of data obtained from the enterprise data passes through feature extraction module 64 and then classified into the appropriate categories using the learning or discovery module 58. The data is compared against a control set for maintaining accuracy. The sample set may also reviewed by domain expert, and feedback from the domain expert, enterprise systems and additional data sources may be pushed to feedback services module 66-1 or otherwise added or reflected in the domain model or feature extraction parameters. Feedback obtained from a domain expert and/or an auto-control set is consumed back by feedback module, which reassigns the weights and relearns the classification model. This provides a constantly self-evolving ecosystem for the model to be consistent with the changing environment.

Algorithms 62 may include any desired machine learning algorithms to support the processing of enterprise data, of such as Lucene NN, Naive Bayes, support vector machine (SVM), and other known algorithms as applicable to the desired learning application.

In some embodiments, core engine 54 is a multi-threaded system that dynamically adjusts to the data load, scalable to address future requirements.

Core engine 54 interfaces with the data access layer 210 to persist enriched data via a share queue (DATA_RESULTS_QUEUE). Enriched data may include classified data, clustering information, discovered taxonomies, etc. Results data may include meta and trace data indicating the enrichment performed on the data, the enriched data, and identification data correlating back to the original data. The core engine 54 may act as a producer for the DATA_RESULTS_QUEUE shared queue.

A data results module (or more simply "data results") 71 may be a part of the data access layer responsible for persisting enriched data. Data results may include metadata (data about data) 74, taxonomy 76, indexed data 240, and/or enriched data 242. The data results 71 may be consumed as acknowledged messages from DATA_RESULTS_QUEUE shared queue.

The data results 71 may be transformed based on implementation specific to an export requested. Data models may persist as, for example, database objects, j son objects, xml objects, or flat file records.

Based on the type of data results requested, the system 30 may scale accordingly to consume messages and persist. Support may include:

Text file such as csv exports;
Database (MySQL, Microsoft Sql Server, Mongo, etc.); or
HTTP based services.

The API services 214 (also referred to as Web services 214) exposed by the system 30, which may include services 66, such as feedback services 66-1 and data access services 66-2, may provide a means for client applications 260 to interface with enriched data from the system 30. The API services 214 exposed may be representational state transfer based (REST-based) over HTTPS, and may use authentication and/or authorization paradigms. The content media types may include XML, JSON and plain text, or other suitable media types.

The viewers and visualization module 68 may correlate the raw original domain data with the enriched data. Each viewer may provide as mechanism to export the current views. Viewers may include a classification viewer <#> and a cluster viewer <#>.

Classification viewer shows how the core module 54 used machine learning to classify the domain data. It can reveal the original input, the entity and attributes extracted, the meta and trace information, and the training data in which the particular entity was classified into. This viewer may offer filters as a means to partition and query the data.

A cluster viewer may show how the core module 54 used machine learning to group the domain data into logical clusters. It can reveal the original input, the entity and attributes extracted, the meta and trace information, and the cluster in which the particular entity was grouped. This viewer may offer filters as a means to partition and query the data.

In some embodiments, an analytics and reporting view of the data, e.g., using visualization 68 to configure data for viewing within dashboard 86, may provide general statistical analysis of the original domain data, and the totals for the enriched data. Such a module may provide reporting capabilities on the enriched data with respect to time.

A feedback module 66-1 may provide a gateway back into the core module 54 to dynamically train and enhance the domain data by updating the taxonomies and feature extraction process. This feature allows the incremental update of the domain training data based on validation information, taxonomy updates, algorithm priorities, and general use cases that will affect the identification of entity attributes. The feedback services is part of the API services layer that impacts the underlying metadata, instead of reading and retrieving enriched data as other viewers.

Simulator 280 may provide a simulation interface, e.g., accessible via a user interface 216 that allows a user to simulate and test new updates to the training set utilizing a small sample of the dataset.

Figure 13:
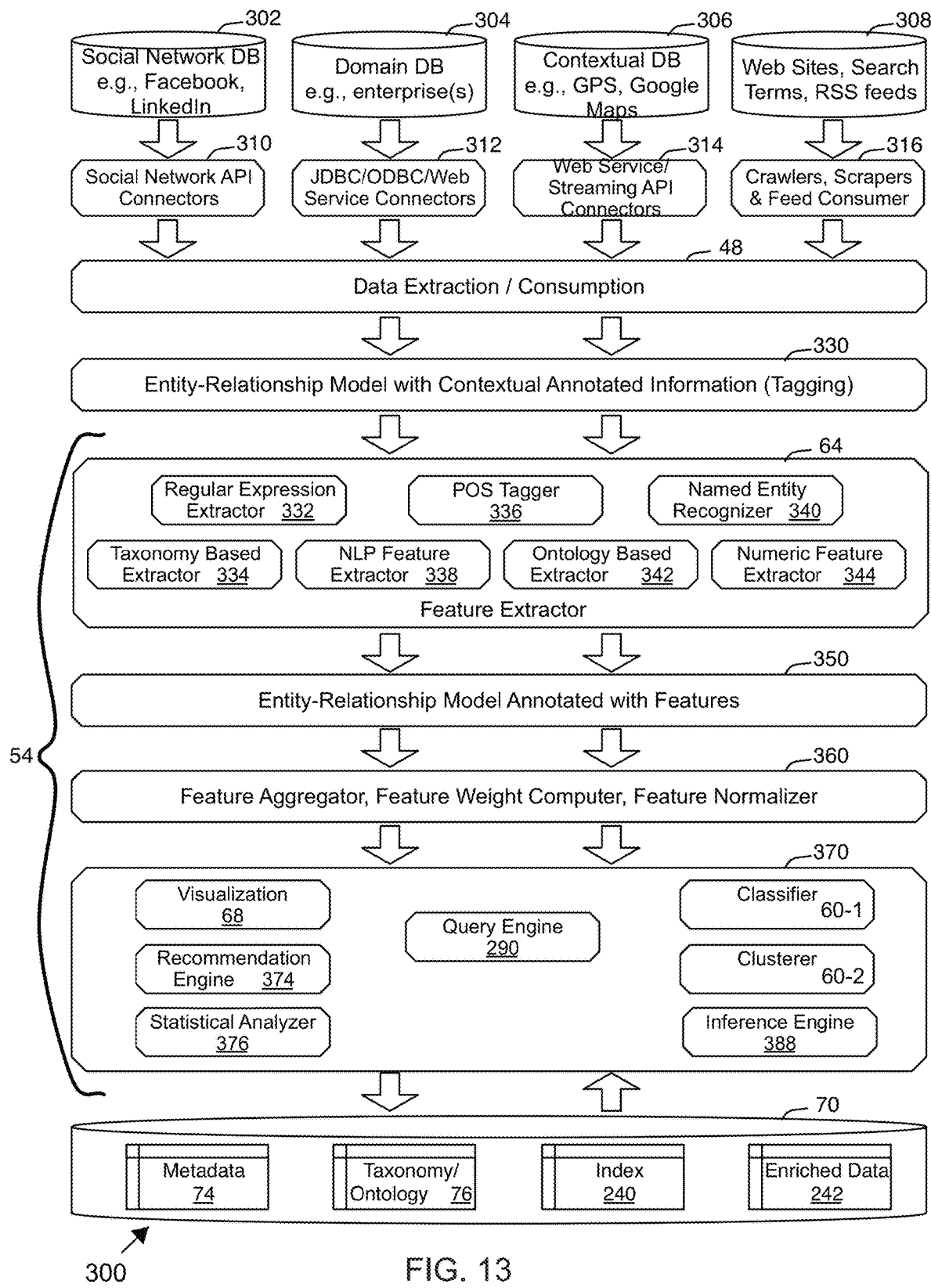
FIG. 13 is a flow diagram illustrating features of a system for processing enterprise data in accordance with an example embodiment.

Next, FIG. 13 is a schematic diagram of a functional architecture 300 or relationships of features of a system for processing enterprise data such as system 30 of FIGS. 11 and 12. In the following embodiment, features of the system may be described, by way of example, in use for an enterprise in the vehicle repair information domain. One skilled in the art will appreciate that the features and principles of the system are adaptable to various other domains and enterprises, including, without limitation, healthcare, information technology, home appliance repair, aeronautics, and other service-based or information-rich enterprises in any desired domain.

Data extraction/consumption module (DEC) 48 may receive data from a variety of data sources, such as one or more social network databases 302, domain databases 304, contextual databases 306 and web sites, keyword searches, or RSS feeds 308 sources. Each of these data sources 302, 304, 306, and 308 may communicate with DEC 48 via a corresponding input module 310, 312, 314, and 316, respectively. Domain databases 304 may provide enterprise-specific information, records and other data regarding a particular enterprise (also referred to herein as experienced-based information). Such enterprise-specific information may relate to, for example, customers, transactions, support requests, products, parts, trouble codes, diagnostic codes, repair or service information, and financial data. In an embodiment for processing automotive service information, for example, domain DB 304 may comprise automotive service records, service orders, repair orders, vehicle diagnostic information, or other historical or experience-based service information. This information may be received by the DEC module 48 via a web service API 312, e.g., a Java database connectivity (JDBC), open database connectivity (ODBC), or any other API or connection means. In other embodiments, enterprise data or broader domain information may be loaded into the system or read from computer-readable storage media connected to or otherwise in communication with system 30.

Contextual databases 306 may be any relevant information sources that drive context to the domain or enterprise data. For example, connections to sites such as Google Maps may provide location information, other sites or databases may provide data regarding weather, GPS or other location coordinate information, elevation, date and time, or any other information that may be useful to provide context to enterprise-specific data. For example, in a vehicle service example, map or other location data may be used along with vehicle service records and other enterprise data to identify and display common problems associated with a particular service location or to identify region-specific problems or trends.

In some embodiments, social network databases 302 may include Facebook, Twitter, LinkedIn, and the like, and may be accessible by DEC 48 via applicable API connectors 310. Data from social network databases 302 may be used to understand key "features" to help drive learning, create a domain model, and/or process a query. Similarly, information from web sites, site search terms, RSS feeds, and other external information sources may be obtained by the DEC 40 via web crawlers scrapers, feed consumers and other applicable means 316.

Figure 16:
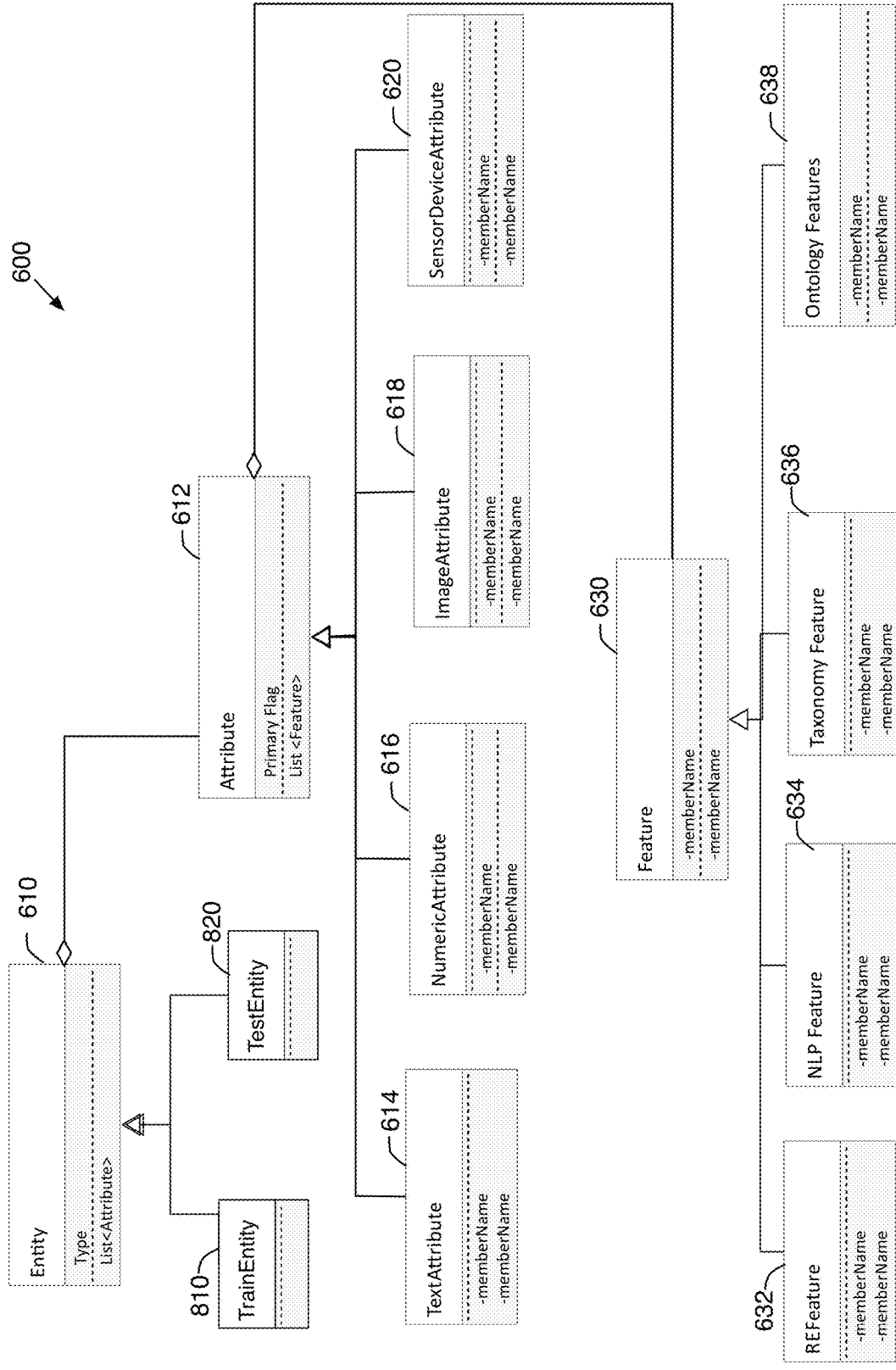
FIG. 16 is a class diagram of an enterprise data model abstraction for machine learning, in accordance with an example embodiment.
Figure 17:
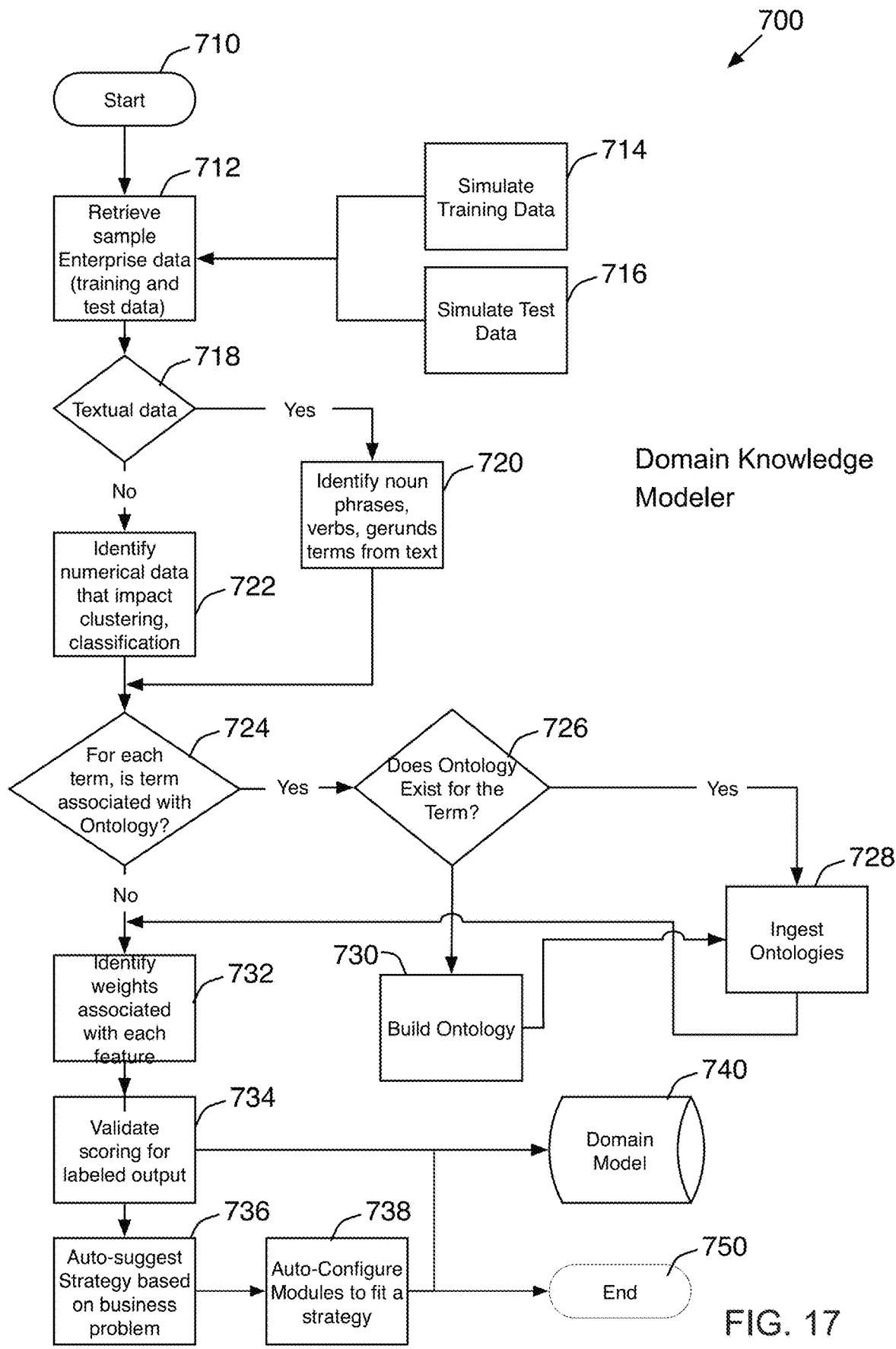
FIG. 17 is a flow chart of a method for creating a domain model, in accordance with an example embodiment.

Enterprise-specific records and other information from databases 302, 304, 306 and 308 may be in any form or format, including structured or unstructured data, textual or numeric, natural language, or informal broken sentences or collections of words and/or numbers. DEC 48 may use such information from the domain DB 304, as well as contextual or potentially related information from other sources 302, 306, 308 to create an abstraction of data relevant to the enterprise (e.g., using enterprise domain abstraction 52 of FIGS. 11 and 12) and build an entity-relationship model, also referred to herein as a "domain model" with contextual annotated information 330 (e.g., using domain modeler 50 of FIGS. 11 and 12). An example enterprise domain abstraction process 600 is illustrated in FIG. 16 and an example process for creating a domain model 700 is illustrated in FIG. 17, each of which are described in more detail below with reference to their respective figures.

In this embodiment, the entity-relationship model with contextual annotated information 330 may feed into feature extractor 64 of core 54, which may be used to process core 54, which may extract key features from model 330 for further processing by aspects of core 54.

In some embodiments, feature extractor 64, may include a regular expression extractor 332, a taxonomy based extractor 334, a POS tagger 336, an NLP extractor 338, a name entity recognizer 340, an ontology based extractor 342, and a numeric feature extractor 344.

Regular expression (RE) extractor 332 may be used to extract enterprise-specific features that follow a specific pattern, such as symbols, registration numbers, item codes, product codes, or service codes. Such features may be extracted for every attribute of a desired entity.

Taxonomy based extractor 334 may be customized to extract domain-specific data points, such as part names, service listing, or any taxonomy relevant to the business. Domain-specific synonym lists can also be provided for wider searches. This may also include looking for spelling variations, abbreviations, and/or other common features of terms. In a repair service industry application, custom taxonomy can include names of the most common set of parts and other terms associated with the machine, device or service under consideration (e.g., a vehicle). Since the same vehicle part may be referenced using different terms, synonym lists are provided against these taxonomies.

In a vehicle repair information example, extractor 334 can be configured to identify a taxonomy term that matches a term within vehicle-service data, such as from a vehicle repair order (RO). A term in a taxonomy of terms or a term within the vehicle-service data can include one or more words, abbreviations, acronyms, or numbers, or some other portion of a natural language that can be classified as a term. A term in a taxonomy can be designated as a standard term. One or more non-standard terms can be associated with a standard term. A non-standard term can be a synonym, an abbreviation, or alternative spelling of its associated standard term. Alternative spellings can include misspelled terms.

In the vehicle-service data example, a number of taxonomies may be employed, such as for example taxonomies for: (a) labor terms, e.g., remove, replace, adjust, lubricate, clean, refinish, repair, splice, solder, connect, reconnect, fill, drain, balance, and inspect; (b) vehicle part names, e.g., alternator, oxygen sensor, engine, oil filter, manifold gasket, or any other vehicle part name; (c) symptom terms, e.g., stalls, dies, hot, cold, or some other term that describes a symptom that can be exhibited by a vehicle; (d) part failure mode terms, e.g., leaky, broken, missing, bent, etc. Any other desired taxonomies may be defined or learned and implemented in the system, depending upon the desired application A POS tagger 336 may be used to identify and extract features from data based on the relative positions of specified words or phrases. For example, specified terms can be tagged or extracted if they appear within a defined number of words of another associated term, e.g., if "gasket" appears within 5 words of "manifold".

NLP extractor 338 provides identification of verbs, nouns and phrases that are used to describe terms in the taxonomies, and other terminology that may be important, common or standard to the particular enterprise or business.

Name entity recognizer 340 may be used to identify certain terms or variations of terms within text or other data. Numeric feature extractor 344 may be employed to identify and extract relevant numbers or other quantitative information from data, records or other information.

Ontology based extractor 342 may identify in text information or other data relevant concepts, properties, and relationships expressed in an ontology relevant to the enterprise. Ontologies are typically developed by a domain expert and may include enterprise-specific concepts arranged in class/sub-class hierarchies, similar to taxonomy. Ontology is typically a broader or more abstract expression of hierarchical relationships than taxonomy.

The foregoing aspects of feature extractor 64 work together to identify and extract features and generate an entity-relationship module annotated with features 350, to which may be applied a feature aggregator, feature weight computer, and/or a feature normalizer 360 to further process the information within core 54.

A set of machine learning tools 370 within core engine 54, may further process the aggregated, weighted and normalized enterprise data from 360. Such tools and processes may include a visualization engine 68, a recommendation engine 374, a statistical analyzer 376, a query engine 290, a classifier 60-1, a clusterer 60-2 and an inference engine 388.

Visualization is described in more detail below with respect to FIG. 24. Recommendation engine (RE) 374 processes classified data coming out of classifier 60-1 and uses the scoring appropriate for the given enterprise data and recommends the most appropriate class or group. For example, for a given repair request, there can existing top five possible repair solutions based on the score. However, one of the top five might be most appropriate for a given scenario and based on the feedback received from the past learning. RE 374 applies the learning, score and classification results and recommends the most appropriate solution.

Statistical Analyzer 376 computes statistical parameters over a set of features as specified. The statistical results can be used for getting insight into the enterprise data and as well for generating visualization, e.g., on the dashboard 86. For example, the most high frequency vehicle part associated with a given repair can be computed using statistical analyzer 376 by looking for absolute highest frequency, average, statistically significant (e.g., p-value), distribution curves.

Query engine 290 uses feedback services 66 to respond requests coming from external applications within an enterprise, e.g., from connected devices 94-1, user terminals 94-2, or other connected computer systems within an enterprise. Query engine 290 is capable of interpreting a request in progress in real time and anticipating follow-on requests to providing a most appropriate response by applying context of the given request, applying past learning, and providing a response.

For example, an end-user of an enterprise shop repair application (e.g., a vehicle service technician) may enter, e.g., using a computer terminal in the shop, a customer request to repair a device. The request is communicated to query engine 290 via access services 66. Query engine will interpret the request and communicate with core 54 and stored data 70 to provide a response based on the past millions or billions of enterprise repair requests, including providing the most appropriate repair solution(s). If a solution does not exist, system 30 may use such information for further learning, e.g., by automatically clustering the current request into a "requires solution" category.

Outputs from these core 54 processes may include metadata 74, taxonomy/ontology data 76, indexed information 240, and enriched data 242, as described above. This information may be used and applied to produce results, recommendations, and other information in response to queries, e.g., from connected devices 94-1 or service technicians or other end-user systems 94-2 in an enterprise 94.

Additional details regarding example classification and clustering strategies using the systems of FIGS. 11-13 follow:

3. Classification Strategies

Classification may be used to solve item categorization problems for enterprises having a large number of instances, or data records, such that it would be desirable to classify data into one of the several categories. The number of categories may be on the order of tens of thousands or more. In some embodiments, a classification strategy may include one or more of the following features or modules:

a. Importer module (DEC module) 48: An importer module may be used to convert an enterprise object to be classified into a system 30. Such conversion entails joining data across database tables and pulling data from various enterprise sources.

b. Feature Extraction Module 64: Feature extraction modules are closely associated with domain. Therefore, irrespective of the strategy, this module can be extended by adding domain-specific feature extraction capabilities. Some of the default feature extractor processes used in the strategy may include:

Regular Expression Extractor 332: Used to extract enterprise-specific codes such as registration numbers, item codes, product codes, or service codes. Such codes may be extracted for every attribute of the entity.

Custom Taxonomy Feature Extractor 334: This taxonomy may include domain-specific data points, such as product names, service listing, or any taxonomy relevant to the business. Domain-specific synonym lists can also be provided for wider searches. This may also include looking for spelling variations, abbreviations, and/or other common features of terms.

Natural Language Processor (NLP) Feature Extractor 338: The NLP Feature Extractor provides identification of verbs, nouns and phrases that are used to describe terms in the taxonomies, and other terminology that may be important, common or standard to the particular enterprise or business.

c. Learning Module 59, Supervised: May use existing categorized data points from the enterprise to build a supervised learning model using the feature extracted above. This strategy may use a weighted classifier, such as a KNN classifier. In the learning process, an inverted term index is built with weights incorporated per feature of the entity.

d. Classification Module 60: The unclassified stream of data obtained from the enterprise data passes through feature extraction module 64 and is then classified into the appropriate categories using the learning module 59 or the discovery module 58. The data is compared against a control set for maintaining accuracy. The sample set is also reviewed by a domain expert and the feedback is pushed to a feedback module 66-1.

e. Feedback Module 66-1: Feedback obtained from the domain expert and the auto-control set is consumed back by the feedback module 66-1, which reassigns the weights and relearns the classification model. This provides a constantly self-evolving ecosystem for the model to be consistent with the changing environment.

f. Scoring Module: A post processing module for this strategy is scoring of enterprise objects defining the affinity towards a particular class. Scoring is the function of the common set of features found in enterprise object and the enterprise category.

g. Export Module: Export module may be used to normalize Entity into an enterprise object and pushes it back via a web service call.

4. Clustering Strategy

This strategy is used for solving item clustering problems for enterprises where there are large number of instances and can be clustered into several categories. As with the classification strategy described above, the number of categories may be on the order of tens of thousands or more.

In some embodiments, clustering strategy may include one or more of the following building modules described in this section.

a. Importer module (DEC module) 48: An importer module may be used to convert an enterprise object to be classified into a system 30. Such conversion entails joining data across database tables and pulling data from various enterprise sources.

b. Feature Extraction Module 64: Feature extraction modules may be closely associated with domain. Therefore, irrespective of the strategy, this module can be extended by adding domain-specific feature extraction capabilities. Some of the default feature extractor processes used in the strategy may include:

Regular Expression Extractor 332: Used to extract enterprise-specific codes such as registration numbers, item codes, product codes, or service codes. Such codes may be extracted for every attribute of the entity.

Custom Taxonomy Feature Extractor 334: This taxonomy may include domain-specific data points, such as product names, service listing, or any taxonomy relevant to the business. Domain-specific synonym lists can also be provided for wider searches. This may also include looking for spelling variations, abbreviations, and/or other common features of terms.

NLP Feature Extractor 338: The NLP Feature Extractor provides identification of verbs, nouns and phrases that are used to describe terms in the taxonomies, and other terminology that may be important, common or standard to the particular enterprise or business.

c. Learning Module 59, Unsupervised: Canopy clustering is used to segregate entities based on a primary set of features and each of the primary clusters are passed through K-Means clustering algorithm to obtain finer clustering entities. Canopy clustering enables reduction in the complexity of the problem and improves computational performance without loss of accuracy. The finer clusters are large in number and hence we auto label each of the clusters based on the affinity of features to that cluster.

d. Post-processing: Cluster post-processing may also be performed, including merging smaller clusters and filtering out irrelevant clusters. The cluster groups are then ordered based on their importance.

e. Export Module: An export module may share the information about the newly discovered categories with the enterprise data store, e.g., via web services 66-2. It also exports the item-cluster mapping. Core 54 is a consumer of the DATA_QUEUE. Messages taken from this queue may describe the source domain, entity, attributes of the entity and a command indicating the machine learning logic to be performed. This may include feature extraction, indexing, analyzing, classification, clustering, and supervised/unsupervised learning algorithms built into system 30.

5. Example Methods of Processing Enterprise Data

Figure 14:
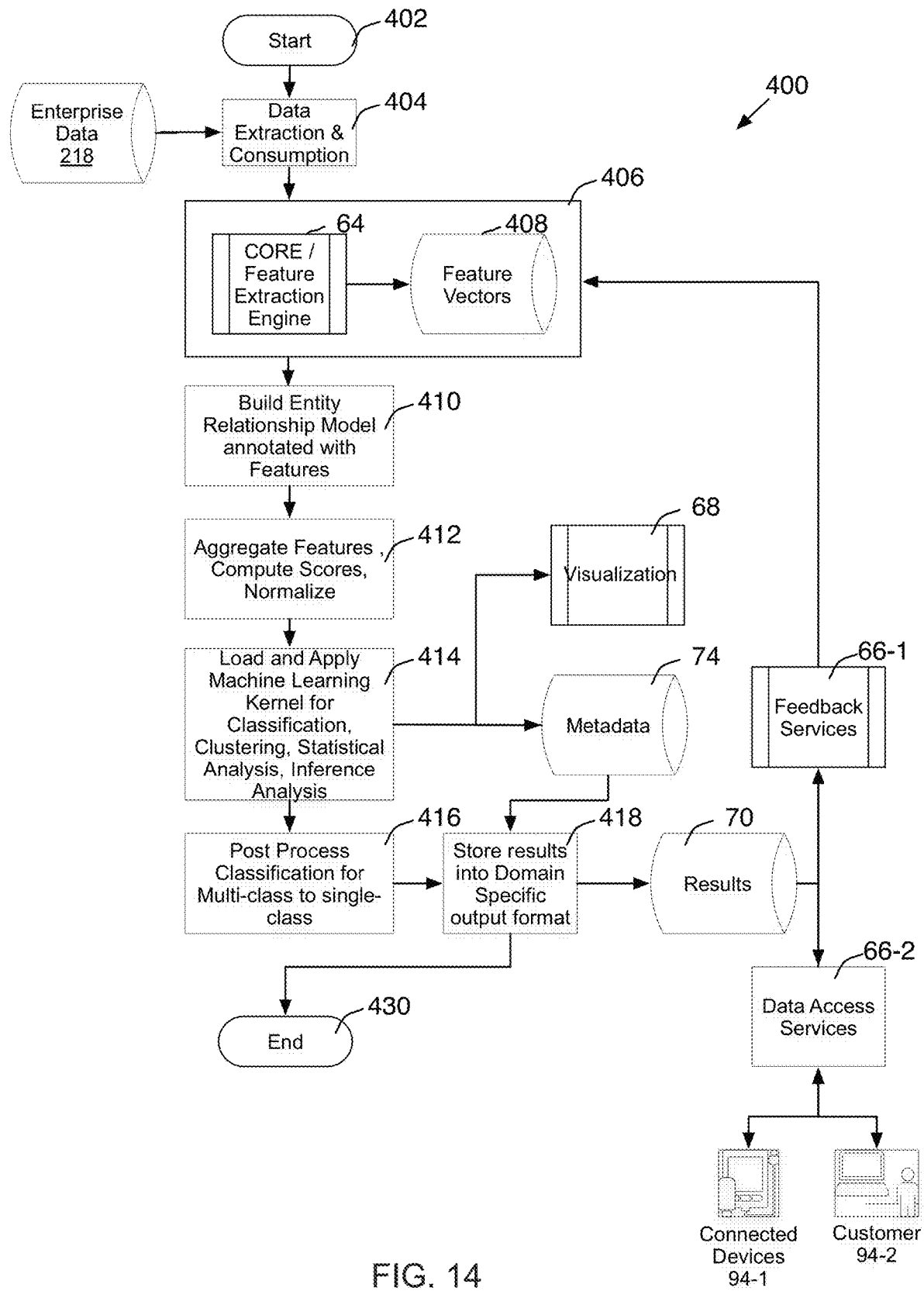
FIG. 14 is a flow chart of a method for processing enterprise data, in accordance with an example embodiment.

Referring to FIG. 14, an example method 400 for processing enterprise data using the system 30 and features of FIGS. 11-13 is shown. In this example, the method 400 starts 402 with extraction and consumption 404 (by DEC 48 of FIGS. 11 and 12) of enterprise data 218. Data extraction and consumption may serve to extract and map data of interest, e.g., into entity and attributes based on the specific domain data. Data then may be processed 406 in the core 54, e.g., by feature extractor 64 to extract features from the data and create feature vectors 408, which are then used to build an entity relationship model annotated with features 410, as described above with respect to FIG. 13.

In step 412, features may be aggregated, scored or ranked, and normalized as desired. In 414, the processed data is then loaded and machine learning modules of core 54 are applied for classification, clustering, statistical analysis, inference analysis, etc. The output of machine learning processes 414 may include metadata 74, which may be used by visualization engine 68, e.g., for display on dashboard 86, or may be stored 418 into domain-specific output format 418, e.g., in results store 70. Alternatively, processed data from 414 may undergo post-process classification 416 for multi-class to single-class data, which may also be stored as results into domain-specific output format 418. For example, such post-processing may involve determining the top five solutions or query answers, possibly with additional ranking, weighting or scoring information.

Such results may be accessed or used in response to a query, for example, from a connected device 94-1 or other customer system 94-2 in communication with the system 30, e.g., via data access services 66-2. Feedback services 66-1 may be associated with a query engine 290 (of FIG. 12). As described herein, such query or feedback may be fed back into core 54 and processed in 406 to improve learning of the system, or to process a user query and return relevant information.

Figure 15:
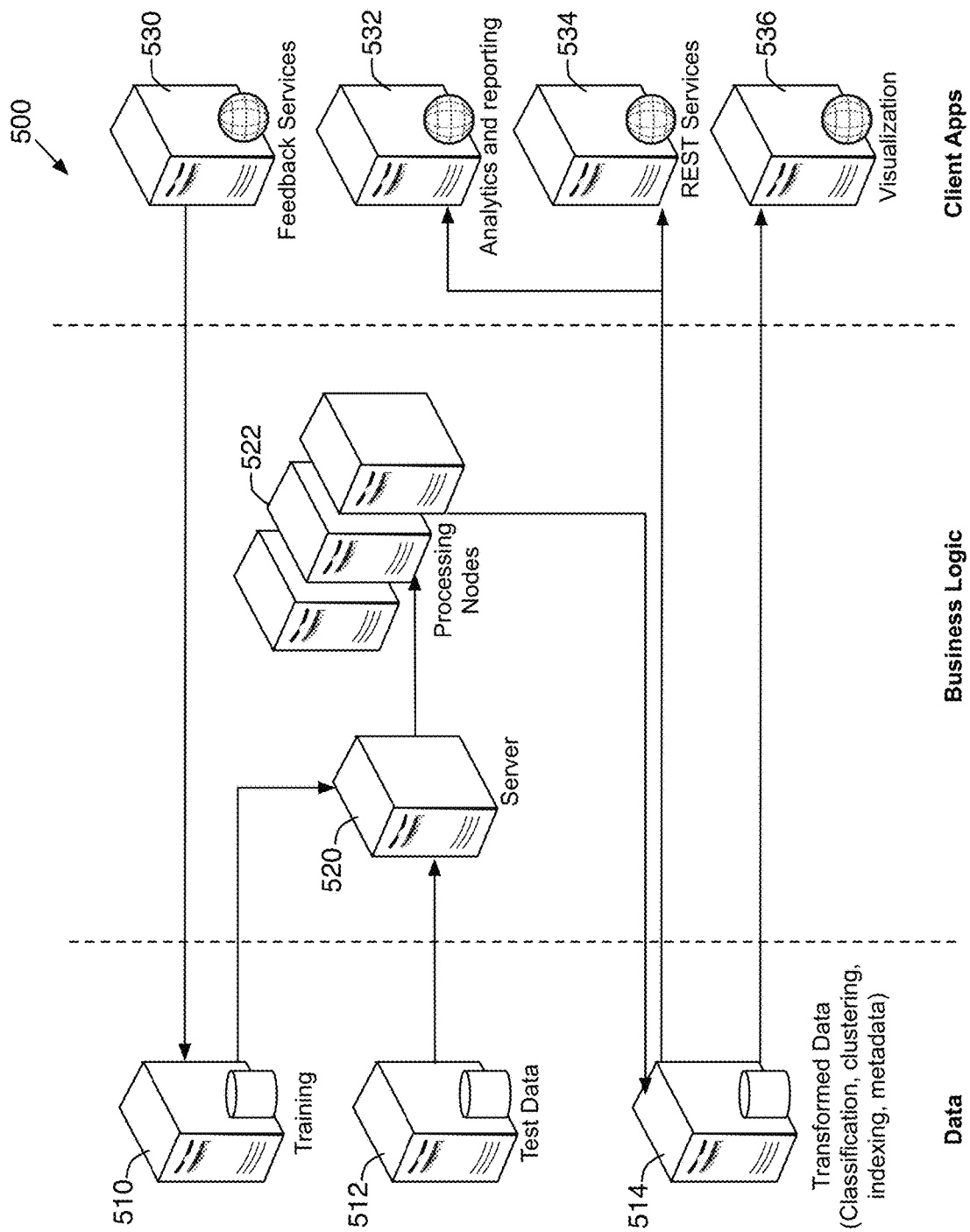
FIG. 15 is a schematic illustration of a system architecture, in accordance with an example embodiment.

As shown in FIG. 15, another embodiment of an adaptable system 500 for processing enterprise data may comprise a distributed architecture of servers and/or services. Server 520 may be similar to system 30, and may use one or more processing nodes 522 to process enterprise data, e.g., utilizing core engine 54 and associated modules. Data stored or used by system 500 may include training data 510, test data 512, and transformed data. 514. Applications for communicating with clients and customers, including, for example repair services providers, includes feedback services 530, analytics and reporting 532, REST services 534, and visualization 536.

6. Enterprise Domain Abstraction

FIG. 16 is an entity model class diagram of a data model abstraction 600 for machine learning. Enterprise solutions commonly represent their data in terms of entities and association among these entities via relationships ("ER-representations"). For convenience, the term "entity" is used similarly herein to define any instance of interest.

Entity 610 may represent any enterprise object of analytical interest. To distinguish between different types of entities, each entity object has a type and characteristics of the instance of this object defined via entity attributes 612. Types of entity 610 may include TrainEntity 810 (corresponding to training data) and TestEntity 820.

Attribute 612 may represent entity characteristic and can be defined using various types of attribute or representations, such as text attributes 614 or textual content, numeric attributes 616, image attributes 618, sensor devices 620, or even customized attributes. Attribute 612 value could be static as in case of text 614 and images 618 or can as well be streaming if coming from sensory devices 620 or other external sources.

A "feature" 630 may be associated with an attribute, and can be defined as a data point or other information that is extracted out of such attribute content by applying desired transformations. An array of transformations can be applied on the same attribute to extract different facets. Features that may be of particular interest for the system framework as it contributes towards all the supervised, unsupervised and statistical analytics. It is also used in building the Visualization and Reporting framework. Features may include RE features 632, NLP features 634, taxonomy features 636, and ontology features 638

7. Domain Knowledge Modeling

FIG. 17 is a flow chart of a method for creating a domain knowledge model, in accordance with an example embodiment of an adaptable system for processing enterprise information. The method may be implemented, for example, in system 10 of FIG. 11 via a user interface dashboard 86 by a domain expert or other administrative user of system 30.

Following the start 710 of the process, sample enterprise data is retrieved 712, e.g., training data and test data. Such training and test data may be retrieved, for example, from enterprise data 218 of FIG. 12 and may provide enterprise-specific information, records and other data regarding a particular enterprise. Such enterprise data information may relate to, for example, customers, transactions, support requests, products, parts, trouble codes, diagnostic codes, repair or service information, or financial data. In the above-described embodiment for processing vehicle service information, for example, the enterprise data retrieved in 712 may comprise vehicle service records, service orders, repair orders, work orders, vehicle diagnostic information, or other historical or experience-based service information. In process 700, a domain expert or other user may also provide parameters and data to simulate training data 714 and simulate test data 716 in order to aid in building a domain model.

If a retrieved sample of enterprise data from 712 is textual data 718, the system identifies noun phrases, verbs, and gerund terms from the text in 720. If the determination in 718 is that a sample of enterprise data is not entirely textual, numerical data that may impact clustering and classification are identified 722.

Each identified term from 720, 722 is analyzed to determine if such term is associated with ontology 724, and if so, whether the ontology already exists in the system for that term 726. As used herein, "ontology" refers to a hierarchical representation of known terms for the enterprise. For identified ontologies that already exist, such ontologies are ingested 728. Ontologies that are identified but not existing in the system are built 730 and then ingested 728. For each identified term with an ingested ontology, and for each term that is not associated with an ontology in 724, weights associated with each feature are identified 732 and scoring is validated 734 for labeled output From the identified, weighted, and validated output features, the domain model is created and stored 740. In some embodiments, method 700 may also include processes for easily adapting to different enterprises, including automatically suggesting 736 a processing strategy based on a presented business problem, e.g., using known business problems and associated features and adapting them to the particular enterprise or use case. Processing modules (e.g., modules of core 54) may then be auto-configured 738 to fit the suggested strategy, and the modules or associated parameters may then be incorporated into the stored domain model 740. Once the domain model is completed, the process may end 750.

Figure 25:
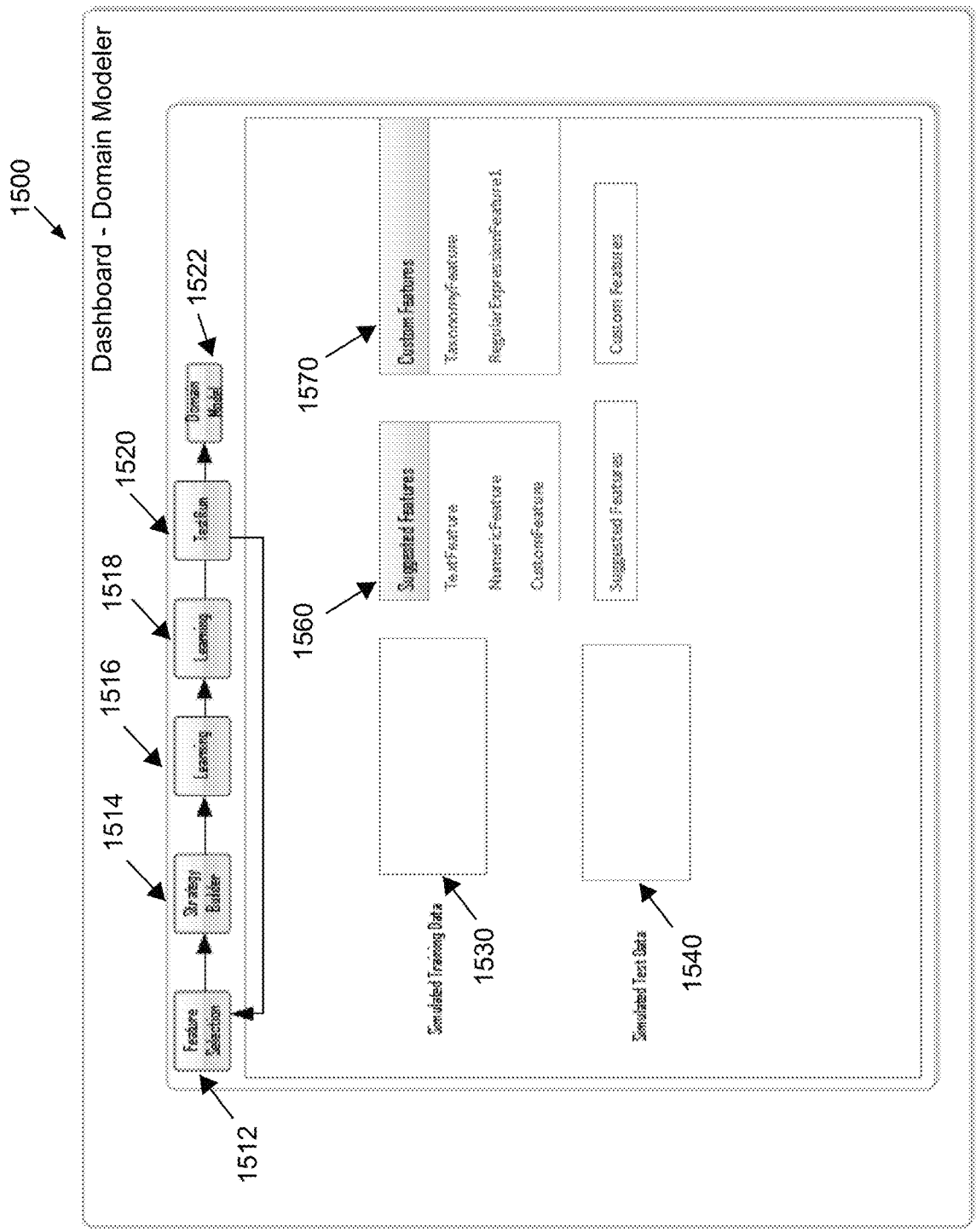
FIG. 25 is a screenshot of an example of a user interface of a system dashboard.

An example of a user interface 1500 for building a domain model as in process 700 is shown in FIG. 25. As an example, the UI 1500 can be for an automotive service enterprise with enterprise data comprised of vehicle service orders, vehicle repair orders, and vehicle diagnostic data as training and test data to build the model.

8. Adaptable Processing Modules

Figure 18:
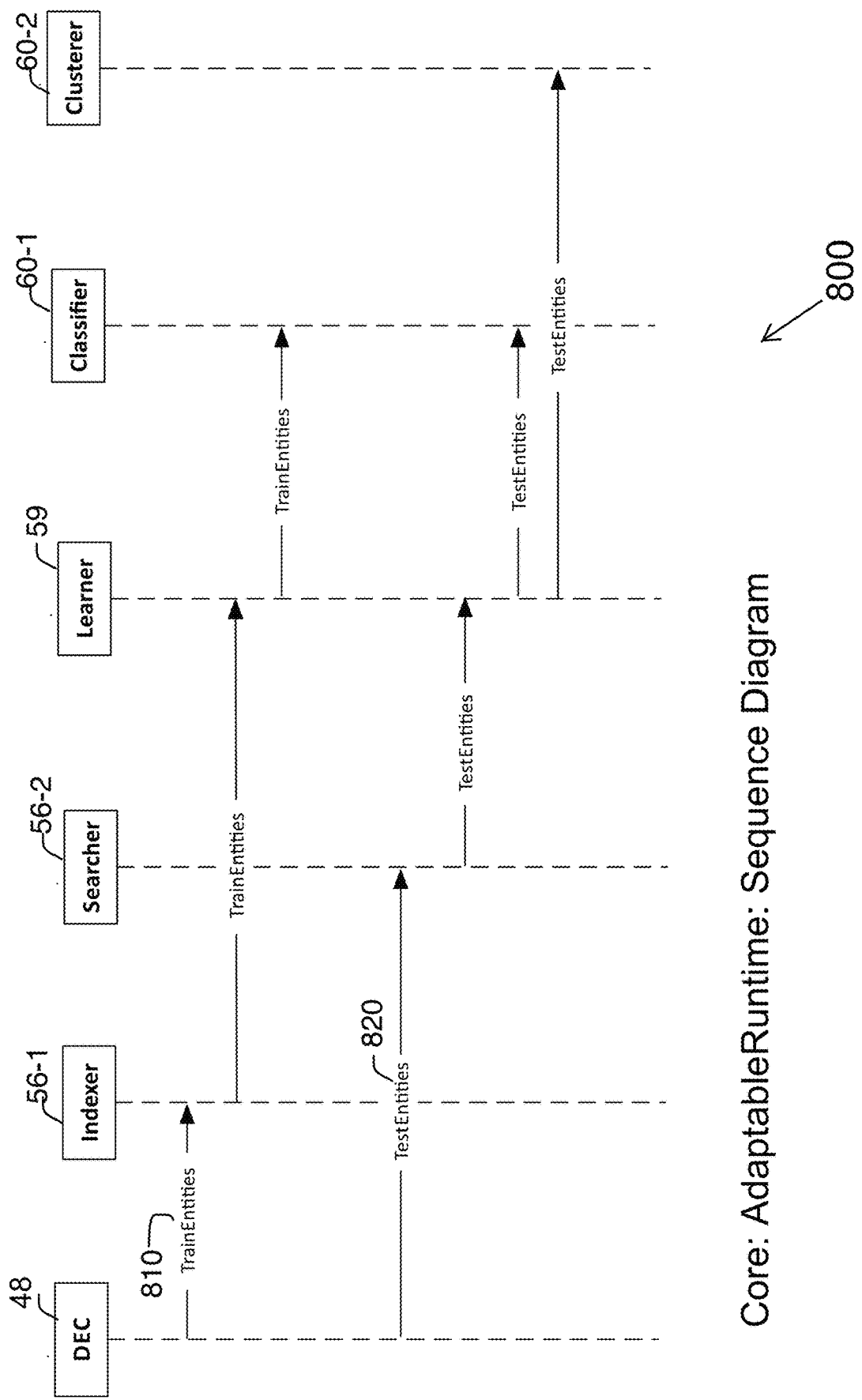
FIG. 18 is a sequence diagram of an adaptable runtime process, in accordance with an example embodiment.

FIG. 18 is a sequence diagram of an adaptable runtime process of system 30, in accordance with an example embodiment. Processing of TrainEntities 810 and TestEntities 820 are shown from DEC 48 thorough modules of core 56, including indexer 56-1, searcher 56-2, learner 59, classifier 60-1, and clusterer 60-2. As discussed above with respect to FIG. 16, TrainEntities 810 and TestEntities 820 correspond to training data and test data, and each entity may comprise a hierarchy of attributes and features for adaptable modeling and processing of enterprise data.

In the embodiment 800 of FIG. 18, the sequence 810 for TrainEntites 810 may commence from DEC 48 to indexer 56-1, from indexer 56-1 to learner 59, and from learner 59 to classifier 60-1. The sequence for TestEntities 820 may commence from DEC 48 to searcher 56-2, and from searcher 56-2 to learner 59. From learner 59, TestEntites may progress to classifier 60-1 or to clusterer 60-2.

Figure 19:
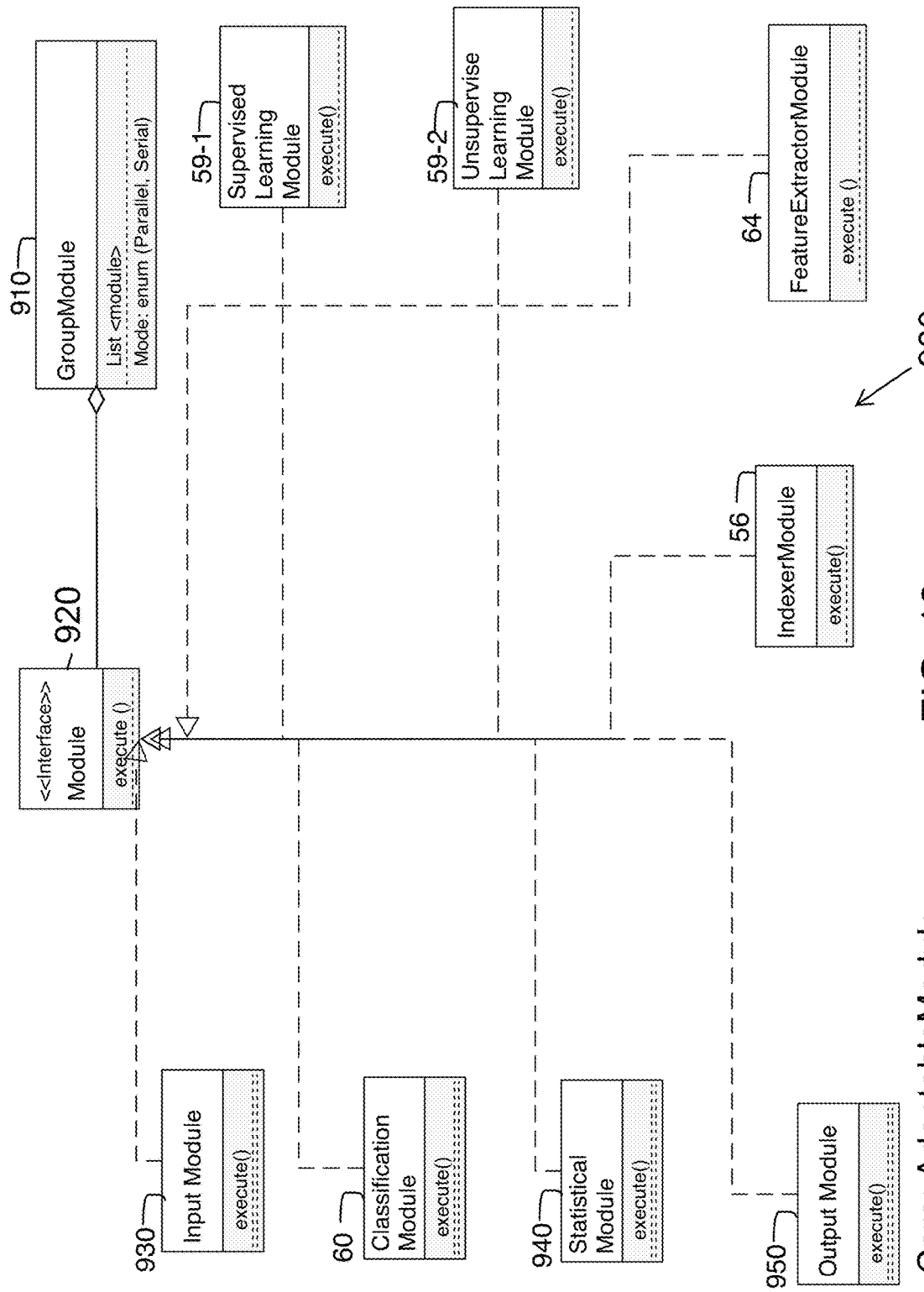
FIG. 19 is a class diagram of an adaptable module of a core engine, in accordance with an example embodiment.

FIG. 19 is a class diagram of an adaptable module 900 employed by domain modeler 50 of DEC 48 (of FIG. 11), in accordance with an example embodiment. Adaptable behavior is enabled by a configurable domain modeling strategy that provides a unique ability for a non-technical domain expert to efficiently develop, run, evaluate and deploy strategies for analyzing and processing enterprise information to suit specific applications. Domain modeler 50 allows interaction with a domain expert and applies domain expertise to define feature space (multiple features of interest to given problem), size of test data, size of training data, sample test data, and sample training data. The results of the domain modeling drives configurability of the modules within DEC 48 and processor core 54.

One aspect of a configurable module management strategy 900 is the ability for various modules to interact with each other and share information, e.g., between any combination of modules such as input module 930, indexer module 56, supervised learning module 59-1, unsupervised learning module 59-2, classification module 60, feature extractor module 64, statistical module 940, or output module 950. This may be achieved by a group module 910, or a collection of modules with well-defined connection between modules representing the order of execution and flow of information between the modules. Group module 910 is preferably a linear directed-graph of modules with no undirected-cycles. In such embodiment, the directed-edge determines the flow of information.

The collection of modules, represented abstractly by module 920, within group module 910 can be executed, for example, in two operational modes: serial execution and parallel execution as shown in 910. With the serial execution operator, all the modules in a group are executed in serial order. With the parallel execution operator, all the modules 920 in a group are executed in parallel. The output of all the modules will be collected and passed on as single output.

In some embodiments, group module 910 may have another group module encapsulated. This allows creating complicated and sophisticated work-flows with ease to the modeler.

As mentioned above, group module 910 for processing enterprise data may include a number of run-time modules 920, each of which may be a self-sufficient workable processing unit. Depending upon the desired application, modules 910 may include any of input module 930, indexer module 56, supervised learning module 59-1, unsupervised learning module 59-2, classification module 60, feature extractor module 64, statistical module 940, or output module 950. Any custom module may be build and plugged in into the architecture as desired.

Input modules 930 may be used by DEC 48 runtime component to extract data from external data sources and pre-process them into entity representations. Thus, input module 930 may act as connector to the outer universe, such as a database connector, RSS-Feed, Web-Crawler, File/Console Reader (e.g., any of connectors 310, 312, 314 or 316 of FIG. 3). Input module 930 consumes data from external source and converts it to the entity representation.

Supervised learning module 59-1 may use available supervised learning algorithms such as decision trees, linear classifiers, SVM's, KNN, graphical models, etc. for creating learning models. System 10 provides ease of changing parameters and evaluating impact on the test samples. The system may also recommend a best classifier and with best possible parameters, e.g., by performing regression analysis.

As enterprise data is often unclassified, unsupervised learning module 59-2 may be employed to support unsupervised and semi-supervised learning methodologies to classify and categorize enterprise data. This may include, for example, linear and non-linear regression, and clustering methods like K-means, and expectation maximization.

Classification module 60 may use the supervised learning models to classify/categorize the new stream of data. The classification module 60 aligns with the supervised algorithm used for building the module.

In statistical module 940, statistical parameters are computed over set of features as specified. The statistical figures can be used for gaining insight into the enterprise data and as well by the visualization engine 68 for generating and presenting visualization on dashboard 86.

A post-processing/summarizing module may use ranking algorithms, cleanup operations, normalization of the data and any kind of custom processing to be done, e.g., as described with respect to or shown in 416 of FIG. 14.

Output module 950 is configured depending on the format in which an enterprise requires its final data to be presented. For example, data could persist to a local database or file by the output module 950 or shared back with an enterprise solution, connected device or other enterprise system (e.g., 94-1, 94-2, 94-3 of FIG. 11) via a web service invocation.

Figure 20:
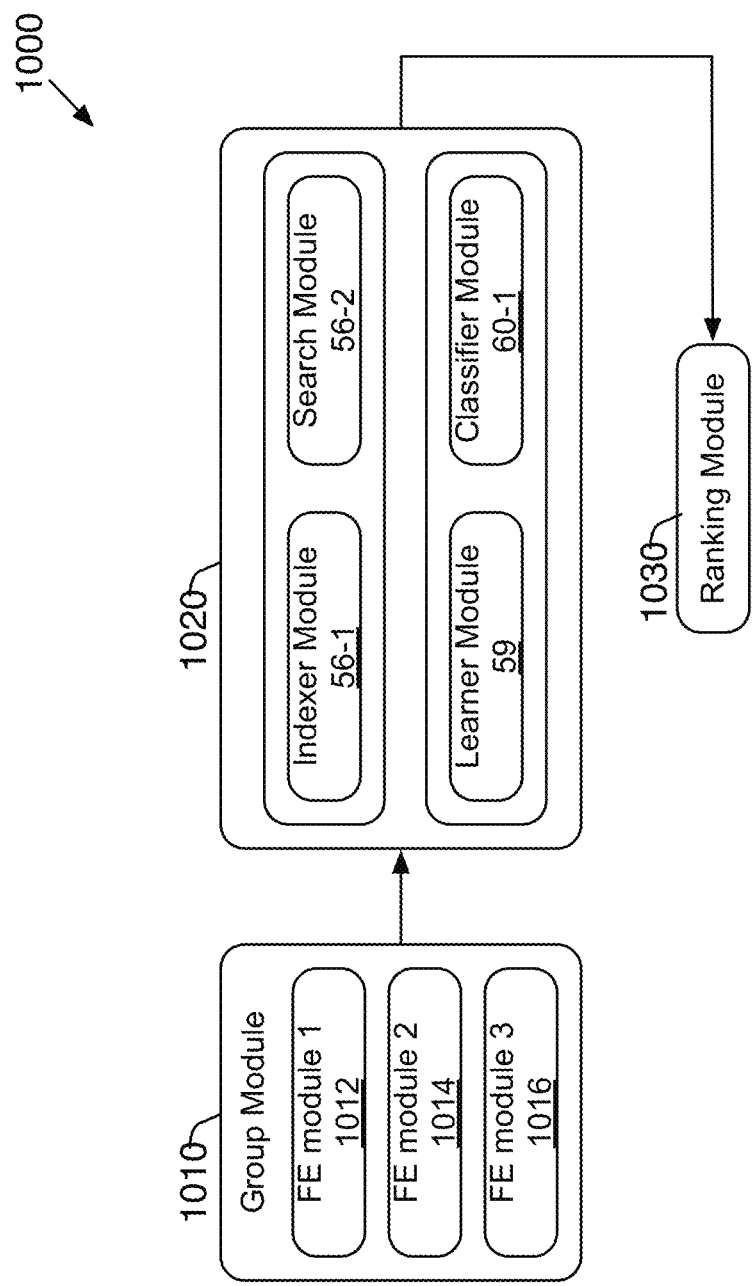
FIG. 20 is a diagram of an adaptable runtime module of a core engine, in accordance with an example embodiment.

FIG. 20 is a diagram of an adaptable module plugin of a core engine, in accordance with an example embodiment. In this example, module 1010 may include a number of feature extraction modules 1012, 1014, 1016, which may operate in parallel as shown. The collective output of module 1010 may flow into module 1020, which may be configured to include a number of modules, for example indexer 56-1 and search module 56-2, and learner module 59 and classifier module 60-1. The modules of 1020 may be configured to be executed in any desired manner for the desired application, e.g., indexer 56-1 and search 56-2 may be configured to operate serially. Learner 59 and classifier 60-1 may also operate serially with respect to each other, while each pair of serial modules (e.g., 56-1 and 56-2, and 59 and 60-1) operate in parallel. A collective output of module 1020 may then be processed by ranking module 1030.

9. Feature Extraction

Figure 21:
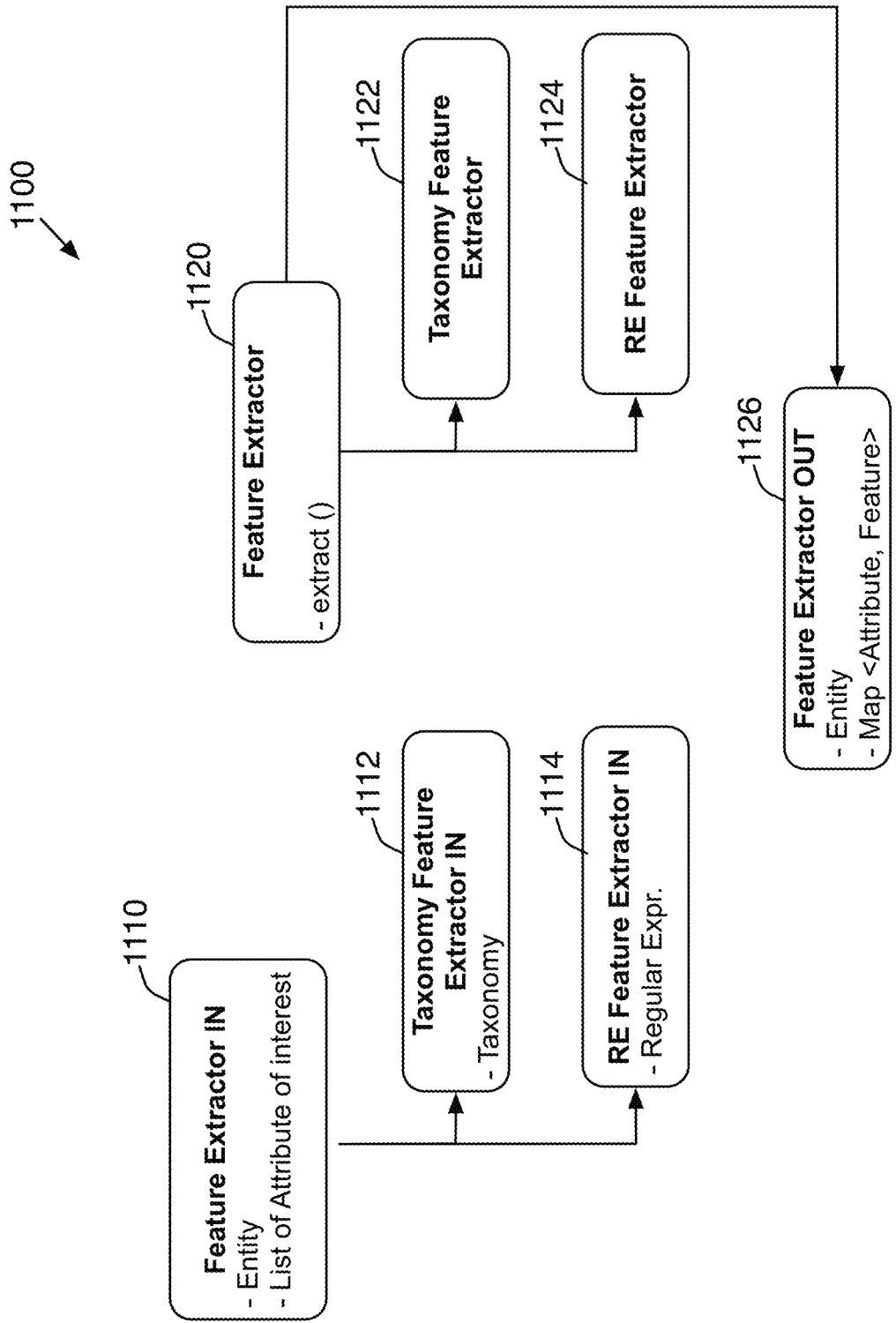
FIG. 21 is a class diagram of a feature extractor of a core engine, in accordance with an example embodiment.
Figure 22:
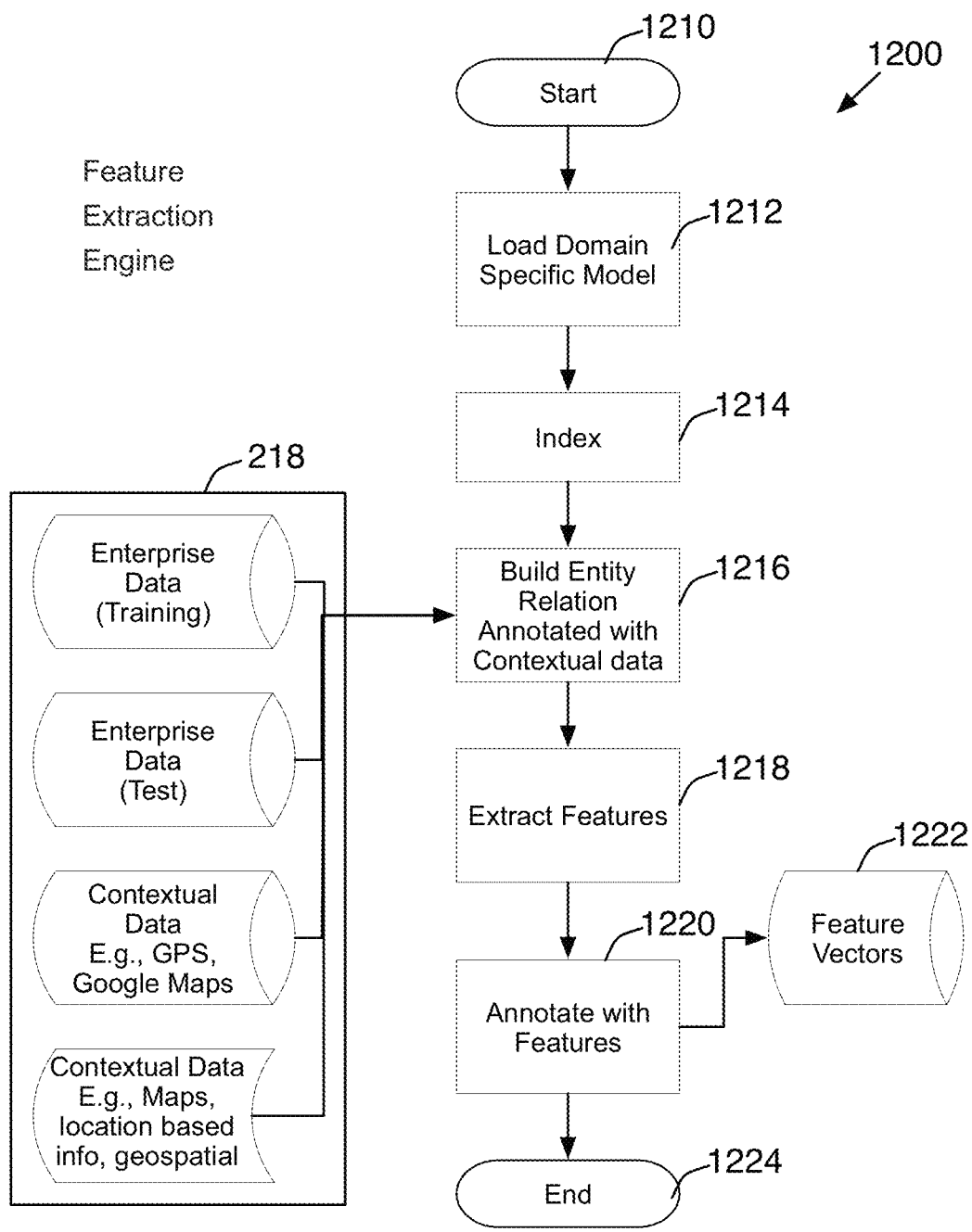
FIG. 22 is a flow chart of a feature extraction method, in accordance with an example embodiment.
Figure 23:
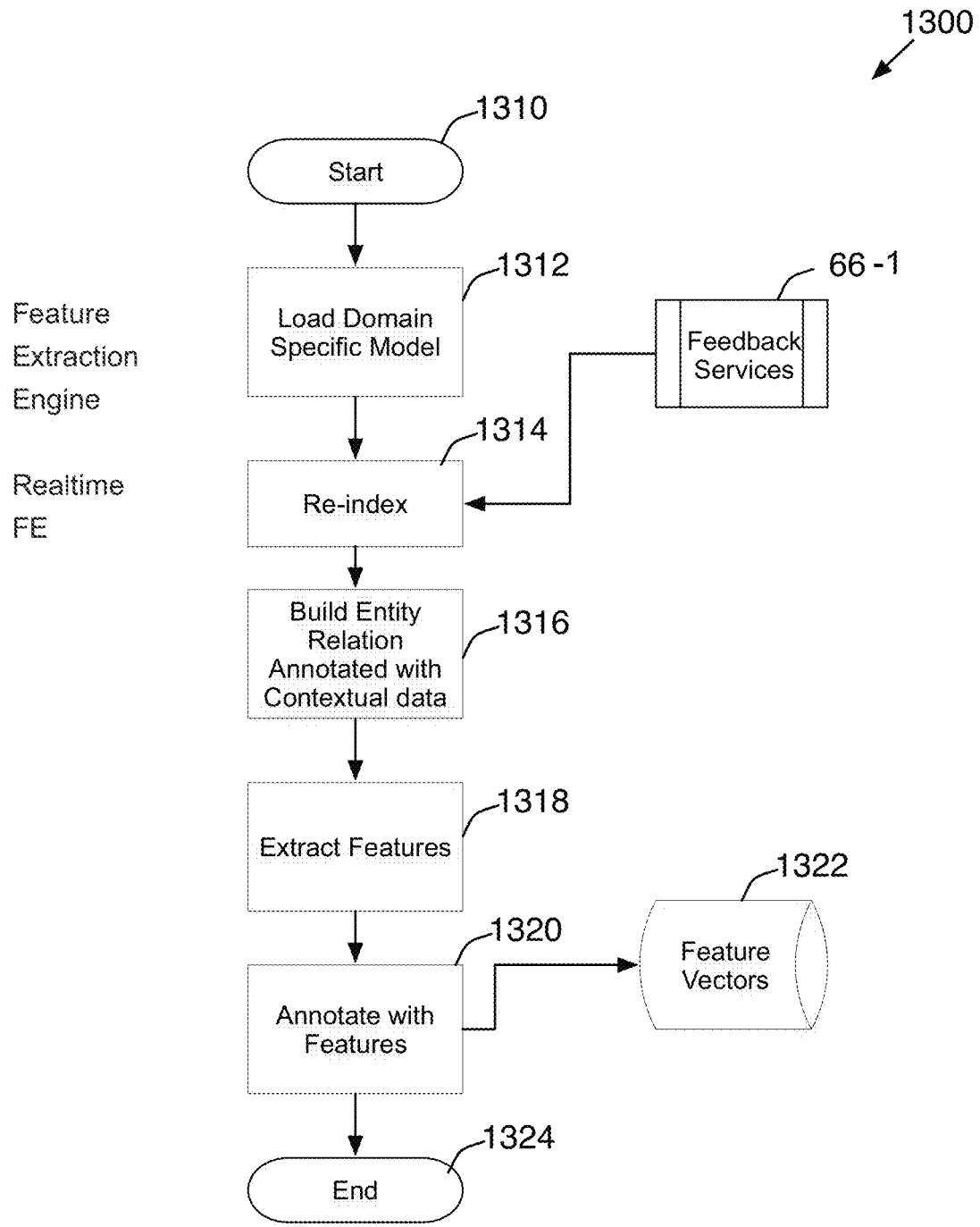
FIG. 23 is a flow chart of a real-time feature extraction method, in accordance with an example embodiment.

Turning now to FIGS. 21-23, feature extraction engine (FEE) 64 provides for quick definition of desired transformation, which plots an entity into hyper-space with each feature contributing towards a new dimension. FEE 64 also facilitates assignment of weights to the extracted feature. Preferably, FEE 64 is a versatile, customizable, configurable and scalable component of the system 30 applicable across various domains and to multiple enterprises.

FIG. 21 is a class diagram depicting aspects of a feature extractor 1100, including an abstract representation of a feature extractor 1120, for generating a feature extractor output 1126, and a feature extractor input 1110 and associated entities Default FEE provides a collection of inbuilt feature extractor tools and allows adding customized feature extractors. Some of the inbuilt feature extractor components may include those described in the following items a-f.

a. Regular Expression Feature Extractor 1114, 1124: Provides extracting features that follow specific pattern, such as symbols, codes, registration numbers. The desired set (e.g., RegEx's) can be defined via configurable medium.

b. Named Entity Feature Extractor (not shown): Used for extracting features associated with name of the Person, Place and Organization. Custom named entities can also be extracted from the content when provided with annotated learning data. FEE provides interface to learn customized named entities and to selectively configure a named entity recognizer.

c. Custom Ontology Feature Extractor (not shown): This feature extractor may be configured to consume the ontology specifically for the domain of interest. Ontology capture structural, syntactic and semantic information. The structural information is available from the hierarchical ontology representation, semantic inferencing can be done through an inference engine. The ontology may be applied over the attribute data to extract and infer features as described via configuration.

d. Custom Taxonomy Feature Extractor 1112, 1122: Many enterprises have their own set of taxonomies developed over the period which is rich source of knowledge base. One of the important set of features are extracted by searching taxonomy terms within attribute content. While doing so, extractor also provides flexibility in accommodating spelling mistakes, synonym matching, abbreviation and span search. These feature provide insight into the enterprises domain and data.

e. NLP Feature Extractor (not shown): NLP features include noun phrase, verb phrases, syntax trees and co-references. These features may be extracted from the textual content.

f. Custom Feature Extractors (not shown) can be developed if need and plugged into the system 30 and will be used just like any other Feature Extractor.

Referring to FIG. 22, an example feature extraction method 1200 is shown, e.g., using feature extractor concept 1100 of FIG. 21 within extraction engine 64 of FIGS. 11-13. Following the start 1210, a domain-specific model is loaded 1212. The model attributes are indexed 1214. Enterprise data 218, including training data, test data, and contextual data, is applied to the domain-specific module to build and entity relation annotated with contextual data in 1216. Features are then extracted 1218 and the model is annotated with features 1220 and stored as feature vectors 1222. When feature extraction is complete, the process ends 1224.

In FIG. 23, a method 1300 of using feature extraction engine 64 for real-time feature extraction is shown. This model may be the same domain-specific model that was processed in method 1200 above, where method 1300 is applied to further improve or augment the model using real time information. Following start 1310, the domain specific model is loaded 1312. Real-time information from feedback services 66-1 (of FIG. 12) is applied and the model is re-indexed 1314. The information may be, for example, from connected devices or user terminals in an enterprise. In the vehicle service example, information provided by feedback services 66-1 may include a new work order entered by a service technician, or diagnostic information from a connected device, or involve a query from query engine 290. Using the re-indexed model, an entity relation annotated with contextual data is built or modified 1316. Features are extracted 1318, the model is annotated with features 1320, and feature vectors are stored 1322 as described above. The process ends at 1324.

As described with respect to other figures above (e.g., FIG. 13), the foregoing example feature extraction methods 1200 and 1300 may be applied using the system to any desired enterprise, including without limitation vehicle repair information, vehicle repair, healthcare, home appliances, electronics, or aeronautics enterprises.

Figure 24:
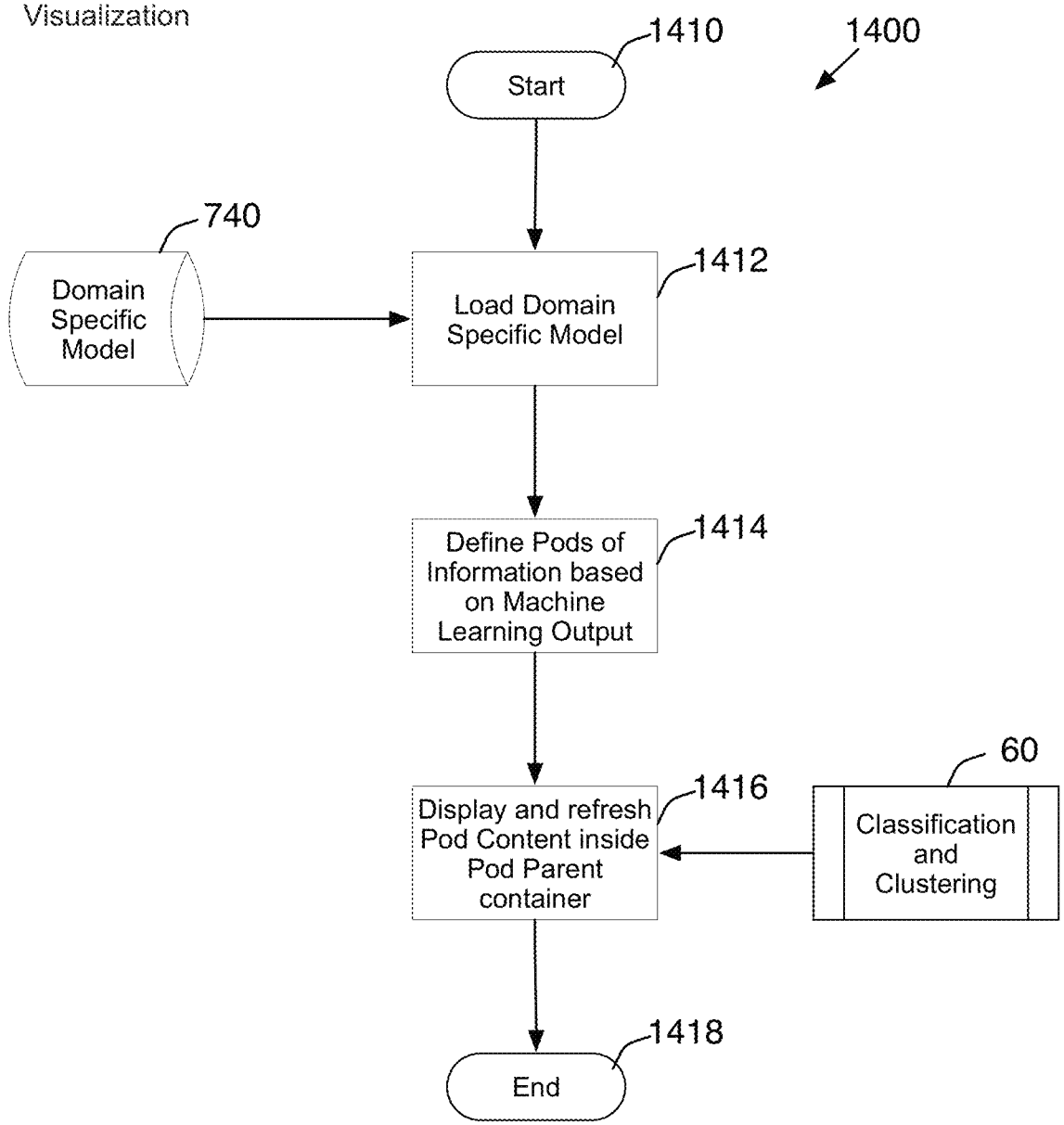
FIG. 24 is a flow chart of a visualization method, in accordance with an example embodiment.

Turning now to FIG. 24, a method for visualization 1400 is illustrated. After the start 1410, a domain specific model 740 is loaded 1412 into visualization engine (e.g., engine 68 of FIG. 11). Pods, or displayable units, of information are defined 1414 based on machine learning output, or based on the results of processing enterprise information applied to the domain-specific model using processing modules within core 54 of the system as described herein. Classification and clustering engine 60 may be applied to pods and pod content is displayed and refreshed 1416 inside a pod parent container, or a template for displaying pods. The process ends at 1418, e.g. when completed are displayed, e.g., via dashboard 86, or an end-user interface.

10. Enterprise Data Examples

The systems and methods described herein may be adapted to model into features applicable to any enterprise context and to drive classification and clustering of data. Enterprise context can be, for example, vehicle service data, vehicle repair data, customer transactional data, server performance data, or various other types of data applicable to an enterprise or an industry, or a particular service or application within an enterprise or industry. For example, a service repair business may have enterprise-specific data, records and other information concerning issues or symptoms, diagnoses, recommended actions, repairs, parts, and/or recommendations depending on the particular domain: e.g., vehicle, automotive, healthcare, home appliances, electronics, or aeronautics.

a. Vehicle Service Enterprise Example:

In some embodiments, the systems and methods described herein may be used to process vehicle-service data, such as repair orders pertaining to vehicles repaired at a repair shop. Processing the vehicle-service data can include, but is not limited to, determining a meaning of the vehicle-service data, generating metadata regarding the vehicle-service data or regarding the meaning of the vehicle-service data, and generating vehicle-service content (e.g., repair information) based, at least in part, on the metadata and a taxonomy defined for use by the system.

In this example, sources of vehicle-service data can include, for example, data from a vehicle repair shop, data from a vehicle manufacturer, or data from a vehicle repair technician. The vehicle-service data can include, for example, data from vehicle repair orders including financial data, parts data, or repair procedures.

Processing the vehicle-service data can include, but is not limited to, processing any type or types of vehicle-service data. Any of the vehicle-service data processed by the processor can include gibberish. Processing vehicle-service data including gibberish can result in determining a meaning of that vehicle-service data.

FIG. 25 is an illustration of a user interface (UI) 1500 of a dashboard 86 adapted for use by a domain expert to interact with the system to translate the expert's knowledge into a model (a priori and a posteriori). UI 1500 may include tabs or selectable features for any portion of the modeling process, including feature selection 1512, strategy builder 1514, learning 1516, 1518, test run 1520, and domain model 1522. Fields for entering and/or displaying simulated training data 1530 and simulated test data 1540 can be displayed, as well as display units for suggested features 1560 and custom features 1570.

DOMAIN MODEL—The following data examples show how the system 30 adapts to different business problems.

```
Domain Knowledge {
    aprioriList of type List<Knowledge>;
    aposterioriList of type List<Knowledge>;
}
Knowledge {
    features of type List<Feature>;
    rules of type List<Feature Rule>;
}
Feature {
    name of type string;
    description of type string;
}
Feature Rule {
    conditions of type List<Conditions>;
    actions of type List<Action>;
}
Condition {
    Expressions;
    Operators;
    Evaluation;
}
Action {
    Command;
    entities in Domain Data;
}
Domain Data {
    entities of type List<Entity>;
}
Entity {
    attributes of type List<Attribute>;
}
```

DOMAIN KNOWLEDGE—The domain knowledge model represents two types of knowledge base for feature extracting. The first is a priori knowledge, where given a set of predefined results, the system will extract features from the domain data set and systematically match them with existing training data. The second is a posteriori knowledge where the system is trained with the help of domain experts offering specific clues for the system.

KNOWLEDGE—The knowledge data encapsulates a list of features to look for in the domain data set, as defined by domain metadata, and a list of rules to apply to the data.

FEATURE—The feature model is a description of features that are to be extracted from the domain data set.

FEATURE RULE—The feature rule contains a set of conditions that must be met before applying the list of actions to the domain data set.

CONDITION—Conditions represent a combination of logic expressions and operators to test for, and an evaluation of those expressions.

ACTION—Actions represent an enrichment to be applied to the data.

b. Domain Model Example

A Priori example:

A repair code 123 has known list of a commonly failed vehicle parts such as an O2 sensor, and an intake manifold gasket.

```
Knowledge {
    features : [ "code]
        feature rules : [ { "code in (P0128, P0302, P0304)", "set priority to P0128 only" }]
}
``` a Posteriori example:

When P0128, P0302, P0304 occurs, focus only on P0128 because if P0128 is cleared, P0302, P0304 automatically gets cleared.

```
Knowledge {
    features : [ "code]
    feature rules : [ { "code in (P0128, P0302, P0304)", "set priority to P0128 only" }]
}
```

Data Examples: Table 1 shows example data that may initially include millions of unique data records, but the example data is not so limited.

TABLE 1

| Business problem | Interaction | Input to System (Repair, request customer complaint, Facebook post, Twitter feed) |
|---|---|---|
| Fix cars faster | Shop advisor responds to customer complaint at shop | The truck is running bad, hard to start. Fuel Intake manifold gasket. There is a code P01XYZ and P030X. Took the upper intake manifold off. |
| Easy diagnosis of heavy equipment using a mobile phone | Heavy Equipment Operator trying to self-diagnose by searching in trouble shooter | Vibrating, showing Error code E01, 101, 102 for a Komatsu Pc600. |
| Consumer sentiment analysis of a new product launch | Marketing manager trying to analyze customer complaints, Twitter posts, Facebook posts | Not receiving text messages, phone quality choppy, Samsung Dxx30 not powering up, love this phone. |

TABLE 2

| Noun Phrase 1 | Verb | Noun Phrase | Noun Phrase | Taxonomy/ Ontology | Features | Solution | Domain |
|---|---|---|---|---|---|---|---|
| P0XYZ, P030X | Replaced | Fuel Injector set | hard to start | Parts list, OEM Parts | Codes, Part, Action taken, Symptom | P0654, P030X, Replaced Injectors and Pressure Regulator | Automotive |
| E01, 101, 102 | cleaned | Governor/ Throttle | vibrating | Komatasu OE parts, ErrorCodes | Codes, Part, Action taken, Symptom | E01, 101, 102 cleaned Governor/ Throttle Sensor | Heavy Equipment |
| Dxx30 | | | not powering up | Sentiment Taxonomy | Samsung model, sentiment, complaints | | Retail | a priori example:

A repair code 123 has known list of a commonly failed vehicle parts such as an O2 sensor, and an intake manifold gasket.

```
Knowledge {
    features : [ "code]
    feature rules : [ { "code in (P0128, P0302, P0304)", "set priority to P0128 only" }]
}
```

III. Example Repair Order (RO)

FIG. 4 shows an example RO 401. RO 401 can be a hard-copy RO (e.g., an RO printed on one or more pieces of paper). One or more pages of a hard-copy RO can be generated when a top page of the hard-copy RO is printed or otherwise written on. Moreover, a hard-copy RO can include hand-written technician notes on a backside or other part of the hard-copy RO. An RO can be referred to by other terms such as, but not limited to, a service order or a work order.

Alternatively, RO 401 can be a computer-readable RO generated by SDS 103 or one or more service tools (e.g., one or more of service tools 503, 505, and 507). Unless specifically referred to as a hard-copy RO or the context indicates otherwise, RO 401 refers to a computer-readable RO. As an example, RO 401 can be arranged as a structured query language (SQL) file, an extensible markup language (XML) file, a comma-separate-variable (CSV) file, or some other computer-readable file. RO 401 can be provided to DPR 107 over network 105.

RO 401 includes multiple fields. As shown in FIG. 4, RO 401 includes a service provider identifier field 403, a date of service identifier field 405, a customer indicator field 407 that indicates a customer seeking service of a given vehicle, vehicle information field 409 that indicates the given vehicle, a service request field 413 indicating the complaint or service requested by the customer, a parts information field 415 indicating parts obtained for servicing the given vehicle, and service procedure information fields 417, 419, and 421 indicating service procedures carried out on the given vehicle.

Service provider identifier field 403 can include, e.g., information that indicates a name and geographic location of the service provider. Vehicle information field 409 can include a vehicle identification number (VIN) 411 associated with the given vehicle and a description of the given vehicle. Service procedure information fields 417, 419, and 421 can include information within distinct sections 423, 425, and 427, respectively, of RO 401. The service procedure information within any one distinct section 423, 425, and 427 can be unrelated to the service procedure information with any other distinct section. Alternatively, two or more distinct sections including service procedure information can pertain to related service operations performed on the given vehicle.

RO 401 includes labor operation codes (LOC). The labor operation codes can conform to those defined by a vehicle manufacturer, a service provider that generates an RO, a service information provider, such as Mitchell Repair Information, LLC, Poway, Calif., or some other entity. For simplicity of FIG. 4, the labor operation codes are shown within parenthesis, such as (C45) and (C117). Each LOC can refer to a particular operation performed to the given vehicle. A DPM within system 101 can use a LOC to determine what type of operation was performed to the given vehicle if other information regarding that operation is incomplete or described using non-standard phrases or terms. A DPM can also use LOC to determine the meaning (e.g., context) for a service line of the RO.

Each field of RO 401 can be associated with a tag or other identifier so that processor 111 can determine what the content of the field represents. Other examples of fields that can be included on a computer-readable RO include a YMM, YMME, or YMMES field, a fluids field for indicating vehicle fields replaced in the vehicle, a VIN field, and a field for handwritten notes from the technician or another person at the repair shop. Other examples of repair order fields are also possible.

IV. Construction of Service Data Using Standard Terms

FIG. 5 shows a system 501 for intercepting a user-input (e.g., an unstructured or non-standard term) entered at a service tool and for replacing or at least providing an option for replacing the intercepted user-input with a standard term so as to generate service data, such as vehicle-service data, with standard terms. Generating service data using standard terms can be beneficial to humans and computing systems that use the service data. Humans may be able to more easily understand service data using standard terms. Providing service data using standard terms to elements of a computing system, such as system 101, can reduce the burden on that system to have to convert service data with one or more unstructured or non-standard terms to service data using standard terms. The vehicle-service data generated using standard terms can comprise an RO.

System 501 includes SDS 103, network 105, and taxonomies 113, 115, 117, 119, and 121, all of which are shown in and described with respect to FIG. 1. System 501 includes a standard service data (SSD) DPM 511. SSD DPM 511 can be configured like DPM 201, shown in FIG. 2, such that SSD DPM 511 includes a processor, a communications interface, a user interface with display device and selector, and a computer-readable medium including CRPI. The processor of SSD DPM 511 can be processor 111 shown in FIG. 1 or another processor. Taxonomies 113, 115, 117, 119, and 121 or other taxonomies can be located within a computer-readable medium of SSD DPM 511.

System 501 can include one or more other SDS configured like SDS 103 or otherwise. Each SDS of system 501 can be connected to one or more service tools. System 501 is shown with service tools 503, 505, and 507 connected to SDS 103. One or more of service tools 503, 505, and 507 can be configured to communicate directly with SSD DPM 511 over network 105. Additionally or alternatively, one or more of service tools 503, 505, or 507 can be configured to communicate indirectly with SSD DPM 511 over network 105 by sending communications to and receiving communications from SDS 103.

Service tool 503 can comprise a service tool used by a service advisor at a repair shop for generating repair orders. As an example, service tool 503 can comprise a DPM, configured like DPM 201 shown in FIG. 2, that is configured to operate as a client device using a shop management program served by a server device. The shop management program can be configured like the SHOPKEY® management system provided by Snap-on Incorporated, Kenosha, Wis.

Service tool 505 can comprise a service tool used by another person at a repair shop. The other person could be a service manager or a parts department manager. Service tool 505 could be another DPM configured to operate as a client device using a shop management program served by a server device.

Service tool 507 is shown connected to a vehicle 509. The connection between a service tool and a vehicle can be carried out using an air interface (i.e., wireless connection) or using a cable (i.e., wired connection). As an example, service tool 507 can be or comprise components of, or be configured to operate like, the VERSUS® wireless diagnostic and information system, the ETHOS® Plus Scan tool, or the MODIS Ultra™ Integrated Diagnostic System, all of which are available from Snap-on Incorporated, Kenosha, Wis. Service tool 507 can receive vehicle-data from vehicle 509 and provide the vehicle-data to SSD DPM 511. Service tool 507 can also provide vehicle-data obtained from vehicle 509 to SDS 103, DPR 107, or EBI system 109.

Any service tool, such as service tool 503, 505, and 507, configured for generating vehicle-service data using a standard term can comprise CRPI to perform any function described herein with respect to generating that service data. Any service tool, such as service tool 503, 505, and 507, configured for generating vehicle-service data using a standard term can include or be configured to operate using a desktop computer, a laptop computer, a tablet device (e.g., a Galaxy Note 10.1 tablet from the Samsung Group, Seoul, Korea), a smartphone, or some other DPM. Examples of generating the vehicle-service data using a standard term are included in the descriptions of FIG. 6 and FIG. 9 below.

A service tool can include or be configured as a diagnostic tool. A service tool can be referred to as a diagnostic tool.

Figure 6:
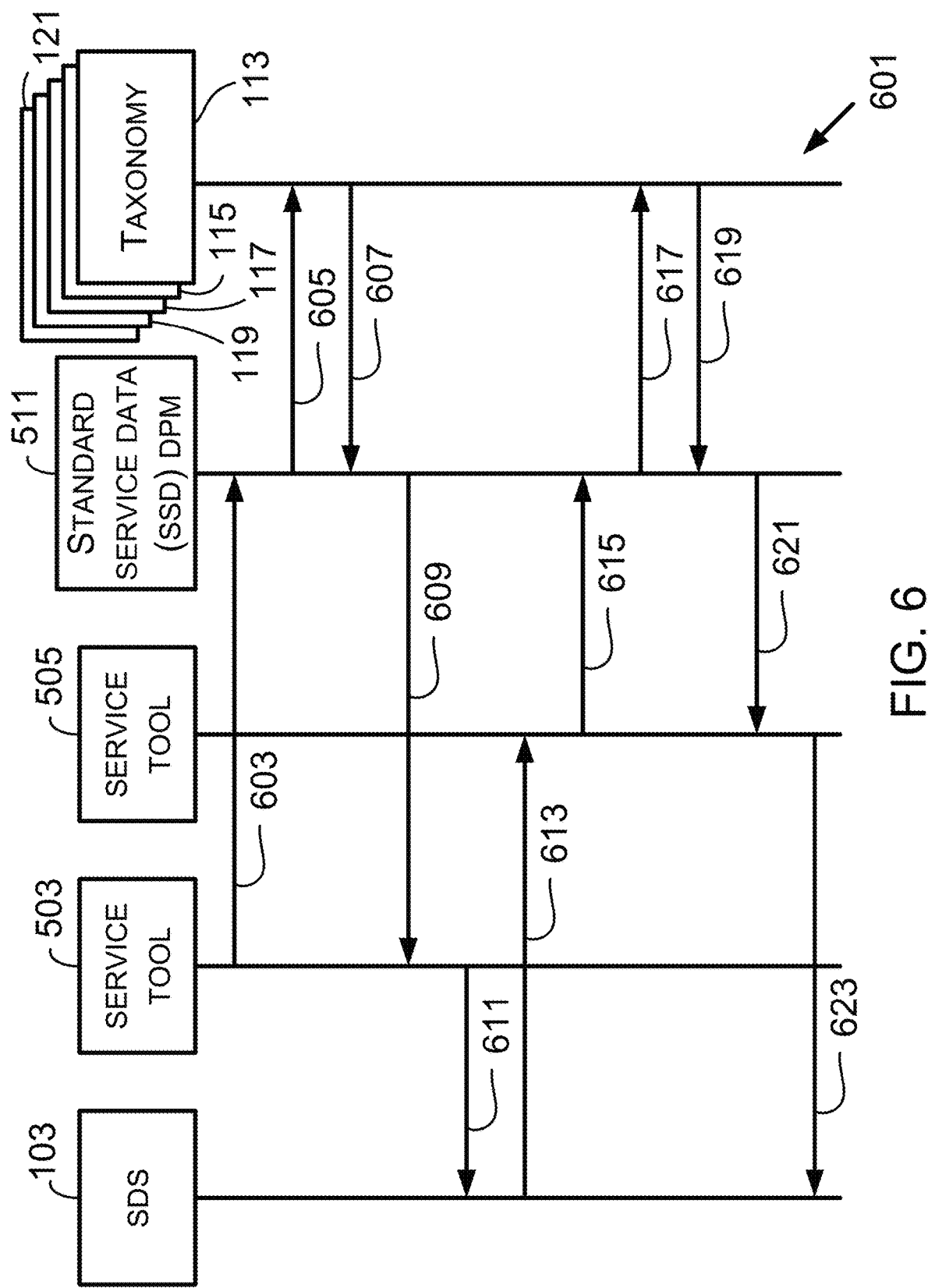
FIG. 6 is a flow diagram for constructing a standard repair order.

FIG. 6 shows a flow diagram 601 for constructing a standard RO at SDS 103. Flow diagram 601 shows several communication flows (or more simply "flows") by way of the lines with arrow heads. The arrow head represents a direction of each flow. For a vehicle to be repaired at a vehicle repair shop, service tool 503 can be used to initiate generating an RO for repairing the vehicle. The service advisor can enter a non-standard term onto the RO based on the vehicle owner's comments regarding the vehicle (e.g., a car) or based on the service advisor's experience. As an example, the non-standard term can be "car dies cold." Flow 603 includes service tool 503 sending the non-standard term to SSD DPM 511. Flow 605 represents SSD DPM 511 searching taxonomies 113, 115, 117, 119, or 121 for the non-standard term received by flow 603. Flow 607 represents SSD DPM 511 receiving a standard term for the non-standard term searched for in response to or by flow 605. Flow 609 represents SSD DPM 511 sending the standard term selected from the taxonomies 113, 115, 117, 119, or 121. As an example, the standard term sent by flow 609 can be "Customer said car stops running when temperature is cold." Flow 611 represents service tool 503 sending the standard term for placement onto the RO which can be stored by SDS 103.

A vehicle technician that operates service tool 505 can be assigned to work on the vehicle. Assigning the vehicle to the technician can include sending the RO from SDS 103 to service tool 505 by flow 613. The technician can enter onto the RO terms regarding the diagnosis and repairs made by the technician. The terms entered using service tool 505 can be sent to SSD DPM 511 by flow 615. As an example, a non-standard term "R/R coolant sensor" can be sent by flow 615. Flow 617 represents SSD DPM 511 searching the taxonomies 113, 115, 117, 119, or 121 for the non-standard term received by flow 615. Flow 619 represents SSD DPM 511 receiving a standard term for the non-standard term searched for in response to or by flow 617. Flow 621 represents SSD DPM 511 sending the standard term selected from the taxonomies 113, 115, 117, 119, or 121. As an example, the standard term sent by flow 621 can be "Replaced ECT Sensor." Flow 623 represents service tool 505 sending the standard term for placement onto the RO which can be stored by SDS 103. Subsequent to the flows shown in FIG. 6, the RO can be completed with the standard terms received from taxonomies 113, 115, 117, 119, or 121 instead of the non-standard terms entered using service tools 503 and 505.

The completed RO can be tagged in some manner to indicate the RO was generated using standard terms. The RO generated using standard terms can be transmitted to DPR 107 alone or with other RO as discussed with respect to FIG. 1. Afterwards, processor 111 can categorize any RO generated using standard terms and generate the metadata, as discussed with respect to FIG. 1, without comparing the terms of the completed RO to the terms of taxonomies 113, 115, 117, 119, and 121, or with completing the comparison of RO terms to the taxonomy terms more quickly.

V. GUI for Generating Vehicle Repair Content

Figure 7:
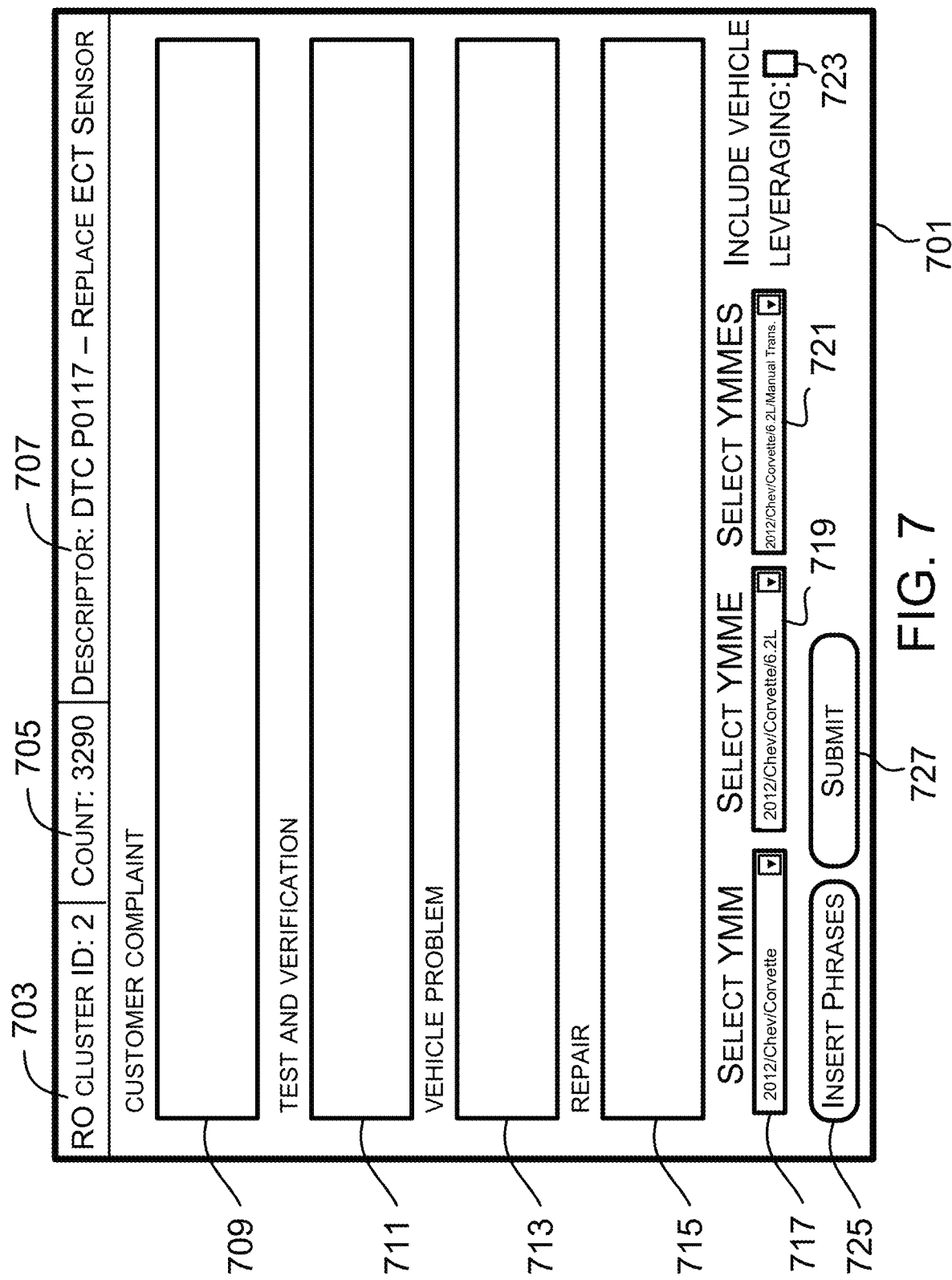
FIG. 7 depicts an example graphical user interface (GUI) for generating vehicle repair content.

Next, FIG. 7 depicts an example graphical user interface (GUI) 701 for generating vehicle repair content based, at least in part, on metadata generated by processor 111, data extracted from service data by processor 111, or a defined taxonomy, such as taxonomy 113, 115, 117, 119, or 121. Vehicle repair content can be one type of vehicle service content. Content authoring DPM 133 can be configured to execute CRPI (e.g., CRPI 213) to display GUI 701 or any portion thereof using display device 215 and to receive selections selectable by selector 217 while GUI 701 is displayed.

GUI 701 includes an RO cluster identifier segment 703 to present an RO cluster identifier defined by processor 111. For this example, GUI 701 is displaying RO cluster number 2 from FIG. 3. GUI 701 includes a count segment 705 to present a quantity of RO within the RO cluster shown in RO cluster identifier segment 703. For this example and consistent with FIG. 3, the count for RO cluster number 2 is 3,290 repair orders. GUI 701 includes a descriptor segment 707 to present a brief description of the metadata defining the RO cluster shown in RO cluster identifier segment 703.

GUI 701 includes a customer complaint segment 709, a test and verification segment 711, a vehicle problem segment 713, and a repair segment 715. Each of those segments can present text (e.g., phrases) to form vehicle-service content regarding the RO cluster. As an example, the vehicle-service content can comprise a vehicle repair tip that includes standard terms from a taxonomy to define a customer complaint, a test procedure and a verification procedure, a vehicle problem, and a repair procedure common to all 3,290 repair orders classified into the RO cluster number 2. GUI 701 can include other segments for including additional aspects of vehicle repair content. For example, another segment could be a vehicle-data segment to show numeric values and names of vehicle-data captured from vehicles pertaining to repair orders that form the RO cluster.

The terms presented by segments 709, 711, 713, and 715 can be presented based on terms selected from a taxonomy using an insert phrases selector 725 or some other selector. For instance, selecting insert phrases selector 725 can present one or more suggested phrases for entry into a segment 709, 711, 713, or 715 of GUI 701. Additionally or alternatively, the terms presented by segments 709, 711, 713, and 715 can be selected from a taxonomy by a processor, such as processor 111 or a DPM processor, such as processor 203.

GUI 701 includes filters 717, 719, and 721, a vehicle leveraging checkbox 723, and the insert phrases selector 725. The 3,290 repair orders classified into RO cluster number 2 can be for multiple types of vehicles. Filter 717 is a YMM filter that can be used to select a year/make/model to associate with the content generated by using GUI 701. Filter 719 is a YMME filter that can be used to select a year/make/model/engine to associate with the content generated by using GUI 701. Filter 721 is a YMMES filter that can be used to select a year/make/model/engine/system to associate with the content generated by using GUI 701.

A filter 717, 719, or 721 could be selected to include additional content that is applicable to only the vehicles selected by the filter rather than all vehicles represented by the count segment 705. As an example, the additional content can include data from a technical service bulletin regarding the vehicle selected by the filter and regarding the items shown in descriptor segment 707.

The quantity of vehicle types pertaining to the 3,290 repair orders of RO cluster number 2 can be displayed in a portion (not shown) of GUI 701. That portion can also present identifiers of the vehicle types. As an example, the 3,290 repair orders can pertain to two vehicle types (e.g., the Pontiac Grand Prix and the Buick Lacrosse makes and models previously built by General Motors Inc., Detroit Mich.). If content for RO cluster number 2 is generated while the vehicle leveraging checkbox 723 is unchecked, the content can be stored as pertaining only to the two vehicle types that pertain to the ROs. On the other hand, if content for RO cluster number 2 is generated while the vehicle leveraging checkbox 723 is checked, the content can be stored as pertaining to the two vehicle types that pertain to the ROs and any other vehicle types (e.g., the Chevrolet Monte Carlo and the Chevrolet Impala makes and models built by General Motors, Inc.) that is or are similar to the two vehicle types.

GUI 701 includes a submit selector 727 selectable to cause vehicle-service content regarding the cluster ID to be stored in content storage 135. The content stored for an RO cluster or a filtered vehicle of an RO cluster can be stored with metadata used to identify the RO cluster (e.g., the RO cluster identifier). The metadata can be used to locate the stored content for providing to content distributor DPM 137 and for subsequently responding to a search request for the stored content.

VI. Example Operation

A. Classifying Repair Orders Into Repair Order Cluster

Figure 8:
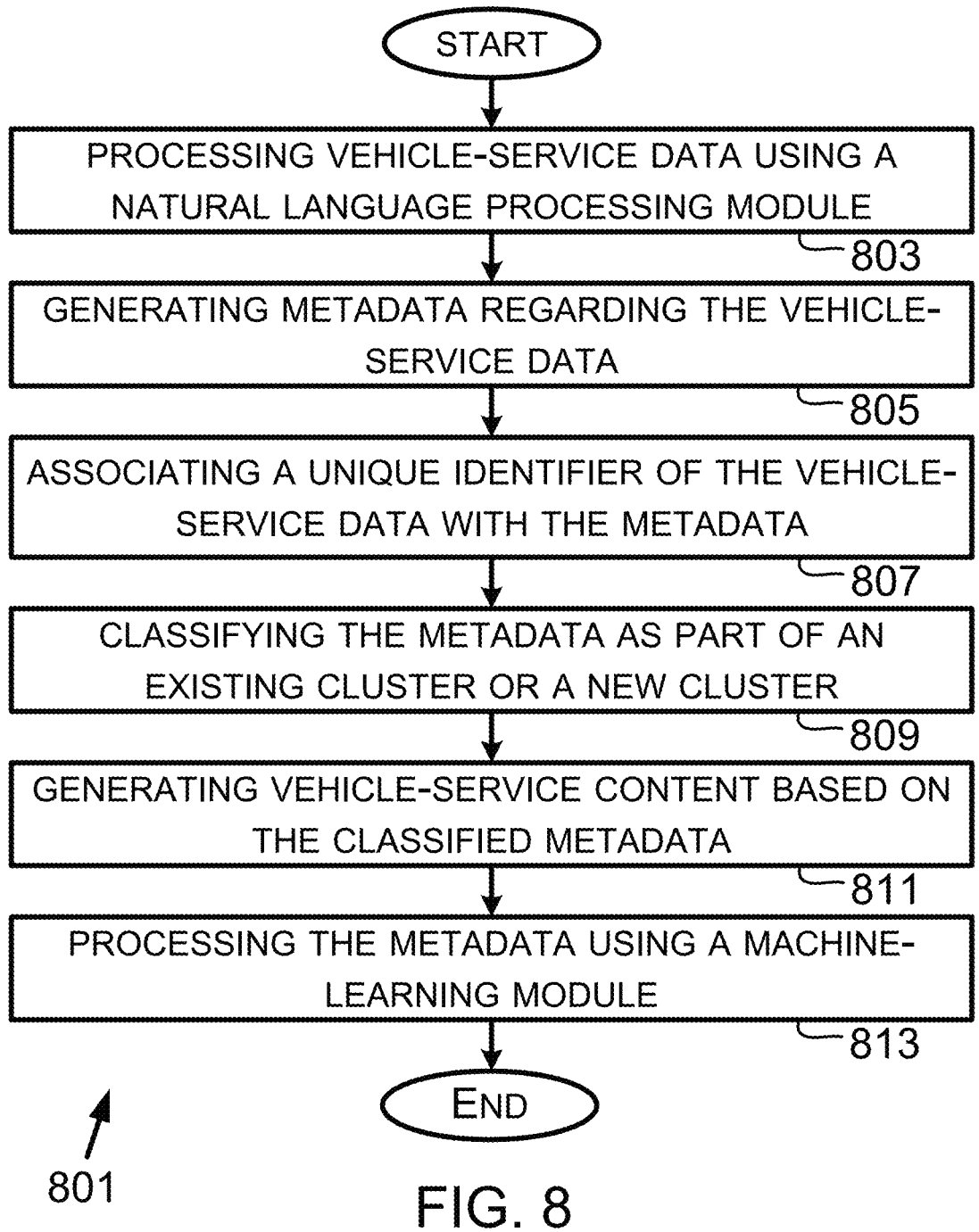
FIG. 8 depicts a flowchart showing a set of operations that can be carried out in accordance with the example embodiments.

Next, FIG. 8 depicts a flowchart showing a set of functions (e.g., operations) 801 (or more simply, "the set 801") that can be carried out in accordance with one or more of the example embodiments described herein. The functions of the set 801 are shown within blocks labeled with odd integers between 803 and 813, inclusive. Any other function(s) described herein can be performed prior to, while, or after performing any one or more of the functions of the set 801. Those other functions can be performed in combination with or separately from any one or more of the functions of the set 801. The description of blocks 803 through 813 includes reference numbers corresponding to elements shown in one or more of the figures. Those reference numbers are listed in this portion of the description as examples only and are not included to limit any of the operations described in this portion of the description.

Block 803 includes processing vehicle-service data using a natural language processing (NLP) module. The NLP module can be configured as CRPI stored in a computer-readable medium, such as a computer-readable medium within a server device including processor 111. Processor 111 can process the vehicle-service data retrieved or received from EBI system 109 or from another computer-readable medium. The vehicle-service data can be in the form of a computer-readable file, such as a CSV file or an SQL file.

Processor 111 can execute the CRPI of the NLP module to process the vehicle-service data. Processor 111 can execute the NLP module or other CRPI to determine if the file including the vehicle-service data is unreadable or does not include any data useable for generating metadata.

Processor 111 can execute the NLP module to identify attributes (e.g., characteristics) of the file including the vehicle-service data. The attributes of the file can indicate portions of the file representing text (e.g., letters, words, phrases, and numbers). Accordingly, executing the NLP module can include identifying or extracting textual portions of the vehicle-service data such as noun phrases and verb phrases. Executing the NLP module can include identifying or extracting numeric portions of the vehicle-service data such as labor operation codes, part numbers, labor prices, part prices, or taxes. In accordance with the foregoing examples, the identified or extracted textual portion could include numeric data and the identified or extracted numeric portion could include textual data.

The identified or extracted textual portions of the vehicle-service data can be compared to one or more taxonomies. Processor 111 can be configured to select an applicable taxonomy for comparison based on the identified or extracted textual portion. As an example, an identified or extracted verb phrase can be compared to labor taxonomy 113 or test term taxonomy 119 since the terms of those taxonomies are most likely to comprise terms describing actions. As another example, an identified or extracted noun phrase can be compared to vehicle parts taxonomy 115 since the terms of that taxonomy is most likely to comprise terms describing a thing (e.g., a vehicle part).

For cases in which the vehicle-service data is from an RO having fields identifying distinct portions of the RO, the fields from which the identified or textual portion of vehicle-service data is located can also be used to select the taxonomy for comparison. If the identified or extracted textual portion is not matched within a first selected taxonomy, the identified or extracted textual portion can be compared to one or more other taxonomies to locate a term that matches the identified or extracted textual portion.

As discussed with respect to FIG. 4, an RO can include multiple fields. Each field of an RO can be tagged to assist processor 111 in identifying a meaning data in the RO field and selecting a taxonomy associated the RO field.

Next, block 805 includes generating metadata regarding the vehicle-service data. Processor 111 can execute the NLP module or another module (e.g., another set of CRPI) to generate the metadata. Generating the metadata can include processor 111 selecting a standard term from an applicable taxonomy that matches a term of the vehicle-service data. Processor 111 can select the standard term based on a context of the vehicle-service data or a portion thereof.

As an example, in the case of the vehicle-service data being arranged as an RO, processor 111 can detect that a portion of the RO includes part information and detect a number and text within that portion of the RO. Processor 111 can search within the parts taxonomy 115 to locate a part number that matches the number within the vehicle-service data or a standard term that matches the text within the labor portion of the vehicle-service data. Processor 111 can generate metadata including the part number or standard term from taxonomy 115. The metadata can comprise data to make up for unstructured or non-standard terms on the RO. Processor 111 can associate the metadata with the file including the vehicle-service data.

Next, block 807 includes associating a unique identifier of the vehicle-service data with the metadata. DPR 107 can associate the unique identifier with the vehicle-service data (e.g., the RO). The unique identifier can accompany the vehicle-service data DPR 107 provides to EBI system 109. Alternatively, EBI system 109 can associate a unique identifier (e.g., an RO cluster identifier) with the vehicle-service data (e.g., the RO or multiple RO). Processor 111 can obtain the unique identifier of the vehicle-service data when obtaining the vehicle-service data. Processor 111 can associate the unique identifier of the vehicle-service data with the metadata generated regarding that vehicle-service data.

Associating the unique identifier with the metadata is beneficial for multiple reasons. A first reason is that the vehicle-service data can be retrieved and reviewed after generation of the metadata by requesting the vehicle-service data based on the unique identifier. A second reason is that the vehicle-service data does not have to be stored within any of the categories 123, 127, 129, or 131. If the vehicle-service data needs to be accessed by a processor referring to the metadata stored in one of categories 123, 127, 129, or 131, the processor can access the vehicle-service data from EBI system 109 based on the unique identifier.

Next, block 809 includes classifying the metadata as part of an existing cluster or a new cluster. Classifying the metadata can include processor 111 executing CRPI to carry out the classification strategy described in Section II, C, or any portion thereof. For instance, processor 111 can execute CRPI arranged as a discovery module to identify associated metadata (e.g., metadata generated from an RO, metadata regarding vehicle-data obtained from a vehicle that pertains to the RO) and to determine a meaning of the associated metadata. Alternatively, some metadata (such as metadata regarding a given RO) may not be associated with any other metadata. In that case, processor 111 can execute the CRPI arranged as the discovery module to determine a meaning of the metadata regarding the given RO.

Classifying the metadata can include processor 111 executing CRPI to classify the metadata. Those CRPI can be referred to as a classification module 60. Processor 111 can classify the metadata into one of unusable category 123, undefined category 125, no-tip category 127, plus-one category 129, and new-tip category 131 or some other definable category using the classification module. If metadata is not generated for vehicle-service data for some reason (e.g., the computer-readable is unreadable), the vehicle-service data itself or the identifier of the vehicle-service data can be classified into unusable category 123.

Table 3 shows an example of classifying metadata regarding vehicle-service data associated with unique identifiers VSD-ID 251 through VSD-ID 277. The vehicle-service data associated with each of those identifiers can comprise separate repair orders or some other type of vehicle-service data. As an example, classifying the metadata could include adding the unique identifiers of the metadata into a table, as shown in Table 3. As another example, a tag associated with a category into which the metadata or the vehicle-service data is classified can be associated with the metadata. Additional aspects regarding Table 3 are discussed below.

TABLE 3

| Unusable Category (123) | Undefined Category (125) | No-tip Category (127) | Plus-One Category (129) | New-tip Category (131) | |
|---|---|---|---|---|---|
| VSD-ID | VSD-ID | VSD-ID | TIP ID (VSD-ID(s)) | VSD-ID | TIP ID |
| 251 | 252 | 257 | A (255, 258, 261, 277) | 253 | A |
| 256 | 259 | 264 | B (262, 265, 275) | 254 | B |
| 268 | 263 | 270 | C (269, 273) | 260 | C |
| 272 | 267 | 274 | D (271) | 266 | D |

Processor 111 can receive the vehicle-service data associated with unique identifiers VSD-ID 251, 256, 268, and 272 and determine, separately or collectively, that the computer-readable file or the contents within the file are unreadable or otherwise unusable. Upon making those determination(s), processor 111 can classify the vehicle-service data for VSD-ID 251, 256, 268, and 272 or those identifiers in unusable category 123.

Although processor 111 can classify the vehicle-service data, the identifier of the vehicle-service data, or the computer-readable file in unusable category 123, at a later point in time, the same vehicle-service data, identifier, or the computer-readable file can be reclassified. Reclassification could occur because additional terms are added to a taxonomy or as a result of machine-learning performed by the machine-learning module.

Processor 111 can receive the vehicle-service data associated with unique identifiers VSD-ID 252, 259, 263, and 267 and determine, separately or collectively, that the computer-readable file or the vehicle-service data is readable but the contents of the vehicle-service data or the meaning of the vehicle-service data is undefined. The vehicle-service data contents or meaning may be undefined because the terms of the vehicle-service data or the metadata are not defined in a taxonomy or for some other reason. Upon determining the vehicle-service data of VSD-ID 252, 259, 263, and 267 is defined, processor 111 can classify the vehicle-service data for those identifiers in undefined category 125.

Processor 111 can receive the vehicle-service data associated with unique identifiers VSD-ID 257, 264, 270, and 274 and determine, separately or collectively, that the computer-readable file including the vehicle-service data associated with those identifiers is readable, but does not include any tip-worthy vehicle-service data, and responsively classify the vehicle-service data, the computer-readable file, or the metadata associated with identifiers VSD-ID 257, 264, 270, and 274 into no-tip category 127. Although processor 111 can classify the vehicle-service data or the metadata into no-tip category 127, at a later point in time, the same vehicle-service data or metadata can be reclassified. Reclassification could occur as a result of additional terms being added to a taxonomy or as a result of machine-learning performed by the machine-learning module. Reclassification could also occur as a result of a new set of rules, such as rule that processor 111 should ignore vehicle body parts listed on an RO regarding an RO having an engine performance complaint.

Processor 111 can receive the vehicle-service data associated with unique identifiers VSD-ID 253, 254, 260, and 266 and determine, separately or collectively, that the computer-readable file including the vehicle-service data associated with those identifiers is readable, the vehicle-service data or the metadata pertaining to the vehicle-service data is tip-worthy, and does not match vehicle-service data or metadata classified into new-tip category 131. Upon making those determination(s), processor 111 can classify the vehicle-service data for VSD-ID 253, 254, 260, and 266 or those identifiers into new-tip category 131. Vehicle-service content, such as a repair tip, can be generated using content authoring DPM 133. As shown in Table 3, a repair tip A was generated from and associated with VSD-ID 253, a repair tip B was generated from and associated with VSD-ID 254, a repair tip C was generated from and associated with VSD-ID 260, and a repair tip D was generated from and associated with VSD-ID 266.

Processor 111 can receive the vehicle-service data associated with unique identifiers VSD-ID 255, 258, 261, 262, 265, 269, 271, 273, 275, and 277 and determine that the computer-readable file including the vehicle-service data is readable, the vehicle-service data or the metadata pertaining to the vehicle-service data is tip-worthy and matches vehicle-service data or metadata already classified into new-tip category 131 and then responsively classify the vehicle-service data or the metadata being processed into plus-one category 129 and associating the vehicle-service data or the metadata with a previously-written tip.

For example, the vehicle-service data or metadata associated with VSD-ID 255, 256, 261, and 277 matches the vehicle-service data or metadata associated with VSD-ID 253, which is categorized into new-tip category 131 and is associated with repair tip A. The vehicle-service data or metadata associated with VSD-ID 255, 256, 261, and 277 is categorized into the plus one category and is associated with repair tip A. Processor 111 can determine the number of instances of vehicle-service data matching vehicle-service data categorized into the new-tip category 131 from the plus-one category 129.

As another example, the vehicle-service data or metadata associated with VSD-ID 262, 265, and 275 matches the vehicle-service data or metadata associated with VSD-ID 254, which is categorized into new-tip category 131 and is associated with repair tip B. As another example, the vehicle-service data or metadata associated with VSD-ID 269 and 273 matches the vehicle-service data or metadata associated with VSD-ID 260, which is categorized into new-tip category 131 and is associated with repair tip C. As another example, the vehicle-service data or metadata associated with VSD-ID 271 matches the vehicle-service data or metadata associated with VSD-ID 266, which is categorized into new-tip category 131 and is associated with repair tip D.

Next, block 811 includes generating vehicle-service content based on the classified metadata. Content authoring DPM 133 can be configured to generate the vehicle-service content. Since content authoring DPM 133 can be configured like DPM 201, content authoring DPM can include the components of DPM 201. Accordingly, processor 203 can be arranged to execute CRPI 213 to generate the vehicle-service content. Display device 215 can display the metadata classified into a new or existing cluster, such as metadata 301 shown in FIG. 3. Selector 217 can select a portion of the classified metadata, such as an RO cluster, and can select a GUI 701 to be displayed by display device 215. Processor 203 can populate segments 709, 711, 713, and 715 of GUI 701 using the metadata of the selected RO cluster. Selector 217 can select submit selector 727 to cause vehicle-service content in the form of a repair tip based on the metadata entered into segments 709, 711, 713, and 715 of GUI 701. The vehicle-service content can be stored by content storage 135.

Content authoring DPM 133 can be configured to allow a user, such as a vehicle-service expert (e.g., a certified technician), to review, revise, and add to the metadata populated into segments 709, 711, 713, and 715 of GUI 701. Any changes to the metadata populated into segments 709, 711, 713, and 715 of GUI 701 can be identified and stored for use by a machine-learning module. Similarly, submission of the metadata populated into segments 709, 711, 713, and 715 of GUI 701 without any changes can be identified as an approval of generating the vehicle-service content for use by the machine-learning module.

Content authoring DPM 133 can be configured to generate vehicle-service content based on cost information within the vehicle-service data obtained from EBI system 109. As an example, the vehicle-service content based on the cost information can include an average cost or a range of costs to perform a repair, an average cost or a range of costs to perform the repair based on a particular geographical location, or an average or range of part replacement costs. The machine-learning module can include CRPI to detect changes in cost information calculated by processor 111 due to inflation, competitive pressure, or some other reason.

Next, block 813 includes processing the metadata using a machine-learning module. The machine-learning module can comprise machine-learning algorithms (e.g., CRPI). Using the machine-learning module can include processor 111 executing the machine-learning algorithms or CRPI and storing revised or new data generated as result of processor 111 executing the machine-learning algorithms or CRPI.

Using the machine-learning module can include processor 111 reclassifying metadata or vehicle-service data categorized into unusable category 123, undefined category 125, or no-tip category into another category, such as new-tip category 131 or plus-one category 129.

Using the machine-learning module can include processor reclassifying metadata or vehicle-service data categorized into plus-one category into a different category. This reclassification can occur in response to machine-learning module learning receiving feedback data to revise algorithms of the machine-learning module. As an example, the feedback data could be received from a service tool, such as service tool 505, rejecting use of standard terms proposed for generating an RO. Other examples of the feedback data are also possible.

VII. Machine-Learning Module Examples

A. Machine-Learning Module—Example 1

The machine-learning module can determine from analyzed vehicle-service data that vehicles serviced by repair shops had a common set of multiple symptoms and can determine a preferred order for working on or diagnosing vehicles in the future that exhibit the same common set of multiple symptoms. The multiple symptoms could be two or more DTCs, pertaining to two or more vehicle parts (e.g., part 1 and part 2), being set active. The machine-learning module can use attributes associated with the vehicle-service data to determine an order of occurrence of repair procedures carried out on the vehicles (e.g., worked on part 1 first, worked on part 2 second). Table 4 includes data showing there are 3,700 ROs in which the repair technician worked on the first part first and replaced parts 1 and 2, and there are 4,022 ROs for which the repair technician worked on the second part first and replaced only part 2. The average (mean) amount of time taken and the average cost to repair the vehicle when the first part was worked on first is 1.25 hours and $281.25, respectively. The average amount of time taken and the average cost to repair the vehicle when the second part was worked on first is 0.5 hours and $142.50, respectively.

TABLE 4

| | Part 1 | Part 2 | Part 1 Replaced | Part 2 Replaced | Time (Mean) | Cost (Mean) | Number of RO |
|---|---|---|---|---|---|---|---|
| Worked First | X | | YES | YES | 1.25 hours | $281.25 | 3,700 |
| Worked Second | | X | NO | YES | 0.5 hours | $142.50 | 4,022 |

Based on the example date shown in Table 4, the machine-learning module can determine that it is less costly and faster to repair vehicles when a repair technician works on (e.g., diagnoses) the second part first. In response to that determination, machine-learning module can generate metadata to indicate a recommended repair procedure. That metadata can be presented by content authoring DPM 133 for generating vehicle service content that identifies the recommended repair procedure for vehicles exhibiting the common set of multiple symptoms.

B. Machine-Learning Module—Example 2

The CRPI of the machine-learning module executable by processor 111 can identify, from vehicle-service data received from EBI system 109, a cluster of repair orders includes one or more aspects of the vehicle-service data that is not part of an existing cluster of repair orders classified into new tip category 131.

As an example, new tip category 131 can include (i) a first RO cluster for repair orders with a first complaint (e.g., customer says service engine soon light on) and a first DTC (e.g., P0111), and (ii) a second RO cluster for repair orders with the first complaint and a second DTC (e.g., P2183). Processor 111 can execute CRPI of the machine-learning module to detect a number of repairs orders (e.g., 3,467 repair orders) that recite the first complaint, the first DTC, and the second DTC and that new tip category 131 does not include an RO cluster for the first customer complaint, the first DTC, and the second DTC. Processor 111 can execute the CRPI of the machine-learning module to discover other common data on the 3,467 repair orders, such as a first test verb, a second test verb, a symptom, a vehicle part, and a fix verb, and then generate metadata for generating a new cluster and displaying the metadata on a display device. FIG. 3 shows an example of this RO cluster (i.e., RO cluster number 3) in metadata 301.

In a first case, an RO cluster generated by processor 111 can be automatically categorized into new tip category. In a second case, an RO cluster generated by processor 111 can be displayed on a display device of content authoring DPM 133. A selector of content authoring DPM 133 can approve or reject classifying the RO cluster into new tip category 131. Content authoring DPM 133 can be configured to modify the displayed metadata of the RO cluster prior to approval of the RO cluster. Processor 111 can store data regarding the approval, modification, or rejection of the RO cluster and refer to that data when generating addition RO clusters.

C. Machine-Learning Module—Example 3

Referring to FIG. 3, a first RO of RO cluster number 2 with 3,290 repair orders pertaining to the first customer complaint and a third DTC (e.g., DTC P0117) can be classified into new tip category 133 and 3,289 repair orders of RO cluster number 2 can be classified into plus one category 131 and associated with vehicle-service content (e.g., a repair tip) generated for the first RO of cluster number 2. Subsequently, the CRPI of the machine-learning module executable by processor 111 can analyze vehicle-service data received from EBI system 109 and determine or discover that the vehicle-service data includes one or more additional repair orders that match repair orders represented by RO cluster number 2. Processor 111 can classify the one or more additional repair orders into plus one category 131 and associate the one or more additional repair orders with vehicle-service content (e.g., a repair tip) generated for the first RO of cluster number 2

Over time, as feedback regarding suggested RO clusters and suggested vehicle-service content is received by the machine-learning module and incorporated into the machine-learning module, processor 111 can analyze one or more repair orders or other vehicles-service data using the modified machine-learning module and determine that the one or more repair orders should be reclassified from one RO cluster to another RO cluster or removed from an RO cluster and classified from one category (e.g., the plus one category 129 to the new-tip category 133). Reclassifying an RO from plus one category 129 can be referred to as a minus one process.

D. Machine-Learning Module—Example 4

FIG. 7 shows GUI 701 for generating vehicle repair content. Processor 111 can execute CRPI of a machine-learning module to generate vehicle repair content by selecting pre-authored text regarding a customer complaint, a test and verification procedure, a vehicle problem, and a repair procedure based on the metadata for a new cluster of vehicle-service data.

The vehicle repair content generated using the machine-learning module can be stored in content storage 124 and subsequently distributed by content distributor DPM 126. In one case, the vehicle repair content generated using the machine-learning module can be stored and distributed (e.g., distributed to a service tool) without a human reviewing the vehicle repair content. In a second case, the vehicle repair content generated using the machine-learning module can be displayed by a GUI, such as GUI 701, so that a human can review, revised, and approve the vehicle repair content generated using the machine-learning module prior to distributing the vehicle repair content to the service tool (e.g., service tool 503, 505, or 507).

Any changes to the vehicle repair content generated using the machine-learning module when displayed by GUI 701 can be provided to the machine-learning module for incorporating into the machine-learning module for use when generating additional vehicle repair content using the machine-learning module or for revising vehicle repair content stored in content storage 124. As an example, GUI 701 can display unapproved vehicle repair content generated by the machine-learning module, receive an additional verification procedure for the test and verification portion of the vehicle repair content, and then receive approval of the modified vehicle repair content. The machine-learning module can associate the additional verification procedure with vehicle-service data clusters similar to a vehicle-service data cluster for which the modified vehicle repair content was generated.

Any vehicle-service content generated using content authoring DPM 133 or otherwise stored in content storage 135 can be associated with metadata for locating the vehicle-service content in response to a request for vehicle-service content, such as a request from a service tool (e.g., service tool 503, 505, or 507). The metadata could, for example, represent a YMM, YMME, YMMES, or some other information regarding vehicles that related to the vehicle-service content, or to terms of the vehicle-service content.

E. Machine-Learning Module—Example 5

Figure 9:
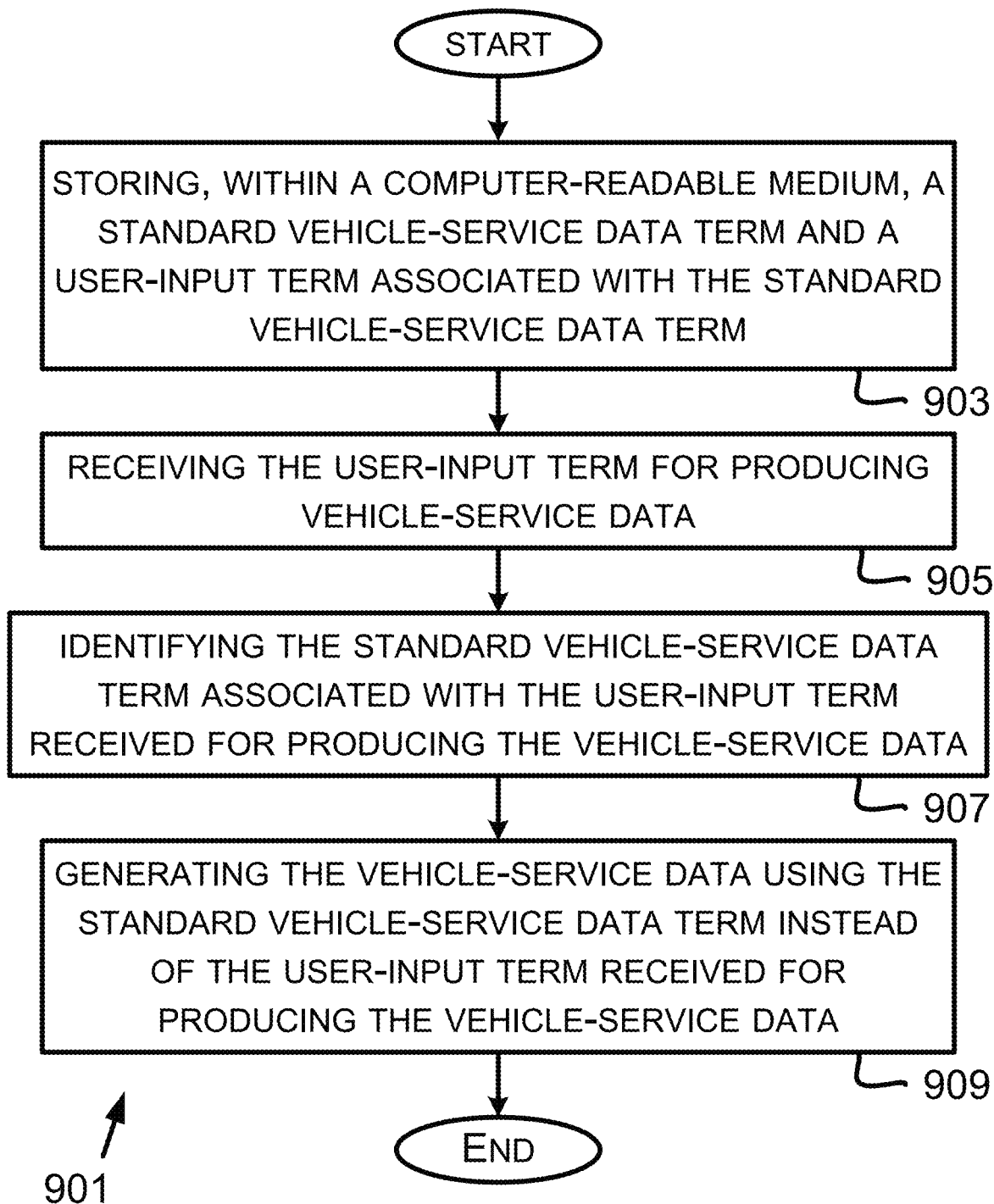
FIG. 9 depicts a flowchart showing a set of operations that can be carried out in accordance with the example embodiments.

FIG. 9 and the description of FIG. 9 refer to standard vehicle-service data terms and user-input terms. Processor 111 can execute CRPI of a machine-learning module to receive the user-input term and track whether approval of an identified standard vehicle-service data term provided to the service tool at which the user-input term was entered occurred. If approval did not occur, the service tool can prompt the user to correct the user-input term. The corrected user-input term can be provided to processor 111 for storing at a computer-readable medium.

Table 5 shows example data that processor 111 can use when executing the CRPI of the machine-learning module.

TABLE 5

| User-input Term | Standard VSD Term | User Approval | Corrected User-Input Term | Count |
|---|---|---|---|---|
| eng. coolant temp. sen. | ECT sensor | YES | N.A. | 457 |
| Therm. | Thermostat | YES | N.A. | 6,099 |
| Therm. | Thermostat | NO | Thermistor | 45 |

In a first instance shown in Table 5, the user-input term is "eng. coolant temp. sen." The standard vehicle-service data term "ECT sensor" has been approved by the user 457 times (i.e., the count). No corrected user-input term was received since the standard vehicle-service data term was approved.

In a second instance shown in Table 5, the user-input term is "Therm." The standard vehicle-service data term "Thermostat" has been approved by the user 6,099 times. No corrected user-input term was received for those 6,099 approved uses of replacing the user-input term "Therm." with the standard vehicle-service data term "Thermostat."

In a third instance shown in Table 5, the user-input term is "Therm." The standard vehicle-service data term "Thermostat" was rejected (i.e., not approved) by the user 45 times. For those 45 occurrences, the user provided a corrected user-input term "Thermistor" by the service tool.

Processor 111, executing the CRPI of the machine-learning module, can refer to data as shown in Table 5 to determine whether a new standard vehicle-service data term should be added to a taxonomy, such as one of taxonomies 123, 125, 127, and 129. As an example, processor 111 can make that determination after the count for a corrected user-input term has been entered a threshold number of times (e.g., 1,000 times).

Processor 111, executing the CRPI of the machine-learning module, can refer to the data shown in Table 5 to determine whether an existing standard vehicle-service data term associated with a non-standard user-input term should be replaced with a corrected user-input term. As an example, processor 111 can make that determination after the count for a corrected user-input term being entered to replace the non-standard user-input term exceeds a count for how many times the current standard vehicle-service term associated with the non-standard user-input term by a threshold amount (e.g., 500 times).

F. Machine-Learning Module—Example 6

The CRPI of the machine-learning module executable by processor 111 can identify, from vehicle-service data received from EBI system 109, vehicle usage data (e.g., mileage or hours of engine use) from the vehicle-service data to identify when symptoms are occurring for specific vehicles for generating vehicle-service content comprising a projection regarding the symptoms occurring for the specific vehicles. A prior example referred to the 3,290 repair orders of RO cluster number 2 (shown in FIG. 3) pertaining to the Pontiac Grand Prix and Buick Lacrosse vehicles. As an example, half of the ROs can pertain to Grand Prix vehicles and the other half of the ROs can pertain to Buick Lacrosse vehicles. Processor 111 can determine that the average mileage on the Grand Prix vehicles when the ECT sensors are replaced is 46,000 miles, and that the average mileage on the Buick Lacrosse vehicles when the ECT sensors are replaced is 71,000 miles. Processor 111 can calculate new mileage averages each time one or more repairs orders for RO cluster number 2 and a Grand Prix or Buick Lacrosse vehicle is processed by processor 111. The projections regarding the symptoms occurring for the specific vehicles can be used to inform repair technicians of likely repairs to be needed as the specific vehicles approach the vehicle usage levels pertaining to the projections.

VIII. Intercepting Repair Order Terms

Next, FIG. 9 depicts a flowchart showing a set of functions (e.g., operations) 901 (or more simply, "the set 901") that can be carried out in accordance with one or more of the example embodiments described herein. The functions of the set 901 are shown within blocks labeled with odd integers between 903 and 909, inclusive. Any other function(s) described herein can be performed prior to, while, or after performing any one or more of the functions of the set 901. Those other functions can be performed in combination with or separately from any one or more of the functions of the set 901. The description of blocks 903 through 909 includes reference numbers corresponding to elements shown in one or more of the figures. Those reference numbers are listed in this portion of the description as examples only and are not included to limit any of the operations described in this portion of the description.

Block 903 includes storing, within a computer-readable medium, a standard vehicle-service data term and a user-input term associated with the standard vehicle-service data term. The computer-readable medium storing those terms can be a computer-readable medium that stores taxonomies 113, 115, 117, 119, or 121. Moreover, those terms can be within one or more of taxonomies 113, 115, 117, 119, or 121. As an example, the user-input term can be "eng. coolant temp. sen." and the standard vehicle-service data term can be "ECT sensor." Multiple user-input terms can be associated with a standard vehicle-service data term.

Next, block 905 includes receiving the user-input term for producing vehicle-service data. The user-input term can be input (e.g., entered or received) by a service tool, such as service tool 503, 505, or 507 shown in FIG. 5, or a component thereof. The service tool at which the user-input term is entered can determine the user-input term is entered as part of vehicle-service data being generated by the service tool.

The service tool that receives the user-input term can include a list of the standard vehicle-service data terms for comparing to the user-input term. If the user-input term matches a standard vehicle-service data term, the service tool can use the user-input term for generating the vehicle-service data. If the user-input term does not match a standard vehicle-service data term or if the service tool does not include the list of the standard vehicle-service data terms, the service tool can transmit the user-input term to SSD DPM 511 by way of network 105, by SDS 103 and network 105, or by some other manner.

Additionally or alternatively, receiving the user-input term can include SSD DPM 511 or a component thereof receiving the user-input term entered by a service tool.

Next, block 907 includes identifying the standard vehicle-service data term associated with the user-input term received for producing the vehicle-service data. A processor that receives the user-input term, such as a processor of a service tool or of SSD DPM 511, can execute CRPI to search a computer-readable medium comprising the user-input and standard vehicle-service data terms to identify the standard vehicle-service data term associated with the user-input term. The processor can select the identified standard vehicle-service data term.

If a device (e.g., SSD DPM 511) that includes the processor that selects the identified standard vehicle-service data term is distinct (e.g., remote) from the device (e.g., a service tool 503, 505, or 507) at which the user-input term was entered, the SSD DPM 511 can transmit the identified standard vehicle-service data term to the service tool. Transmitting the standard vehicle-service data term to the service tool can include transmitting the user-input term with the standard vehicle-service data term so as to identify which user-input term is associated with the standard vehicle-service data term.

After selection of the standard vehicle-service data term, the device at which the user-input term was input (e.g., a service tool 503, 505, or 507) can present the identified standard vehicle-service data term and an option to generate the vehicle-service data using the standard vehicle-service data term instead of the user-input term. The service tool can receive a selection to generate the vehicle-service data using the standard vehicle-service data term or a selection to generate the vehicle-service data using the user-input term rather than the standard vehicle-service data term.

Next, block 909 includes generating the vehicle-service data using the standard vehicle-service data term instead of the user-input term received for producing the vehicle-service data. Generating the vehicle-service data can include storing the vehicle-service data using the user-input terms into a computer-readable medium and replacing any of the stored user-input terms with the standard vehicle-service data terms received for generating the vehicle-service data. The vehicle-service data can comprise user-input terms and the standard vehicle-service data terms identified and approved to replace one or more user-input terms. The vehicle-service data can be provided to SDS 103, DPR 107 or to another device of systems 101 or 501.

As an example, the vehicle-service data referred to in the description of FIG. 9 can comprise repair order (RO) data for an RO begin generated or revised at a repair shop. As another example, the vehicle-service data referred to in the description of FIG. 9 can comprise data for providing to an electronic technician's notebook stored in the cloud. Other examples of the vehicle-service data are also possible.

IX. Content Based On Multi-DTC Rules

Figure 10:
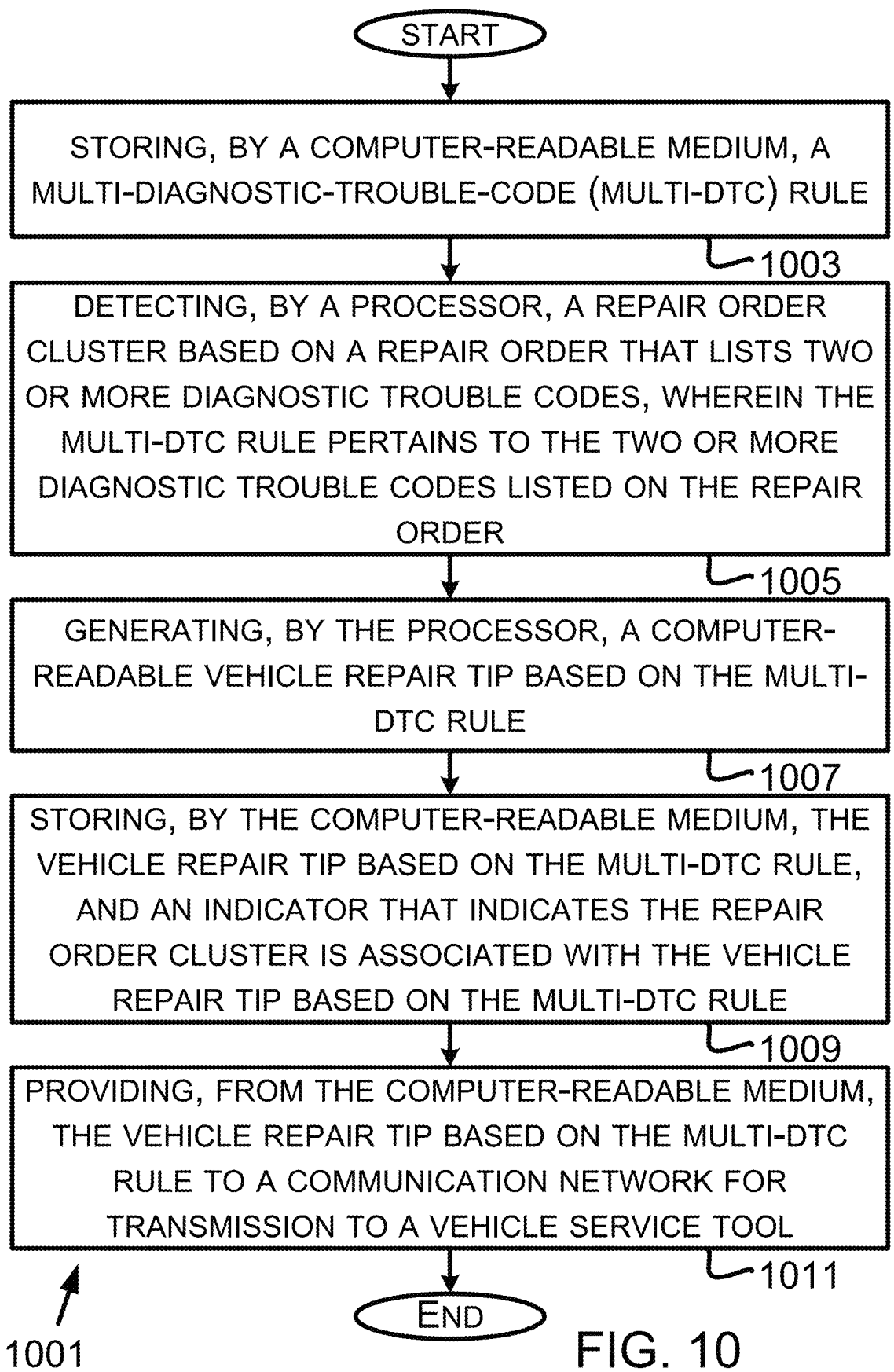
FIG. 10 depicts a flowchart showing a set of operations that can be carried out in accordance with the example embodiments.

Next, FIG. 10 depicts a flowchart showing a set of functions (e.g., operations) 1001 (or more simply, "the set 1001") that can be carried out in accordance with one or more of the example embodiments described herein. The functions of the set 1001 are shown within blocks labeled with odd integers between 1003 and 1011, inclusive. Any other function(s) described herein can be performed prior to, while, or after performing any one or more of the functions of the set 1001. Those other functions can be performed in combination with or separately from any one or more of the functions of the set 1001. The description of blocks 1003 through 1011 includes reference numbers corresponding to elements shown in one or more of the figures. Those reference numbers are listed in this portion of the description as examples only and are not included to limit any of the operations described in this portion of the description.

Block 1003 includes storing, by a computer-readable medium, a multi-DTC rule. As an example, a multi-DTC rule can comprise a rule that indicates an order in which multiple diagnostic trouble codes (DTCs) should be diagnosed or worked on. For instance, the order can be a $1^{st}$ DTC to diagnose or work on, a $2^{nd}$ DTC to diagnose or work on, etc. As another example, a multi-DTC rule can comprise a repair hint that is not included within a respective repair hint associated with only one of the multiple DTCs.

Content storage 135 can comprise the computer-readable medium that stores the multi-DTC rule. That or any other computer-readable medium storing the multi-DTC rule can store a plurality of multi-DTC rules. Each multi-DTC rule pertains to two or more DTCs. A multi-DTC rule can comprise a plurality of multi-DTC rules, each of which is associated with the same set of two or more DTCs. Alternatively, the plurality of multi-DTC rules associated with the same set of two or more DTCs can be written as a single multi-DTC rule.

In a first case, the multi-DTC rule can be generated prior to an RO cluster based on an RO that lists two or more DTCs is generated. As an example, and in accordance with the first case, the multi-DTC rule can be generated using content authoring device 133 based on experience and knowledge of an author using content authoring device 133 or repair information stored in content storage 135. In a second case, the multi-DTC rule can be generated after an RO cluster based on an RO that lists the two or more DTCs is generated. As an example, and in accordance with the second case, the multi-DTC rule can be generated using content authoring device 133 based on experience and knowledge of an author using content authoring device 133, repair information stored in content storage 135, or the information or metadata associated with an RO cluster pertaining to the RO that lists the two or more DTCs.

In accordance with the second case, processor 111 can cause a an alert indicating the RO cluster based on the RO that lists two or more diagnostic trouble codes has been generated to be sent from a computer-readable medium to content authoring DPM 133.

Next, block 1005 includes detecting, by a processor, an RO cluster based on an RO that lists two or more diagnostic trouble codes, wherein the multi-DTC rule pertains to the two or more diagnostic trouble codes listed on the RO. As an example, the processor that makes that detection can comprise a processor within content authoring DPM 133, processor 111, or some other processor. As an example, the processor can detect that RO cluster number 3 (see FIG. 3) lists two or more DTCs, namely P0111 and P2183.

Next, block 1007 includes generating, by the processor, a computer-readable vehicle repair tip based on the multi-DTC rule. As an example, the processor that generates vehicle repair tip based on the multi-DTC rule can comprise a processor within content authoring DPM 133, processor 111, or some other processor.

As an example, generating a multi-DTC rule for RO cluster number 3 can include generating a rule including the following steps (i) diagnose or work on DTC P0111 $1^{st}$, (ii) clear (e.g., delete) all DTC, (iii) operate vehicle to determine if DTC P0111 or DTC P2183 sets (e.g., becomes active) again, (iv) diagnose or work on DTC P2183 $2^{nd}$ if DTC P2183 sets again. The multi-DTC rule can include information for operating the vehicle under conditions in which DTC P2183 can be set. As an example, the conditions in which DTC P2183 sets can include a condition of the vehicle coolant temperature being above 185 degrees Fahrenheit.

Next, block 1009 includes storing, by the computer-readable medium, the vehicle repair tip based on the multi-DTC rule, and an indicator that indicates the RO cluster is associated with the vehicle repair tip based on the multi-DTC rule. The processor that generates the repair tip can provide the repair tip and the indicator to the computer-readable medium. As an example, the computer-readable medium can be located within content storage 135. The indicator stored with the repair tip based on the multi-DTC rule can be an RO cluster identifier (such as the identifier "3" for RO cluster number 3).

Next, block 1011 includes providing, from the computer-readable medium, the vehicle repair tip based on the multi-DTC rule to a communication network for transmission to a vehicle service tool. Content distributor DPM 137 can receive a request from a vehicle service tool (e.g., service tool 503, 505, or 507) over network 105. As an example, the request can identify a plurality of DTCs among other data such as a VIN, a YMM, a YMME, or a YMMES. Content distributor DPM 137 can search content storage 135 to locate content based on the request. Content distributor 137 can locate the multi-DTC rule associated with the plurality of DTCs identified in the request.

Content distributor DPM 137 can transmit to network 105, for transmission, in turn, to the vehicle service tool, any content located by content distributor DPM 137 searching content storage 135 or any other computer-readable medium in response to the request from the vehicle service tool. The transmitted content provided to the network 105 can include the repair tip based on the multi-DTC rule associated with the plurality of DTCs identified in the request.

FIG. 10 refers to a multi-DTC rule. A DTC set active in a vehicle can cause a service engine soon light to be turned on in the vehicle. The service engine soon light being turned on can be a symptom exhibited by a vehicle and cause of a customer complaint. Therefore, FIG. 10 is equally applicable to multi-symptom rules. Any use of the phrase "multi-DTC" in this description or the figures can be replaced with "multi-symptom." Moreover, the symptoms of a multi-symptom rule can be symptom other than or in addition to a symptom caused by a DTC. For instance, a symptom or customer complaint could be a clunking noise while braking and the car pulls left while braking. Repair orders including such symptom or customer complaint can indicate a pattern that indicates fixing the clunking condition might also fix the pulling condition.

Processor 111 can execute program to detect a pattern that indicate fixing a first symptom of two or more symptoms fixes the first symptom and at least one other symptom and to generate a multi-symptom rule retarding the detected pattern. Processor 111 can look to a variety of data from repair orders to detect the pattern, such as customer complaint data, fix data, parts data, and technician notes data.

X. Computing Device with Processor and Computer-Readable Medium

The example embodiments include a computing device comprising a processor and a computer-readable medium storing program instructions, that when executed by the processor, cause a set of functions to be performed, the set of functions (or more simply, functions).

In a first respect, the set of functions the computing device performs can be a first set of functions that comprise the set 801 discussed above and shown in FIG. 8. The first set of functions can be modified in accordance with the description of FIG. 8. The first set of functions modified in accordance with the description of FIG. 8 can be modified in accordance with any other portion of this description and the other figures.

In a second respect, the set of functions the computing device performs can be a first set of functions that comprise the set 901 discussed above and shown in FIG. 9. The first set of functions can be modified in accordance with the description of FIG. 9. The first set of functions modified in accordance with the description of FIG. 9 can be modified in accordance with any other portion of this description and the other figures.

In a third respect, the set of functions the computing device performs can be a first set of functions that comprise the set 1001 discussed above and shown in FIG. 10. The first set of functions can be modified in accordance with the description of FIG. 10. The first set of functions modified in accordance with the description of FIG. 10 can be modified in accordance with any other portion of this description and the other figures.

XI. Abbreviations and Acronyms

The following abbreviations or acronyms are used in the description.

CRPI—Computer-readable program instructions;
DPM—Data Processing Machine;
DPR—Data protection recovery;
DTC—Diagnostic Trouble Code;
EBI—Experienced-based Information;
ECU—Electronic control unit;
e.g.—for example;
etc.—Etcetera;
FIG.—Figure;
GUI—Graphical User Interface;
IAT—Intake Air Temperature;
ID—identifier;
i.e.—id est (that is);
Inc.—Incorporated;
L—Liter;
LOC—Labor operation code;
NLP—Natural Language Processor;
RO—Repair Order;
SDS—Service data source;
SQL—Structured Query Language;
VIN—Vehicle Identification Number;
XML—Extensible Markup Language;
YMM—Year/Make/Model;
YMME—Year/Make/Model/Engine; and
YMMES—Year/Make/Model/Engine/System.

XII. CONCLUSION

Clause 1—A method comprising: identifying, by a natural language processor, that a computer-readable vehicle repair order (RO) represents terms of a natural human language that match one or more taxonomy terms within a defined taxonomy searchable by the natural language processor; associating, by the natural language processor, a meaning with the RO based on the terms of the natural human language represented by the RO that match the one or more taxonomy terms; generating, by the natural language processor, metadata that represents the meaning associated with the RO; and providing the metadata to a data processing machine for generating content based at least in part on the metadata.

Clause 2—The method of clause 1, wherein the terms of the natural human language that match the one or more taxonomy terms include at least one of (i) a symptom, (ii) a test performed, (iii) a part failure, and (iv) a labor operation.

Clause 3—The method of clause 2, wherein the symptom includes a diagnostic trouble code identifier.

Clause 4—The method of clause 2, wherein the terms of the natural human language that match the one or more taxonomy terms further include a part name for a part on a vehicle.

Clause 5—The method of clause 1, wherein the natural language processor identifies a term of the terms of the natural human language as being a noun, a verb, a pronoun, an adjective, or an adverb.

Clause 6—The method of clause 5, wherein the natural language processor selects the defined taxonomy term based on the identification of the term being a noun, a verb, a pronoun, an adjective, or an adverb.

Clause 7—The method as in one of clauses 1-6, wherein the metadata associated with the RO defines a cluster for repair orders having the meaning associated with the RO.

Clause 8—The method as in one of clauses 1-7, wherein the metadata associated with the RO defines a count of repairs orders the natural language processor has determined to have a meaning similar to the meaning associated with the RO.

Clause 9—The method as in one of clauses 1-8, wherein the content includes at least one content item selected from the group consisting of (i) a symptom, (ii) a test performed, (iii) a part failure, and (iv) a labor operation.

Clause 10—The method as in one of clauses 1-9, further comprising: determining the terms of the natural human language represented by the RO do not match terms of a defined cluster of repair orders; and establishing a new cluster of repair orders for categorizing any RO associated with terms that match the terms of the natural human language represented by the RO.

Clause 11—The method as in one of clauses 1-10, wherein the meaning associated with the at least a portion of the RO includes at least one of the following meanings: (i) a symptom, (ii) a test performed, (iii) a part failure, and (iv) a labor operation.

Clause 12—The method as in one of clauses 1-11, wherein the meaning associated with the at least a portion of the RO is a likely-meaning of the at least a portion of the RO or an actual-meaning of the at least a portion of the RO.

Clause 13—The method as in one of clauses 1-12, further comprising: storing, by a computer-readable medium, the one or more defined taxonomies searchable by the natural-language processor, wherein the one or more defined taxonomies includes at least one of the following taxonomies: (i) a labor operation taxonomy, (ii) a symptom taxonomy, (iii) a test performed taxonomy, and (iv) a part failure taxonomy.

Clause 14—The method as in one of clauses 1-13, further comprising: generating, by the natural-language processor, second metadata that represents a meaning with at least a portion of a second RO; aggregating, by the natural-language processor, at least the first metadata and the second metadata to produced aggregated metadata.

Clause 15—The method as in one of clauses 1-14, wherein at least a portion of the metadata that represents the meaning with the at least a portion of the first RO represents one or more strings of the symbols of the natural human language selected from at least one of the defined taxonomies.

Clause 16—The method as in one of clauses 1-15, further comprising: generating, by the data processing machine, the content based at least in part on the provided metadata.

Clause 17—The method as in one of clauses 1-16, further comprising: defining, by the natural language processor, a repair order cluster for repair orders that have a meaning similar to the meaning associated with the RO; and storing, within a portion of data storage associated with the RO cluster, metadata regarding one or more other repair orders that have the meaning similar to the meaning associated with the RO.

Clause 18—The method of clause 17, further comprising: analyzing, by a given processor, the metadata regarding the one or more other repair orders for occurrence of a trend; detecting, by the given processor, occurrence of the trend; and providing, by the given processor, an alert regarding occurrence of the trend.

Clause 19—A computing device comprising a processor and a computer-readable medium storing program instructions, that when executed by the processor, cause the computing device to perform a set of functions comprising: identifying that a computer-readable vehicle repair order (RO) represents terms of a natural human language that match one or more taxonomy terms within a defined taxonomy searchable by the processor; associating, by the processor, a meaning with the RO based on the terms of the natural human language represented by the RO that match the one or more taxonomy terms; generating, by the processor, metadata that represents the meaning associated with the RO; and providing the metadata to a data processing machine for generating content based at least in part on the metadata.

Clause 20—The computing device of clause 19, wherein the terms of the natural human language that match the one or more taxonomy terms include at least one of (i) a symptom, (ii) a test performed, (iii) a part failure, and (iv) a labor operation.

Clause 21—The computing device of clause 20, wherein the symptom includes a diagnostic trouble code identifier.

Clause 22—The computing device of clause 20, wherein the terms of the natural human language that match the one or more taxonomy terms further include a part name for a part on a vehicle.

Clause 23—The computing device of clause 20, wherein the processor identifies a term of the terms of the natural human language as being a noun, a verb, a pronoun, an adjective, or an adverb.

Clause 24—The computing device as in one of clauses 20-23, wherein the processor selects the defined taxonomy based on the identification of the term being a noun, a verb, a pronoun, an adjective, or an adverb.

Clause 25—The computing device as in one of clauses 20-24, wherein the content includes at least one content item selected from the group consisting of (i) a symptom, (ii) a test performed, (iii) a part failure, and (iv) a labor operation.

Clause 26—The computing device as in one of clauses 20-25, wherein the meaning associated with the at least a portion of the RO includes at least one of the following meanings: (i) a symptom, (ii) a test performed, (iii) a part failure, and (iv) a labor operation.

Clause 27—The computing device as in one of clauses 20-26, wherein the set of functions further includes: storing, by the computer-readable medium, one or more defined taxonomies searchable by the processor, wherein the one or more defined taxonomies includes at least one of the following taxonomies: (i) a labor operation taxonomy, (ii) a symptom taxonomy, (iii) a test performed taxonomy, and (iv) a part failure taxonomy.

Clause 28—A server system comprising: a communications interface to a network; and the processor and the computer-readable medium of clause 19.

Clause 29—A method comprising: storing, by a computer-readable medium, a multi-diagnostic-trouble-code (multi-DTC) rule; detecting, by a processor, a repair order (RO) cluster based on an RO that lists two or more diagnostic trouble codes, wherein the multi-DTC rule pertains to the two or more diagnostic trouble codes listed on the RO; generating, by the processor, a computer-readable vehicle repair tip based on the multi-DTC rule; storing, by the computer-readable medium, the vehicle repair tip based on the multi-DTC rule, and an indicator that indicates the RO cluster is associated with the vehicle repair tip based on the multi-DTC rule; and providing, from the computer-readable medium, the vehicle repair tip based on the multi-DTC rule to a communication network for transmission to a vehicle service tool.

Clause 30—The method of clause 29, wherein the multi-DTC rule is generated prior to generation of the RO cluster based on the RO that lists two or more diagnostic trouble codes.

Clause 31—The method of clause 29, wherein the multi-DTC rule is generated after generation of the RO cluster based on the RO that lists two or more diagnostic trouble codes.

Clause 32—The method of clause 29, further comprising: providing, from the computer-readable medium to a content authoring data processing machine, an alert indicating the RO cluster based on the RO that lists two or more diagnostic trouble codes has been generated; and generating, by the content authoring data processing machine, the multi-DTC rule.

Clause 33—A computing device comprising a processor and a computer-readable medium storing program instructions, that when executed by the processor, cause a set of functions to be performed, the set of functions comprising: storing, by the computer-readable medium, a multi-diagnostic-trouble-code (multi-DTC) rule; detecting, by the processor, a repair order cluster based on a repair order that lists two or more diagnostic trouble codes, wherein the multi-DTC rule pertains to the two or more diagnostic trouble codes listed on the RO; generating, by the processor, a computer-readable vehicle repair tip based on the multi-DTC rule; storing, by the computer-readable medium, the vehicle repair tip based on the multi-DTC rule, and an indicator that indicates the RO cluster is associated with the vehicle repair tip based on the multi-DTC rule; and providing, from the computer-readable medium, the vehicle repair tip based on the multi-DTC rule to a communication network for transmission to a vehicle service tool.

Clause 34—A server system comprising: a communications interface to a network; and the processor and the computer-readable medium of clause 33.

Clause 35—A method comprising: storing, by a computer-readable medium, a multi-symptom rule; detecting, by the processor, a repair order (RO) cluster based on an RO that lists two or more symptoms, wherein the multi-symptom rule pertains to the two or more symptoms listed on the RO; generating, by the processor, a computer-readable vehicle repair tip based on the multi-symptom rule; storing, by the computer-readable medium, the vehicle repair tip based on the multi-symptom rule, and an indicator that indicates the RO cluster is associated with the vehicle repair tip based on the multi-symptom rule; and providing, from the computer-readable medium, the vehicle repair tip based on the multi-symptom rule to a communication network for transmission to a vehicle service tool.

Clause 36—The method of clause 35, wherein the multi-symptom rule is generated prior to generation of the RO cluster based on the RO that lists two or more symptoms.

Clause 37—The method of clause 35, wherein the multi-symptom rule is generated after generation of the RO cluster based on the RO that lists two or more symptoms.

Clause 38—The method of clause 35, further comprising: providing, from the computer-readable medium to a content authoring data processing machine, an alert indicating the RO cluster based on the RO that lists two or more symptoms has been generated; and generating, by the content authoring data processing machine, the multi-symptom rule.

Clause 39—The method as in one of clauses 35-38, wherein at least one of the two or more symptoms is a symptom based on a diagnostic trouble code being set in a vehicle.

Clause 40—A computing device comprising a processor and a computer-readable medium storing program instructions, that when executed by the processor, cause a set of functions to be performed, the set of functions comprising: storing, by the computer-readable medium, a multi-symptom rule; detecting, by the processor, a repair order (RO) cluster based on an RO that lists two or more symptoms, wherein the multi-symptom rule pertains to the two or more symptoms listed on the RO; generating, by the processor, a computer-readable vehicle repair tip based on the multi-symptom rule; storing, by the computer-readable medium, the vehicle repair tip based on the multi-symptom rule, and an indicator that indicates the RO cluster is associated with the vehicle repair tip based on the multi-symptom rule; and providing, from the computer-readable medium, the vehicle repair tip based on the multi-symptom rule to a communication network for transmission to a vehicle service tool.

Clause 41—A server system comprising: a communications interface to a network; and the processor and the computer-readable medium of clause 40.

Clause 42—A method comprising: identifying, by a processor, that a computer-readable vehicle repair order (RO) includes terms of a natural human language that match one or more taxonomy terms within a defined taxonomy searchable by the processor; associating, by the processor, a meaning with the RO based on the terms of the RO that match the one or more taxonomy terms; generating, by the processor, metadata that represents the meaning associated with the RO; and providing the metadata to a data processing machine for generating content based at least in part on the metadata.

Clause 43—The method of clause 42, wherein the terms of the natural human language that match the one or more taxonomy terms include at least one of (i) a symptom, (ii) a test performed, (iii) a part failure, and (iv) a labor operation.

Clause 44—The method of clause 43, wherein the symptom includes a diagnostic trouble code identifier.

Clause 45—The method of clause 43, wherein the terms of the natural human language that match the one or more taxonomy terms further include a part name for a part on a vehicle.

Clause 46—The method of clause 42, wherein the processor identifies a term of the terms of the natural language as being a noun, a verb, a pronoun, an adjective, or an adverb.

Clause 47—The method as in one of clauses 42-46, wherein the processor selects the defined taxonomy based on the identification of the term being a noun, a verb, a pronoun, an adjective, or an adverb.

Clause 48—The method as in one of clauses 42-47, wherein the content includes at least one content item selected from the group consisting of (i) a symptom, (ii) a test performed, (iii) a part failure, and (iv) a labor operation.

Clause 49—The method as in one of clauses 42-48, wherein the meaning associated with the at least a portion of the RO includes at least one of the following meanings: (i) a symptom, (ii) a test performed, (iii) a part failure, and (iv) a labor operation.

Clause 50—The method as in one of clauses 42-49, further comprising: storing, by a computer-readable medium, the one or more defined taxonomies searchable by the processor, wherein the one or more defined taxonomies includes at least one of the following taxonomies: (i) a labor operation taxonomy, (ii) a symptom taxonomy, (iii) a test performed taxonomy, and (iv) a part failure taxonomy.

Clause 51—A computing device comprising a processor and a computer-readable medium storing program instructions, that when executed by the processor, cause a set of functions to be performed, the set of functions comprising: identifying, by the processor, that a computer-readable vehicle repair order (RO) includes terms of a natural human language that match one or more taxonomy terms within a defined taxonomy searchable by the processor; associating, by the processor, a meaning with the RO based on the terms of the RO that match the one or more taxonomy terms; generating, by the processor, metadata that represents the meaning associated with the RO; and providing the metadata to a data processing machine for generating content based at least in part on the metadata.

Clause 52—A server system comprising: a communications interface to a network; and the processor and the computer-readable medium of clause 51.

Clause 53—A system comprising: a communications interface configured for communicating over a network with a content distributor data processing machine (DPM), wherein the communications interface is configured to transmit, to the network, a request for vehicle-service content from the content distributor DPM; and wherein the communications interface is configured to receive, from the network, vehicle-service content from the content distributor DPM, and wherein the received vehicle-service content from the content distributor DPM is based on metadata generated by a processor executing a natural language processing module and a machine-learning module; a display device; a processor; and a computer-readable medium including program instructions executable by the processor to cause the display device to display the received vehicle-service content from the content distributor DPM.

Clause 54—The system of clause 53, further comprising: an input device configured to receive an input for requesting vehicle-service content from the content distributor DPM, wherein the computer-readable medium includes program instructions executable by the processor to generate the request for vehicle-service content from the content distributor DPM.

Clause 55—A method comprising: processing first vehicle-service data by a processor executing a natural-language processing module; generating, by the processor, first metadata regarding the first vehicle-service data; classifying, by the processor, the first metadata as a first cluster within a first category of vehicle-service data clusters; and generating vehicle-service content based on the first metadata.

Clause 56—The method of clause 55, wherein the first vehicle-service data comprises repair order data obtained from a first repair order generated by a service tool at a vehicle repair shop.

Clause 57—The method of clause 56, wherein the RO data represents multiple fields of the first repair order, wherein each field of the first repair order is tagged to identify a type of repair order information within the tagged field, wherein processing the first vehicle-service data includes identifying textual content within the first vehicle-service data as being a particular part of a natural human language, and wherein generating the first metadata includes generating metadata that represents the textual content within the first vehicle-service data and at least one of an identifier of a tagged field from which the textual content was obtained and the identified particular part of the natural human language.

Clause 58—The method of clause 57, wherein processing the first vehicle-service data includes selecting a taxonomy stored in a computer-readable medium, wherein the taxonomy includes a standard term and a non-standard term associated with the standard term, wherein the textual content includes the non-standard term, and wherein the first metadata that represents the textual content includes the standard term.

Clause 59—The method of clause 57, wherein the particular part of the natural human language is a noun, a verb, a pronoun, an adjective, or an adverb.

Clause 60—The method of clause 58, wherein the natural human language is English, French, Spanish, or German.

Clause 61—The method of clause 56, further comprising: receiving, by a content distributor data processing machine from a second service tool, a request with search terms associated with the vehicle-service content; and providing the vehicle-service content from the content distributor data processing machine to the second service tool in response to receiving the request.

Clause 62—The method of clause 55, further comprising: associating a unique identifier of the first vehicle-service data with the first metadata.

Clause 63—The method of clause 55, further comprising: processing second vehicle-service data by the processor executing the natural-language processing module; generating, by the processor, second metadata regarding the second vehicle-service data; and classifying, by the processor, the second metadata as part of the first cluster within a second category of vehicle-service cluster that tracks a quantity of instances of vehicle-service data in the first cluster.

Clause 64—The method of clause 55, further comprising: processing, by the processor, the first metadata using a machine learning module, wherein processing the first metadata includes determining that the first metadata pertains to multiple symptoms reported on the first repair order, determining a recommended order of occurrence of repair procedures for working on vehicles exhibiting the multiple symptoms, and generating additional metadata that indicates the recommended order of occurrence of repair procedures, and wherein the vehicle-service content based on the first metadata is further based on the additional metadata and indicates the recommended order of occurrence of repair procedures.

Clause 65—The method of clause 64, wherein the multiple symptoms include a first symptom and a second symptom, and wherein the first symptom pertains to a diagnostic trouble code set by an electronic control unit set in a vehicle.

Clause 66—The method of clause 64, wherein none of the multiple symptoms pertain to a diagnostic trouble code set by an electronic control unit in a vehicle.

Clause 67—The method of clause 55, wherein generating the vehicles-service content based on the first metadata includes selecting, by the processor, pre-authored text for placement into distinct segments of the vehicle-service content.

Clause 68—The method of clause 67, wherein the distinct segments include one or more segments selected from the group consisting of (i) a customer complaint segment, (ii) a test and verification segment, (iii) a vehicle problem segment, and (iv) a repair segment.

Example embodiments have been described above. Those skilled in the art will understand that changes and modifications can be made to the described embodiments without departing from the true scope and spirit of the present invention, which is defined by the claims.

We claim:

1. A method comprising:
receiving, by one or more processors, vehicle-service data, wherein the received vehicle-service data includes a first portion of vehicle-service data;
identifying, by the one or more processors, textual content within the first portion of vehicle-service data;
generating, by the one or more processors, metadata corresponding to the received vehicle-service data, wherein the metadata includes first metadata corresponding to the first portion of vehicle-service data;
classifying, by the one or more processors, the metadata as a first cluster within a first category of vehicle-service data clusters; and
generating, by the one or more processors, vehicle-service content based on the metadata
wherein (i) the first portion of vehicle-service data includes an image, and identifying the textual content includes performing optical character recognition on the image, or (ii) the first portion of vehicle-service data includes an audio recording, and identifying the textual content includes performing speech recognition on the audio recording.

2. The method according to claim 1, further comprising:
receiving, by the one or more processors from a vehicle service tool, a second portion of vehicle-service data including vehicle data obtained from a vehicle connected to the vehicle service tool; and
generating, by the one or more processors, second metadata regarding the second portion of vehicle service data,
wherein the vehicle-service content is further based on the second metadata.

3. A method comprising:
receiving, by one or more processors, vehicle-service data, wherein the received vehicle-service data includes a first portion of vehicle-service data;
identifying, by the one or more processors, textual content within the first portion of vehicle-service data;
generating, by the one or more processors, metadata corresponding to the received vehicle-service data, wherein the metadata includes first metadata corresponding to the first portion of vehicle-service data;
classifying, by the one or more processors, the metadata as a first cluster within a first category of vehicle-service data clusters;
generating, by the one or more processors, vehicle-service content based on the metadata;
determining, by the one or more processors, the metadata corresponds to multiple symptoms reported on a repair order;
determining, by the one or more processors, a recommended order for performing repair procedures on vehicles exhibiting the multiple symptoms; and
generating, by the one or more processors, additional metadata that indicates the recommended order for performing repair procedures,
wherein generating the vehicle-service content is further based on the additional metadata, and the vehicle-service content indicates the recommended order for performing repair procedures.

4. A method according to claim 3,
wherein the multiple symptoms include a first symptom and a second symptom, and
wherein the first symptom pertains to a diagnostic trouble code set by an electronic control unit set in a vehicle.

5. A method according to claim 3, wherein none of the multiple symptoms pertain to a diagnostic trouble code set by an electronic control unit in a vehicle.

6. A method comprising:
receiving, by one or more processors, vehicle-service data, wherein the received vehicle-service data includes a first portion of vehicle-service data;
identifying, by the one or more processors, textual content within the first portion of vehicle-service data;
generating, by the one or more processors, metadata corresponding to the received vehicle-service data, wherein the metadata includes first metadata corresponding to the first portion of vehicle-service data;
classifying, by the one or more processors, the metadata as a first cluster within a first category of vehicle-service data clusters; and
generating, by the one or more processors, vehicle-service content based on the metadata,
wherein the first portion of vehicle-service data includes repair order data from a first repair order generated by a service tool at a vehicle repair shop and the repair order data represents multiple fields of the first repair order,
wherein each field of the first repair order is tagged with a tag indicating a type of repair order information within that field,
wherein identifying textual content within the first portion of vehicle-service data includes identifying at least a portion of the textual content as being a particular part of a natural human language, and
wherein generating metadata corresponding to the received vehicle-service data includes generating metadata that represents the textual content within the first portion of vehicle-service data and at least one tag of a tagged field corresponding to both the textual content within the first portion of vehicle-service data and the particular part of the natural human language.

7. A method according to claim 6, further comprising:
selecting, by the one or more processors, a taxonomy stored in a non-transitory computer-readable medium, wherein:
the taxonomy includes a standard term and a non-standard term associated with the standard term,
identifying textual content within the first portion of vehicle-service data includes identifying the non-standard term within the first portion of vehicle-service data, and
the first metadata corresponding to the first portion of vehicle-service data includes the standard term.

8. A method according to claim 6, wherein:
the particular part of the natural human language is a noun, a verb, a pronoun, an adjective, or an adverb, and/or
the natural human language is English, French, Spanish, or German.

9. A method according to claim 6, wherein:
the received vehicle-service data includes a second portion of vehicle-service data,
the method further comprises:
generating metadata corresponding to the second portion of vehicle-service data, and
classifying, by the one or more processors, the metadata corresponding to the second portion of vehicle-service data as part of a cluster within a second category of vehicle-service clusters, and the second category of vehicle-service clusters tracks a quantity of instances of vehicle-service data in the first cluster.

10. A method comprising:
receiving, by one or more processors, vehicle-service data, wherein the received vehicle-service data includes a first portion of vehicle-service data;
identifying, by the one or more processors, textual content within the first portion of vehicle-service data;
generating, by the one or more processors, metadata corresponding to the received vehicle-service data, wherein the metadata includes first metadata corresponding to the first portion of vehicle-service data;
classifying, by the one or more processors, the metadata as a first cluster within a first category of vehicle-service data clusters; and
generating, by the one or more processors, vehicle-service content based on the metadata, wherein:
the vehicle-service content includes multiple segments of vehicle-service content, and
generating the vehicle-service content based on the metadata includes selecting, by the one or more processors, pre-authored text for placement into one or more of the multiple segments of vehicle-service content.

11. A method according to claim 10, further comprising:
receiving, by the one or more processors from a vehicle service tool, a request with one or more search terms associated with the vehicle-service content; and
transmitting, by the one or more processors in response to the request, the vehicle-service content to the vehicle service tool.

12. A method according to claim 10, wherein the first cluster represents a defect, a cause of the defect, and one or more symptoms of the defect.

13. The method of claim 10, wherein the multiple segments of vehicle-service content include one or more segments from among: a customer complaint segment, a test and verification segment, a vehicle problem segment, or a repair segment.

14. A method comprising:
receiving, by one or more processors, vehicle-service data, wherein the received vehicle-service data includes a first portion of vehicle-service data;
identifying, by the one or more processors, textual content within the first portion of vehicle-service data, wherein identifying textual content within the first portion of vehicle-service data includes identifying one or more attributes of the textual content;
generating, by the one or more processors, metadata corresponding to the received vehicle-service data, wherein the metadata includes first metadata corresponding to the first portion of vehicle-service data;
classifying, by the one or more processors, the metadata as a first cluster within a first category of vehicle-service data clusters;
generating, by the one or more processors, vehicle-service content based on the metadata;
selecting, by the one or more processors, a taxonomy based, at least in part, on the one or more attributes of the textual content, and
comparing, by the one or more processors, the textual content with the taxonomy.

15. A method according to claim 14, wherein:
the one or more attributes of the textual content indicate the textual content includes a verb phrase, and
the taxonomy includes labor terms and/or test terms.

16. A method according to claim 14, wherein:
the one or more attributes of the textual content indicate the textual content includes a noun phrase, and
the selected taxonomy is a taxonomy including vehicle part terms.

17. A method according to claim 14, wherein:
identifying textual content within the first portion of vehicle-service data includes extracting, by the one or more processors, the textual content from the received vehicle-service data, and
the textual content from the received vehicle-service data includes an enterprise-specific code, a domain-specific data point, or a natural human language term.

18. A method according to claim 14, wherein receiving vehicle service data include receiving vehicle-service data from a social media website, vehicle service data from an electronic technician notebook, a technical service bulletin, or a vehicle campaign bulletin.

19. A computing system comprising:
one or more processors; and
non-transitory computer-readable media storing program instructions, wherein execution of the program instructions by the one or more processors causes the computing system to perform functions comprising:
receiving vehicle-service data, wherein the received vehicle service data includes a first portion of vehicle-service data;
identifying textual content within the first portion of vehicle-service data;
generating metadata corresponding to the received vehicle-service data, wherein the metadata includes first metadata corresponding to the first portion of vehicle-service data;
classifying the metadata as a first cluster within a first category of vehicle-service data clusters; and
generating vehicle-service content based on the metadata,
wherein (i) the first portion of vehicle-service data includes an image, and identifying the textual content includes performing optical character recognition on the image, or (ii) the first portion of vehicle-service data includes an audio recording, and identifying the textual content includes performing speech recognition on the audio recording.

20. A non-transitory computer readable medium having stored therein instructions executable by one or more processors to cause a computing system to perform functions comprising:
receiving vehicle-service data, wherein the received vehicle service data includes a first portion of vehicle-service data;
identifying textual content within the first portion of vehicle-service data;
generating metadata corresponding to the received vehicle-service data, wherein the metadata includes first metadata corresponding to the first portion of vehicle-service data;
classifying the metadata as a first cluster within a first category of vehicle-service data clusters; and
generating vehicle-service content based on the metadata,
wherein (i) the first portion of vehicle-service data includes an image, and identifying the textual content includes performing optical character recognition on the image, or (ii) the first portion of vehicle-service data includes an audio recording, and identifying the textual content includes performing speech recognition on the audio recording.

21. A computing system comprising:
one or more processors;
a display device;
a communications interface configured for communicating with a remote server over a network; and
a non-transitory computer-readable medium storing program instructions, wherein execution of the program instructions causes the computing system to perform functions comprising:
transmitting, by the communications interface over the network to the remote server, a request for vehicle-service content;
receiving, from the network, vehicle-service content from the remote server; and
displaying, on the display device, the vehicle-service content from the remote server, wherein:
the vehicle-service content from the remote server is generated by the remote server based on metadata that the remote server generates,
the metadata corresponds to vehicle service data received by the remote server,
the vehicle service data includes a first portion of vehicle service data,
the metadata includes first metadata corresponding to a first portion of vehicle service data that includes textual content, and
the metadata is classified as a first cluster within a first category of vehicle-service data clusters.

* * * * *